(12) United States Patent
Kawasaki

(10) Patent No.: US 6,674,582 B2
(45) Date of Patent: Jan. 6, 2004

(54) MICROSCOPE ZOOM OBJECTIVE LENS

(75) Inventor: Kenji Kawasaki, Hachioji (JP)

(73) Assignee: Olympus Corporation, Shibuya-ku (JP)

( * ) Notice: Subject to any disclaimer, the term of this patent is extended or adjusted under 35 U.S.C. 154(b) by 79 days.

(21) Appl. No.: 09/986,171

(22) Filed: Nov. 7, 2001

(65) Prior Publication Data

US 2003/0165021 A1 Sep. 4, 2003

(30) Foreign Application Priority Data

Nov. 8, 2000 (JP) .................................... 2000-340666
Jun. 11, 2001 (JP) .................................... 2001-175204
Sep. 7, 2001 (JP) .................................... 2001-271868

(51) Int. Cl.⁷ ............................................. G02B 15/14
(52) U.S. Cl. ...................... 359/690; 359/689; 359/380
(58) Field of Search ........................ 359/689, 690, 359/380

(56) References Cited

U.S. PATENT DOCUMENTS 4,789,226 A * 12/1988 Ogata ........................ 359/687
6,124,985 A * 9/2000 Abe ........................... 359/690
6,236,516 B1 * 5/2001 Misaka ....................... 359/690
6,519,095 B1 * 2/2003 Takato ........................ 359/689

* cited by examiner

Primary Examiner—Scott J. Sugarman
Assistant Examiner—M. Hasan
(74) Attorney, Agent, or Firm—Kenyon & Kenyon

(57) ABSTRACT

The invention relates to a microscope zoom objective lens system having improved optical performance, and comprising a compact optical system with a zoom ratio of at least 3. The microscope zoom objective lens system comprises a first lens group G1 having positive refractive power, a second lens group G2 having negative refractive power and a third lens group G3 having positive refractive power. For zooming from a low to a high magnification side, the second and third lens groups G2 and G3 move along the optical axis while the separation between the first lens group G1 and the second lens group G2 becomes wide and the separation between the second lens group G2 and the third lens group G3 becomes narrow. The first lens group G1 comprises at least one doublet having positive refractive power and consisting of a positive lens and a negative lens. The positive lens has an Abbe number defined by $\nu>80$.

37 Claims, 31 Drawing Sheets

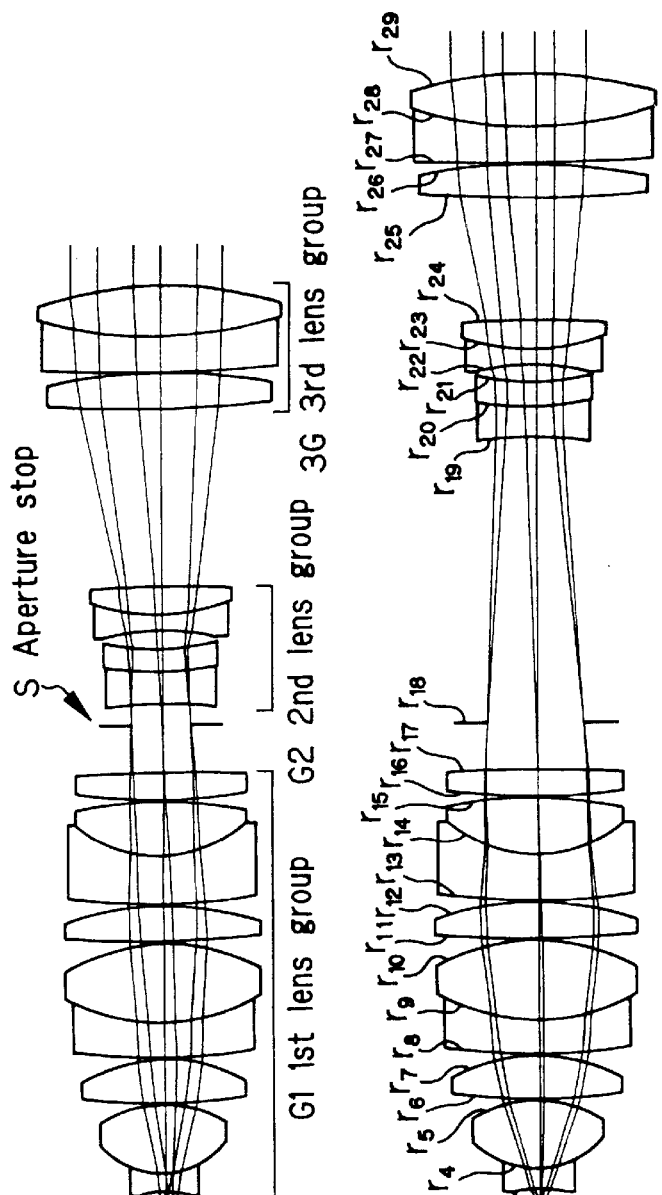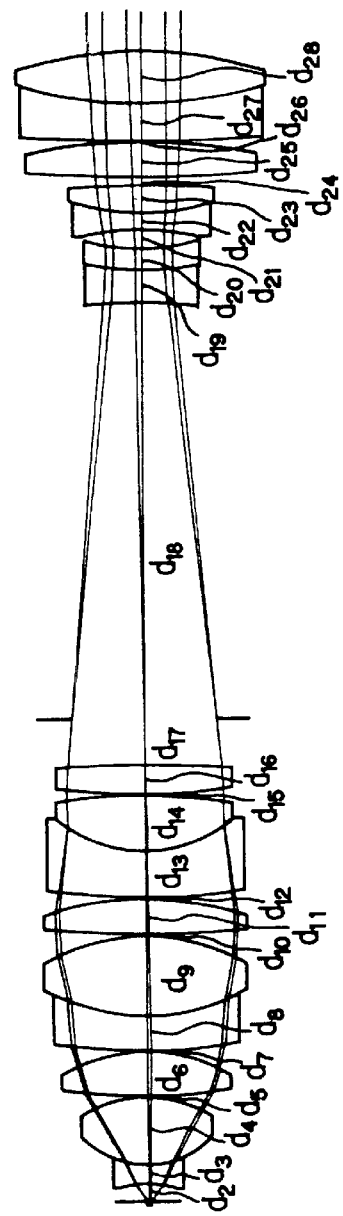
FIG. 1(a)  FIG. 1(b)  FIG. 1(c)

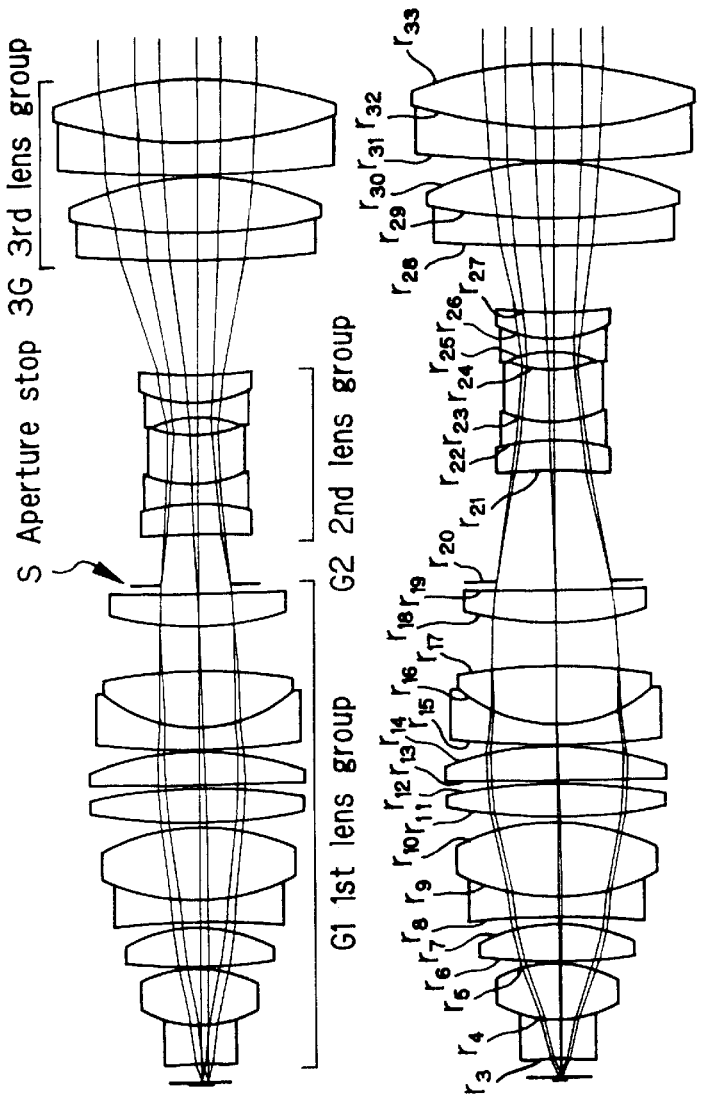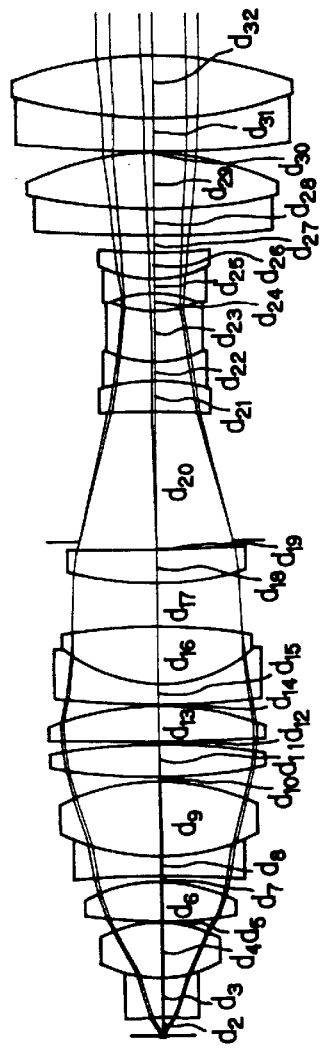
FIG. 2(a)
FIG. 2(b)
FIG. 2(c)

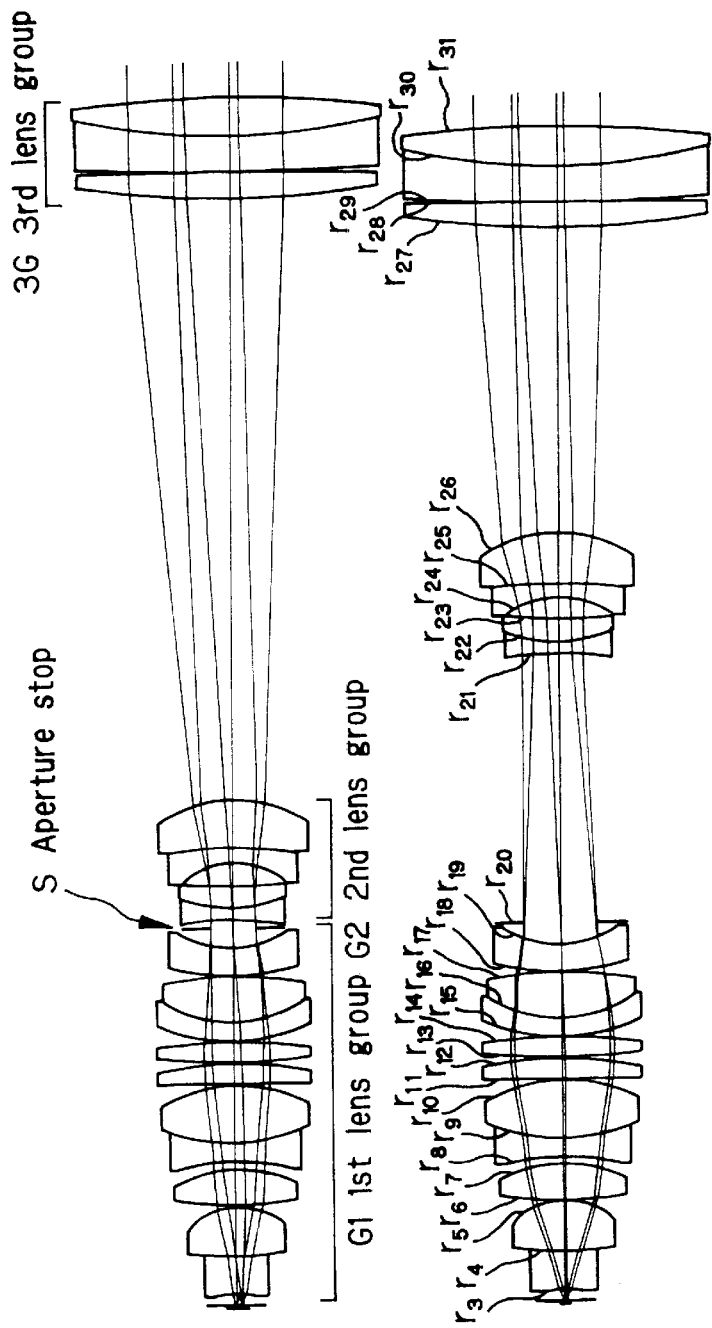
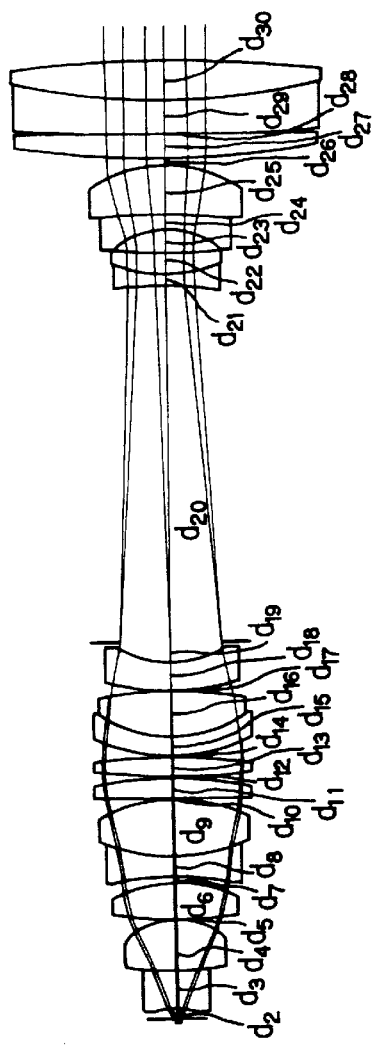
FIG. 4(a)
FIG. 4(b)
FIG. 4(c)

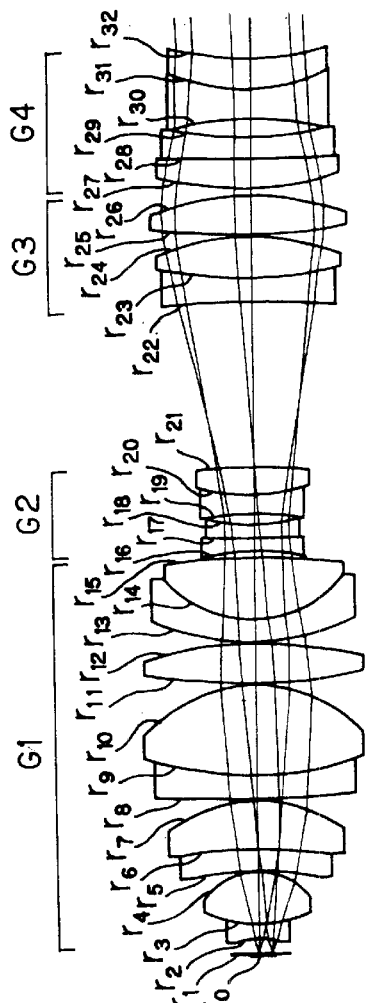
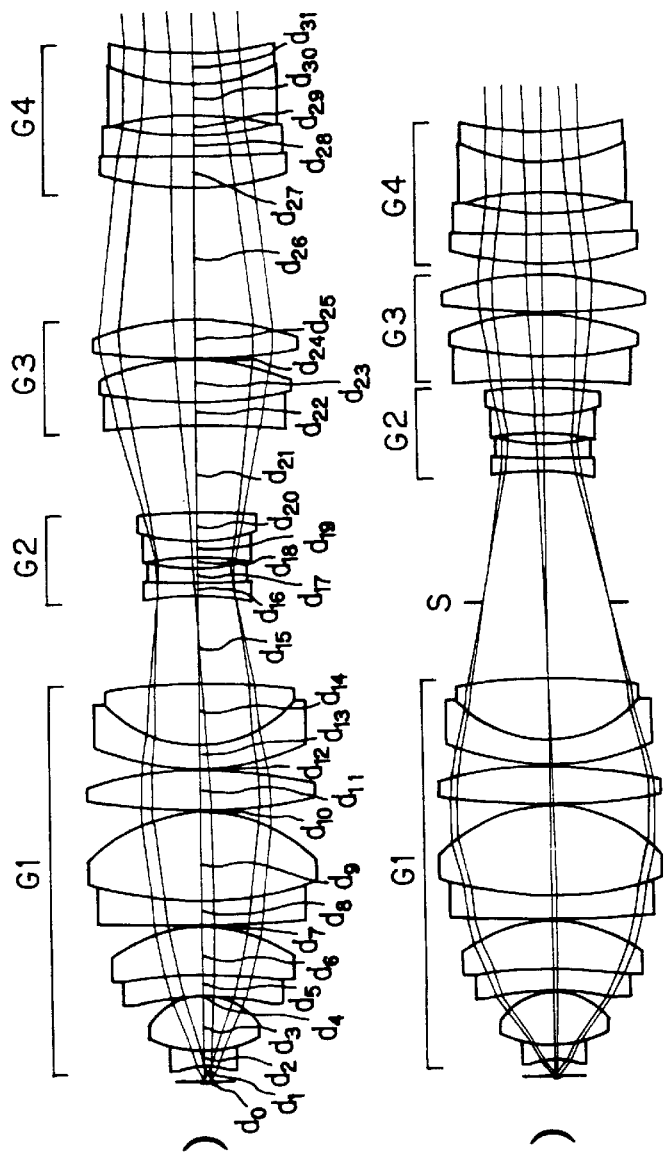
FIG. 11(a)
FIG. 11(b)
FIG. 11(c)

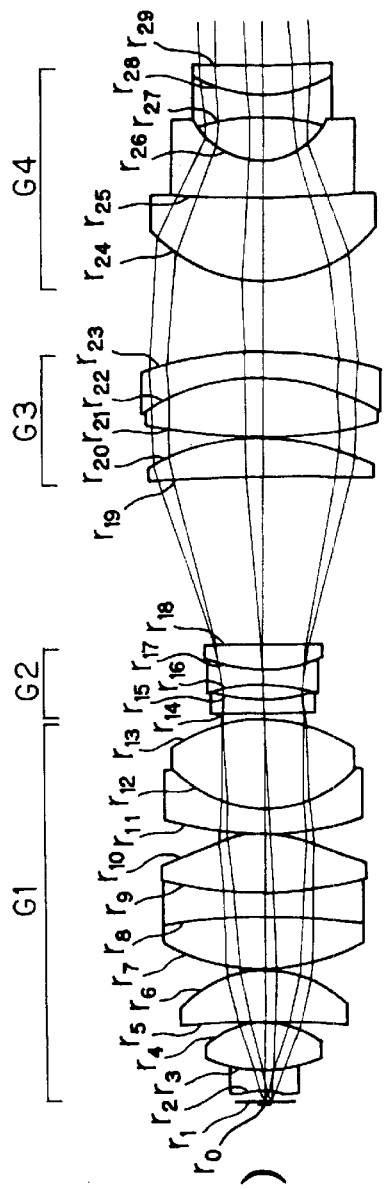
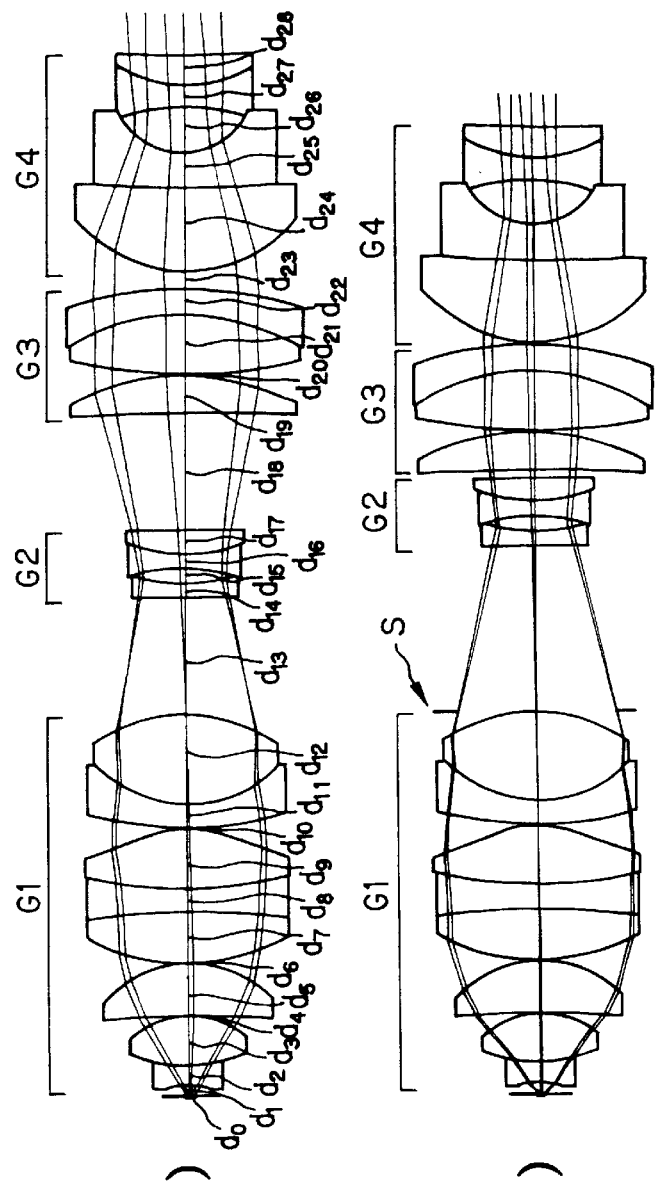
FIG. 13(a)
FIG. 13(b)
FIG. 13(c)

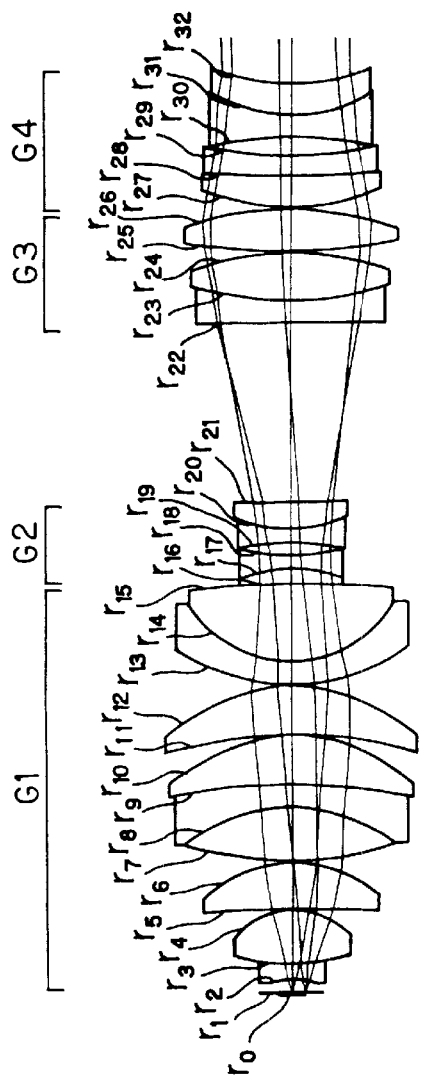
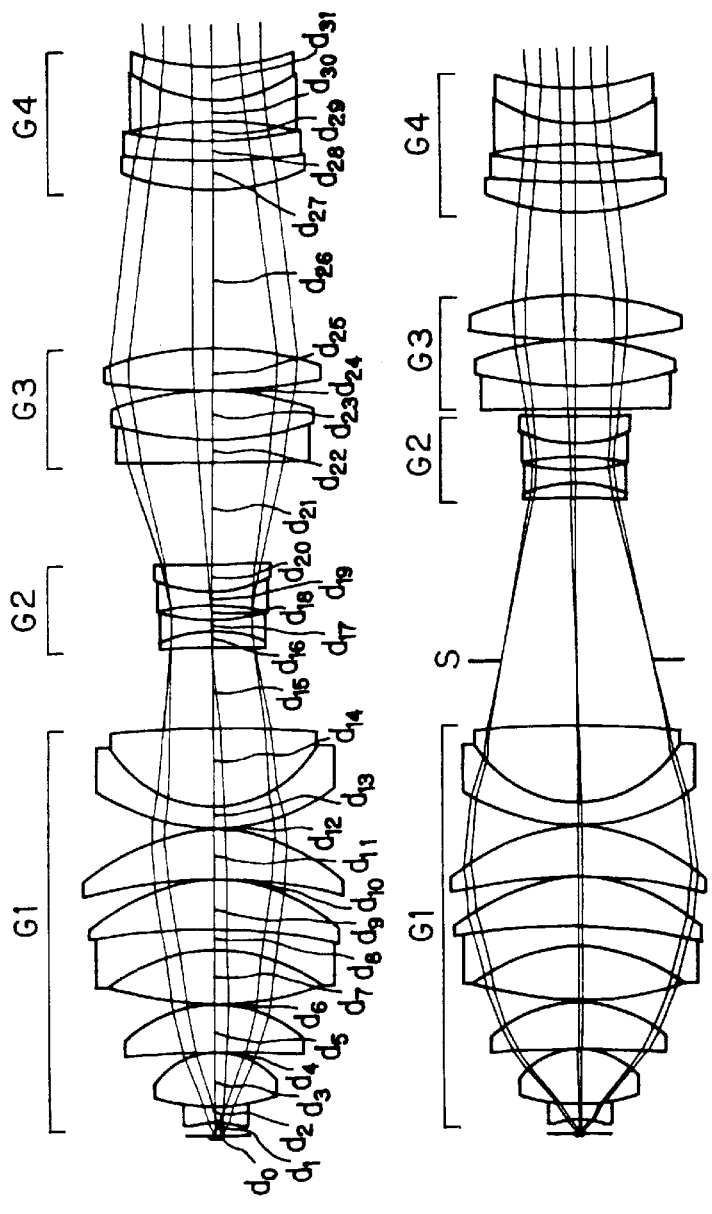
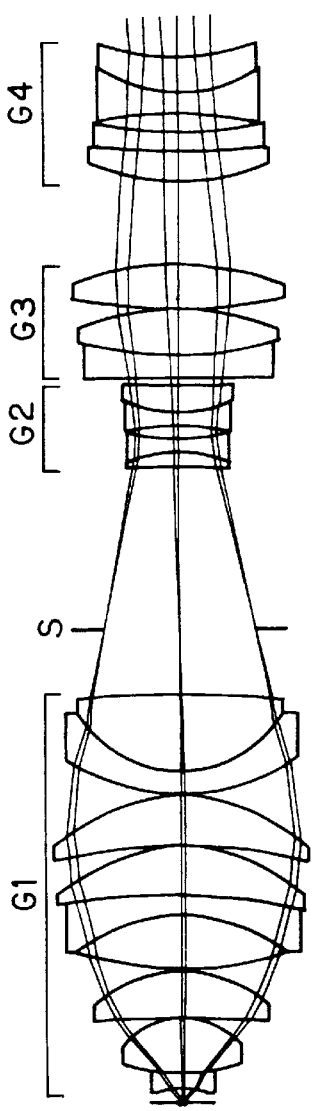
FIG. 14(a)
FIG. 14(b)
FIG. 14(c)

MICROSCOPE ZOOM OBJECTIVE LENS

This application claims benefit of Japanese Patent application No. 2000-340666 filed in Japan on Nov. 8, 2000, No. 2001-175204 filed in Japan on Jun. 11, 2001 and NO. 2001-271868 filed in Japan on Sep. 7, 2001, the contents of which are incorporated by this reference.

BACKGROUND OF THE INVENTION

The present invention relates generally to a microscope zoom objective lens, and more particularly to a microscope zoom objective lens having a zoom ratio of 3 or greater.

A microscope object lens has a working distance, a numerical aperture (NA), etc. preset primarily in the range of about 1 to about 100 magnifications. Depending on how to observe, a variety of objective lenses inclusive of those capable of phase-contrast and fluorescent observations are kept on hand. For instance, objective lenses having a large numerical aperture at about 100 magnifications include an oil immersion objective lens and an objective lens provided with a correction ring. The correction ring objective lens system is designed to make correction for aberrations by moving a lens or lens group in the lens system depending on the thickness of a cover glass.

One typical example of the correction ring objective lens system is disclosed in JP-A 01-307717. The correction ring objective lens system is often used in the form of a system having a high magnification and a large numerical aperture. In such a high-magnification, large-numerical-aperture objective lens system, aberrations are likely to become worse due to thickness variations of a cover glass. For this reason, spherical aberrations are mainly corrected by moving a given lens group in the lens system along the optical system.

According to one approach to varying the viewing magnification of a microscope, an intermediate zoom optical system is located in the rear of an objective lens system for its attachment or detachment with respect to a viewing optical axis. With this approach, two different viewing magnifications may be obtained. Another approach makes use of an image-forming lens in combination with a zoom lens, as typically disclosed in JP-A 06-18784. This publication shows an arrangement wherein a zoom type image-forming lens is located in the rear of an objective lens.

U.S. Pat. Nos. 3,671,099, 3,456,998 and 3,421,897 disclose that a zoom lens is located in the rear of an objective lens.

Some stereomicroscopes, although lower in magnification than, and inferior in numerical aperture to, microscopes, are more improved thereover in terms of ease of manipulation and stereoscopy.

In a microscope objective lens system, a plurality of objective lenses are appropriately selected depending on magnification for observation. When the respective objective lenses have axial misalignments, low-magnification observation is changed over to high-magnification observation. In this case, however, a stage must be manipulated so as to adjust observation center misalignment, if any. When the objective lenses differ in parfocal length, it is required to manipulate an adjusting handle for working distance control. The need of providing for objective lenses corresponding to associated magnifications incurs some considerable cost.

In the correction ring objective lens system, the movement of lens groups is carried out mainly for the purpose of correction of spherical aberrations. Thus, the amount of movement of lens groups is slight, and so there is little or no change in viewing magnification.

A problem with the location of the intermediate zoom unit in the rear of the objective lens is that there is no improvement in resolving power because there is no change in numerical aperture even when viewing magnification is increased by zooming. A problem with the provision of a zoom unit between the objective lens and the image-forming lens is that the length of an optical system increases. For this reason, it is impossible to construct any compact microscope system. Another problem is that the position of an exit pupil varies largely with zooming.

The arrangement wherein a zoom type image-forming lens is located in the rear of an objective lens as set forth in JP-A 06-18784 is inferior in aberration performance to a conventional objective lens due to a limited number of fields. This arrangement is also less than satisfactory in terms of compactness and system performance due to the increased length of the zoom lens unit.

U.S. Pat. Nos. 3,671,099, 3,456,998 and 3,421,897 disclose that a zoom lens is located in the rear of an objective lens. However, these conventional arrangements are inferior to current objective lenses in terms of optical performance, e.g., aberration performance such as chromatic aberrations, spherical aberrations and flatness of field as well as specifications such as numerical aperture and the number of fields. Such optical performance cannot meet current market needs.

On the other hand, a stereomicroscope is lower in magnification and much smaller in numerical aperture than a microscope. At 10 magnifications as an example, the microscope has a numerical aperture of as high as 0.25 to 0.4 whereas the stereomicroscope has a numerical aperture of as low as about 0.1. Thus, when cells, etc. are observed, there is a noticeable difference in resolution. In short, the stereomicroscope is not comparable to a microscope objective lens in terms of resolution. In addition, afocal zooming for stereomicroscopes causes an exit pupil position to vary largely, and so place some considerable restrictions on systems when an illumination optical unit or a phototaking optical unit is incorporated therein.

A conventional variable-power method causes an exit pupil position to vary largely, resulting in performance deterioration such as shading and ambient light attenuation, shading in coaxial, vertical-incident illumination optical systems, etc. or restrictions on phototaking optical systems.

Thus, the optical systems so far proposed in the art have no similar numerical aperture and optical performance as in microscope objective lenses, and fail to provide any compact arrangements capable of increasing numerical aperture depending on magnification changeover with no need of selecting objective lenses.

SUMMARY OF THE INVENTION

In view of such problems with the prior art, an object of the present invention is to provide a compactly constructed microscope zoom objective lens system which has good-enough optical performance and a zoom ratio of at least 3. Another object of the present invention is to provide a microscope zoom objective lens system having a numerical aperture varying with a magnification change. Yet another object of the present invention is to provide a microscope zoom objective lens system with an exit pupil kept substantially constant (or with fluctuations of an exit pupil position being eliminated or reduced).

According to the first aspect of the present invention, there is provided a microscope zoom objective lens system comprising at least three lens groups; in order from an object, a first lens group having positive refractive power, a second lens group having negative refractive power and a third lens group having positive refractive power, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and said first lens group includes at least one doublet consisting of a positive lens and a negative lens and having positive refractive power, said positive lens satisfying the following condition (1):

$$\nu > 80 \qquad (1)$$

where ν is the Abbe consant of said positive lens.

According to the second aspect of the present invention, there is provided a microscope zoom objective lens system comprising at least three lens groups; in order from an object, a first lens group having positive refractive power, a second lens group having negative refractive power and a third lens group having positive refractive power, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and said second lens group comprises at least two lens components which face each other at concave surfaces.

According to the third aspect of the present invention, there is provided a microscope zoom objective lens system comprising at least three lens groups; in order from an object, a first lens group having positive refractive power, a second lens group having negative refractive power and a third lens group having positive refractive power, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and said third lens group comprises at least two lens components and includes at least one doublet made up of a positive lens and a negative lens.

According to the fourth aspect of the present invention, there is provided a microscope zoom objective lens system comprising at least three lens groups; in order from an object, a first lens group having positive refractive power, a second lens group having negative refractive power and a third lens group having positive refractive power, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and said first lens group comprises a lens component located nearest to an object side of said microscope zoom objective lens system and being a doublet meniscus lens concave on said object side, said doublet meniscus lens consisting of, in order from said object side, a concave lens and a convex lens.

According to the fifth aspect of the present invention, there is provided a microscope zoom objective lens system comprising at least three lens groups; in order from an object, a first lens group having positive refractive power, a second lens group having negative refractive power and a third lens group having positive refractive power while the first lens group comprises a plurality of lens units, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and the following conditions (2) and (3) are satisfied:

$$0.25 \leq D1/D0 \leq 0.7 \qquad (2)$$
$$0.05 \leq D2/D0 \leq 0.5 \qquad (3)$$

where D1 is the overall length of said first lens group, D2 is the amount of movement of said second lens group from said low magnification side to said high magnification side, and D0 is the overall length on the high magnification side of said microscope zoom objective lens system.

According to the sixth aspect of the present invention, there is provided a microscope zoom objective lens system comprising at least three lens groups; in order from an object, a first lens group having positive refractive power, a second lens group having negative refractive power and a third lens group having positive refractive power, wherein:

at least one aspheric surface is included and the following condition (19) is satisfied:

$$NA \geq 0.5 \qquad (19)$$

where NA is the numerical aperture of said microscope zoom objective lens system at a high magnification side thereof.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 1(a) to 1(c) are illustrative in section of the arrangement and optical path for Example 1 of the microscope zoom objective lens system.

FIGS. 2(a) to 2(c) are illustrative in section of the arrangement and optical path for Example 2 of the microscope zoom objective lens system.

FIGS. 4(a) to 4(c) are illustrative in section of the arrangement and optical path for Example 4 of the microscope zoom objective lens system.

FIGS. 11(a) to 11(c) are illustrative in section of the arrangement and optical path for Example 11 of the microscope zoom objective lens system.

FIGS. 13(a) to 13(c) are illustrative in section of the arrangement and optical path for Example 13 of the microscope zoom objective lens system.

FIGS. 14(a) to 14(c) are illustrative in section of the arrangement and optical path for Example 14 of the microscope zoom objective lens system.

DESCRIPTION OF THE PREFERRED EMBODIMENTS

Figure 3A:
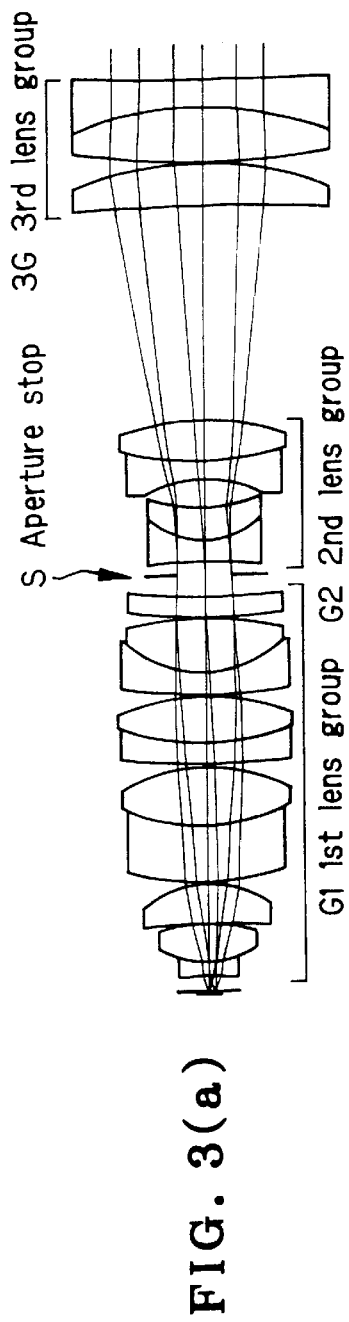
FIGS. 3(a) to 3(c) are illustrative in section of the arrangement and optical path for Example 3 of the microscope zoom objective lens system.

The arrangements of the microscope zoom objective lens system according to the present invention will first be explained, and the inventive examples will then be explained.

In general, a microscope objective lens is designed for the purpose of observing a fine structure. Thus, for the microscope zoom objective lens system of the present invention, too, it is required to make good correction for optical performance on a high magnification side. In particular, it is necessary to make satisfactory correction for spherical aberrations and chromatic aberrations on the high magnification side. It is also necessary to reduce fluctuations of the exit pupil position during zooming.

With these in mind, the present invention provides, according to its first aspect, a microscope zoom objective lens system comprising at least three lens groups; in order from an object, a first lens group having positive refractive power, a second lens group having negative refractive power and a third lens group having positive refractive power, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and said first lens group includes at least one doublet consisting of a positive lens and a negative lens and having positive refractive power, said positive lens satisfying the following condition (1):

$$\nu > 80 \quad (1)$$

where $\nu$ is the Abbe number of the positive lens.

How each lens group acts in the arrangement of the first invention is explained. It is noted that the explanation of each lens group set forth just below goes true for the basic arrangement of the microscope zoom objective lens system of the present invention. It is thus understood that the action of each lens group holds true for the second to fifth inventions and the 23rd invention which will be described later. Although the microscope zoom objective lens system of the present invention is made up of at least three lens groups, it is preferable that it is composed of three or four lens groups.

In the first arrangement of the present invention, the first lens group having positive refractive power collects or condenses light from an object. The second lens group having negative refractive power is designed to move along the optical axis of the system primarily for zooming purposes. When the objective lens system is composed of three lens groups (hereinafter called the three-group construction), the final lens group is defined by the third lens group. Having positive refractive power, this third lens group functions to move on the optical axis, thereby bringing the position of an image plane in each zooming state in agreement with a predetermined position.

When the lens system is made up of four lens groups (hereinafter called the four-group construction), the final lens group is defined by the fourth lens group. The fourth lens group should preferably have negative refractive power. If this fourth lens group, too, is moved along the optical axis, it is then possible to bring the position of the image plane in each zooming state in agreement with the predetermined position. It is also possible to bring the position of the exit pupil substantially in agreement with a predetermined position.

A light beam leaving the final lens group becomes an infinite light beam irrespective of what state zooming takes place in. Then, the image of a sample is formed by an image-forming lens located in the rear of the final lens group, so that it can be observed through an eyepiece lens.

An account is now given of how each lens moves and light rays behave on the low and the high magnification side. On the high magnification side, the second and third lens groups move on the optical axis while the separation between the first lens group and the second lens group becomes wide and the separation between the second lens group and the third lens group becomes narrow. For this reason, an axial ray becomes highest in the first lens group, and becomes low in the second lens group due to its converging action. Then, the axial ray enters the third lens group at a higher position due to the diverging action of the second lens group. Here, if the lens system is of the three-group construction, the axial rays are converted by the converging action of the third lens group into an infinite light beam. If the lens system is of the four-lens group construction, on the other hand, stronger power is given to the third lens group in the four-group construction than to that in the three-group arrangement. Thus, the axial rays are entered by the resultant converging action into the fourth lens group at a lower position, so that they can be converted by the diverging action of the fourth lens group into an infinite light beam.

Upon intersecting the optical axis at the back focus position of the first lens group, off-axis chief rays enter the second lens group wherein they are diverged. Then, the off-axis chief rays leave the third lens group upon converged therein. If the lens system is of the three-group construction, the off-axis chief rays become high in the third lens group. It is understood that when three lens groups are all composed of spherical lenses, the off-axis chief rays become high in the second and third lens groups and low in the first lens group. When the lens system comprises an aspheric lens, the off-axis chief rays become high in the third lens group. An exit pupil is formed at a position where an extension of the off-axis chief rays leaving the third lens group intersects the optical axis.

On the other hand, when the lens system is of the four-group construction, the off-axis chief rays enter the fourth lens group upon converged in the third lens group. Accordingly, the height of the off-axis chief rays becomes highest in the fourth lens group. An exit pupil is formed at a position where an extension of the off-axis chief rays leaving the fourth lens group intersects the optical axis.

On the high magnification side, the off-axis chief rays traverse the optical axis at the back focus position of the first lens group, whether the lens system is of the three-group construction or the four-group construction. For this reason, when the lens system is of the three-group construction, the height of the off-axis chief rays varies in sign between the first lens group and the second or third lens group. In the case of the four-group construction, the height of the off-axis chief rays varies in sign between the first lens group and the second, third or fourth lens group.

On the low magnification side, on the other hand, the second and third lens groups move along the optical axis while the separation between the second lens group and the first lens group becomes narrow and the separation between the second lens group and the third lens group becomes wide. For this reason, the axial rays become highest in the third lens group because they are diverged through the second lens group. Here, when the lens system is of the three-group construction, the axial rays are converged through the third lens group so that they can be converted into an infinite light beam. When the lens system is of the four-group construction, on the other hand, stronger power is given to the third lens group in the four-group construction than to that in the three-group construction. Accordingly, the axial rays are so lowered by the resultant converging action that they can be converted into an infinite light beam upon incidence on the fourth lens group.

When the lens system is of the three-group construction, off-axis chief rays behave as follows. When three lens groups are all composed of spherical lenses, the off-axis chief rays become highest in the third lens group and lowest in the second lens group. When the lens system comprises an aspheric lens, the off-axis chief rays become high in the first and third lens groups and low in the second lens group. As in the case of the high magnification side, the off-axis chief rays intersect the optical axis at the back focus position of the first lens group. For this reason, the height of the off-axis chief rays varies in sign between the first lens group and the second or third lens group.

When the lens system is of the four-group construction, the first lens group of positive refractive power and the second lens group of negative refractive power allow off-axis chief rays to traverse the optical axis on the third lens group side rather than at the back focus position of the first lens group and then enter the third lens group. Upon entering the third lens group through which the off-axis chief rays are converged, they enter the fourth lens group. In this case, the off-axis chief rays become highest in the first lens group.

Thus, when the lens system is of the four-group construction, the off-axis chief rays traverses the optical axis on the third lens group side rather than at the back focus position of the first lens group. For this reason, the height of the off-axis chief rays varies in sign between the first and second lens groups and the third and fourth lens groups.

When the first microscope zoom objective lens system of the invention satisfies condition (1), it is possible to make satisfactory correction for longitudinal chromatic aberration on the high magnification side. The higher the magnification of the inventive objective lens system, the larger the numerical aperture is. This means that, with increasing magnification, axial rays passing through the first lens group become high. Where the axial rays increase in height, chromatic aberrations are likely to occur. According to the first zoom objective lens system of the invention, grave chromatic dispersion is prevented by locating at least one doublet having positive refractive power in the lens group where the axial rays become highest on the high magnification side and using a positive lens conforming to condition (1). With this arrangement, it is possible to make chief correction for aberrations other than chromatic aberration at the subsequent second and third lens groups.

If a vitreous material of anomalous dispersion is used for the negative lens of the doublet, it is then possible to make much better correction for chromatic aberrations.

Unless condition (1) is satisfied, it is then impossible to make better correction for longitudinal chromatic aberration on the high magnification side or make numerical aperture large on the high magnification side. It is thus difficult to achieve a microscope zoom objective lens system of increased practicality.

The second microscope zoom objective lens system of the invention is characterized by comprising at least three lens groups; in order from an object, a first lens group having positive refractive power, a second lens group having negative refractive power and a third lens group having positive refractive power, wherein:

for zooming from a low magnification side to a high magnification side of said microscope zoom objective lens system, said second lens group and said third lens group move along an optical axis of said microscope zoom objective lens system while a separation between said first lens group and said second lens group becomes wide and a separation between said second lens group and said third lens group becomes narrow, and said second lens group comprises at least two lens components which face each other at concave surfaces.

In the second microscope zoom objective lens system of the invention, the second lens group comprises at least two lens components. To obtain strong power at the second lens group, one lens component is located in opposite to another lens component at concave surfaces. Consequently, it is possible to reduce the Petzval sum of the system in general and improve the flatness of an image plane on the high magnification side in particular.

It is here noted that when two such lens components do not face each other at concave surfaces, one lens component should include a lens having positive refractive power or be defined by a meniscus lens of negative refractive power. When the lens of positive refractive power is used, the overall negative refractive power of the second lens group becomes too weak to reduce the Petzval sum. When the meniscus lens of negative refractive power is used, the radii of curvature of surfaces facing away from the opposite surfaces become small, and off-axis aberrations produced at the second lens group become worse.

The third microscope zoom objective lens system of the invention is characterized by comprising at least three lens groups; in order from an object, a first lens group having positive refractive power, a second lens group having negative refractive power and a third lens group having positive refractive power, wherein:

for zooming from a low magnification side to a high magnification side of said microscope zoom objective lens system, said second lens group and said third lens group move along an optical axis of said microscope zoom objective lens system while a separation between said first lens group and said second lens group becomes wide and a separation between said second lens group and said third lens group becomes narrow, and said third lens group comprises at least two lens components and further includes at least one doublet made up of a positive lens and a negative lens.

In the third microscope zoom objective lens system of the invention, the separation between the second lens group and the third lens group becomes wide and the separation between the first lens group and the second lens group becomes narrow on the low magnification side thereof. For this reason, axial rays and off-axis chief rays become higher in the third lens group than in the second lens group. The third lens group is thus made up of two or more lens components with a doublet located in one of these lens components. Spherical aberrations and chromatic aberrations produced at the first and second lens groups are corrected primarily by this doublet, and coma, astigmatism and distortion are corrected by the remaining lens groups.

When the third lens group is composed of one single lens group, it is difficult to make satisfactory correction for spherical aberrations, coma and astigmatism on the low magnification side.

The fourth microscope zoom objective lens system of the invention is characterized by comprising at least three lens groups; in order from an object, a first lens group having positive refractive power, a second lens group having negative refractive power and a third lens group having positive refractive power, wherein:

for zooming from a low magnification side to a high magnification side of said microscope zoom objective zoom lens system, said second lens group and said third lens group move along an optical axis of said microscope zoom objective lens system while a separation between said first lens group and said second lens group becomes wide and a separation between said second lens group and said third lens group becomes narrow, and said first lens group comprises lens components wherein a lens component located nearest to an object side of said microscope zoom objective lens system comprises a doublet meniscus lens concave on said object side, said doublet consisting of, in order from an object side thereof, a concave lens and a convex lens.

Located nearest to the object side of the first lens group, the doublet meniscus lens component is made up of, in order from the object side thereof, a concave lens and a convex lens. The cemented surface of this doublet meniscus lens, because of having negative refractive power, has an action on raising the height of axial rays. The light beam is then converted by the subsequent lens group into a convergent light beam, which in turn enters the second lens group. In other words, the flatness of an image plane can be improved by the action provided in the first lens group to reduce the Petzval sum. With the doublet meniscus lens concave on the object side, it is also possible to reduce off-axis aberrations such as coma and astigmatism. Thus, the doublet meniscus lens is effective for making correction for aberrations on the high and the low magnification side.

The fifth microscope zoom objective lens system of the invention is characterized by comprising at least three lens groups or, in order from an object, a first lens group having positive refractive power, a second lens group having negative refractive power and a third lens group having positive refractive power while the first lens group comprises a plurality of lens units, wherein:

for zooming from a low magnification side to a high magnification side of said microscope zoom objective lens system, said second lens group and said third lens group move on an optical axis of said microscope zoom objective lens system while a separation between said first lens group and said second lens group becomes wide and a separation between said second lens group and said third lens group becomes narrow, and the following conditions (2) and (3) are satisfied:

$$0.25 \leq D1/D0 \leq 0.7 \qquad (2)$$

$$0.05 \leq D2/D0 < 0.5 \qquad (3)$$

where D1 is the length of said first lens group, D2 is the amount of movement of said second lens group from said low magnification side to said high magnification side, and D0 is the length of said microscope zoom objective lens system.

Here, when the lens system is of the four-group construction, the first lens group includes a doublet, and the fourth lens group, too, moves along the optical axis for zooming from the low to the high magnification side. Then, the following conditions (2') and (3') should be satisfied instead of conditions (2) and (3).

$$0.25 \leq D1/D0 \leq 0.5 \quad (2')$$

$$0.15 \leq D2/D0 \leq 0.3 \quad (3')$$

If the aforesaid arrangement satisfies condition (2'), it is then possible to allow for a space to receive a lens group for making satisfactory correction for optical performance especially on the high magnification side.

By satisfying condition (3'), it is further possible to ensure a sufficient space for allowing the second lens group having zooming action to move on the optical axis, thereby obtaining a zoom ratio of 3 or greater.

When the upper limit of 0.5 in condition (2') is exceeded, it is easy to make correction for aberrations on the high magnification side; however, it is impossible to obtain any high zoom ratio because of a decrease in the amount of movement of the second lens group with zooming. When the lower limit of 0.25 in condition (2') is not reached, the length of the first lens group becomes too short to make sufficient correction for spherical aberrations and longitudinal chromatic aberration on the high magnification side.

When the lower limit of 0.15 in condition (3') is not reached, the amount of movement of the second lens group with zooming becomes small. Consequently, any high zoom ratio cannot be obtained. Otherwise, the negative refractive power of the second lens group becomes strong, and so aberration performance on the high and the low magnification side becomes worse. When the upper limit of 0.3 in condition (3') is exceeded, the amount of zooming movement of the second lens group increases. Consequently, the amount of movement of the third and fourth lens groups for making correction for the image plane with zooming becomes extremely small, and so any high zoom ratio cannot be obtained.

When at least one aspheric surface is used in the first lens group, it is desired to use the aspheric surface for the convex surface and satisfy the following conditions (2) and (3") instead of the aforesaid conditions (2) and (3).

$$0.25 \leq D1/D0 \leq 0.7 \quad (2)$$

$$0.05 \leq D2/D0 \leq 0.35 \quad (3)$$

By configuring at least one convex surface in the first lens group as an aspheric surface, it is possible to make satisfactory correction for spherical aberrations on the high magnification side. The reason is that since, on the high magnification side, light rays having a large numerical aperture should be converged at a short distance, spherical aberrations produced at the first lens group become largest. Accordingly, the provision of the aspheric surface in the first lens group is most effective for correction of spherical aberrations. It is thus possible to achieve a microscope zoom objective lens system having an ever-larger numerical aperture and an ever-longer working distance.

If the aforesaid arrangement satisfies condition (2), it is then possible to allow for a space to receive a lens group for making satisfactory correction for optical performance especially on the high magnification side. By satisfying condition (3'), it is further possible to ensure a sufficient space for allowing the second lens group having zooming action to move on the optical axis, thereby obtaining a zoom ratio of 4 or greater.

It is understood that when the first lens group comprises no aspheric surface or the lenses in the first lens group are all spherical lenses, it is difficult to make correction for spherical aberrations. This in turn renders it difficult to achieve higher zoom ratios, larger numerical aperture and longer working distances with the same number of lenses. An attempt to make satisfactory correction for spherical aberrations on the high magnification side only by use of spherical lenses causes the number of lenses in the first lens group to be larger than that in the arrangement using an aspheric lens, resulting in an increase in the length of the microscope zoom objective lens system. The increase in the number of lenses is not preferable because it leads to cost increases.

When the upper limit of 0.7 in condition (2) is exceeded, it is easy to make correction for aberrations on the high magnification side; however, it is impossible to obtain any high zoom ratio because of a decrease in the amount of movement of the second lens group with zooming. When the lower limit of 0.25 in condition (2) is not reached, the length of the first lens group becomes too short to make sufficient correction for spherical aberrations and longitudinal chromatic aberration on the high magnification side.

When the upper limit of 0.35 in condition (3") is exceeded, the amount of zooming movement of the second lens group increases. Consequently, the amount of movement of the third lens group for making correction for the image plane with zooming becomes extremely small, and so any high zoom ratio cannot be obtained. When the lower limit of 0.05 in condition (3") is not reached, the amount of movement of the second lens group with zooming becomes small. Consequently, any high zoom ratio cannot be obtained. Otherwise, the negative refractive power of the second lens group becomes strong, and so aberration performance on the high and low magnification sides becomes worse.

Here, if aspheric surfaces are used not only in the first lens group but also in the second and third lens groups, it is then possible to improve correction for aberrations all over the low-to-high zoom range. Since light rays through the third lens group are at a relatively high position all over the zoom range, the incorporation of an aspheric surface in the third lens group is effective for reducing the number of lenses and making correction for aberrations.

Constructed as in the fourth invention, the sixth microscope zoom objective lens system according to the invention is characterized by satisfying the following conditions (4) and (5):

$$Gn1-Gn2 \geq 0.15 \quad (4)$$

$$0.3 \leq RG2/RG1 \leq 2.0 \quad (5)$$

where RG1 is the radius of curvature of a surface—located nearest to the object side—of the doublet meniscus lens in the first lens group and concave on the object side, RG2 is the radius of curvature of a surface—located nearest to the second lens group side—of the doublet meniscus lens, Gn1 is the refractive index of the concave lens and Gn2 is the refractive index of the convex lens.

When either condition (4) or condition (5) is satisfied, the doublet meniscus lens can be used to make satisfactory correction for spherical aberrations and coma on the high magnification side while the Petzval sum is kept small.

Falling below the lower limit of 0.15 in condition (4) is not preferred because the negative refracting power of the doublet meniscus lens becomes weak and the Petzval sum becomes too large to cause the flatness of an image plane to become worse.

When the upper of 2.0 in condition (5) is exceeded, the negative refracting power of the doublet meniscus lens becomes strong and so the Petzval sum becomes small. However, this is not preferable because axial rays become too high on the high magnification side and so spherical aberrations and coma become worse.

When the lower limit of 0.3 in condition (5) is not reached, the negative refracting power of the cemented surface of the meniscus lens becomes weak and so the Petzval sum becomes large.

When both conditions (4) and (5) are satisfied, it is possible to make much better correction for aberrations.

Constructed as in any one of the first to fourth invention, the seventh microscope zoom objective lens system according to the invention is characterized in that it is of the three-group construction wherein said first lens group is divided into two subgroups, a front first lens subgroup defined by lens elements, which exist between the object and a position where axial rays become highest and a rear first lens subgroups defined by a portion of said first lens group from said lens component where axial rays become highest to a lens component located nearest to said second lens group, said front first lens subgroup comprising at least four lens components or, in order from an object side thereof, a doublet meniscus lens concave on an object side thereof, a single lens having positive refractive power, a doublet consisting of a concave lens and a convex lens and a convex lens having positive refractive power, and said rear first lens subgroup including at least one doublet obtained by cementing together a concave lens and a convex lens as viewed from an object side thereof and having positive refractive power and at least one meniscus lens concave on the second lens group side.

An account is now given of the actions of the thus constructed lens groups. Through the front first lens subgroup, the height of a light beam from an object is raised by the negative refracting power of the cemented surface of the doublet meniscus lens (or the light beam is refracted in a divergent direction). Then, the light beam is refracted by the single lens having positive refractive power in a convergent direction (in such a way that the degree of divergence becomes small). Finally, the light beam is converted into a convergent beam through the doublet consisting of a concave lens and a convex lens and the convex lens having positive refractive power. It is here noted that axial rays become highest at the position of the convex lens having positive refractive power.

Then, the light rays enter the rear first lens subgroup while their height is lowered. Upon incidence on the doublet consisting of a concave lens and a convex lens in this order, the light rays are refracted by the negative refractive power of the cemented surface of the doublet, and then enter the second lens group upon passing through the meniscus lens concave on the second lens group side.

To make satisfactory correction for aberrations all over the zoom range or the high-to-low magnification side, it is required to reduce aberrations produced independently at each of the first to third lens groups. It is then preferable to finally correct the aberrations that remain undercorrected at each group with the whole of the first to third lens groups.

To reduce aberrations, especially spherical aberrations at the first lens group, the seventh invention makes use of the junction of the doublet. More specifically, positive spherical aberrations are generated by imparting negative refractive power to the cemented surfaces of the doublet meniscus lens and doublet in the front first lens subgroup, thereby substantially canceling out negative spherical aberrations generated at the remaining lens component in the front first lens subgroup. Moreover, positive spherical aberrations are generated by the negative refractive power of the cemented surface of the doublet in the rear first lens subgrous, so that the spherical aberrations that remain undercorrected in the front first lens subgroup are corrected to keep small the amount of spherical aberrations produced throughout the first lens group.

Coma produced at the front first lens subgroup may be corrected by the meniscus lens in the rear first lens subgroup. By allowing the front and rear first lens subgroups in the first lens group to produce aberrations in opposite directions, it is thus possible to make satisfactory correction for both spherical aberrations and coma on the high magnification side. In addition, by locating three doublets in the first lens group, it is possible to make satisfactory correction for longitudinal chromatic aberrations on the high magnification side.

Moreover, the aforesaid surface having negative refractive power acts in such a way as to reduce the Petzval sum, so that the flatness of the image plane can be improved.

Constructed as in any one of the first to fourth inventions, the eighth microscope zoom objective lens system of the invention is characterized by satisfying the following condition (6):

$$-2.5 \leq F1/F2 \leq 0.2 \tag{6}$$

where F1 is the focal length of the first lens group and F2 is the focal length of the second lens group.

Condition (6) is provided to allow the zoom objective lens system to have compact construction and keep satisfactory aberration performance all over the zoom range or on the low-to-high magnification side. This condition represents the focal length ratio between the first lens group and the second lens group. By satisfying this condition, it is possible to construct a zoom objective lens system having high zoom ratios and a length of about 55 mm to about 110 mm somewhat longer than that of a conventional zoom objective lens system. It is also possible to keep satisfactory aberration performance in the low-to-high zoom range.

When the lower limit of −2.5 in condition (6) is not reached, the power of the second lens group having negative refractive power becomes strong, and so axial performance on the high magnification side and off-axis performance on the low magnification side become worse. This is because when the second lens group has strong negative refractive power, light rays are strongly bent at the second lens group. Consequently, coma is produced on the low magnification side while spherical aberrations are produced on the high magnification side, resulting in a failure in keeping satisfactory performance on the high and the low magnification side. An attempt to improve aberration performance in this state results in an increase in the number of lenses and, hence, an increase in the length of a zoom objective lens system. Aberration performance on the high magnification side is so sacrificed that it is impossible to keep satisfactory performance on both the low magnification side and the high magnification side. In addition, an increase in the number of lenses gives rise to cost increases. On the contrary, an attempt to reduce the increase in the number of lenses in the second lens group gives rise to an increase in the number of lenses in the third lens group. This in turn causes a decrease in the space available to move the second lens group on the optical axis and so it is impossible to achieve any high zoom ratio.

When the upper limit of −0.2 in condition (6) is exceeded, the power of the second lens group having negative refractive power becomes too weak to achieve any high zoom ratio. An unreasonable attempt to achieve high zoom ratios offers another problem that the length of the zoom objective lens system becomes too long. In addition, the negative refractive power of the second lens group becomes small, and so the flatness of the image plane becomes worse due to undercorrection of field curvature on the high magnification side.

Constructed as in the eighth invention, the ninth microscope zoom objective lens system of the is characterized by satisfying the following condition (7):

$$-7.5 \leq F3/F2 \leq -1.5 \quad (7)$$

where F2 is the focal length of the second lens group and F3 is the focal length of the third lens group.

This condition, indicative of the focal length ratio between the second lens group and the third lens group, is provided to achieve a compact zoom objective lens system having a length of about 55 mm to about 110 mm while keeping high zoom ratios. By satisfying this condition (7), it is possible to make satisfactory correction for aberrations on the high-to-low magnification side and achieve high zoom ratios.

When the lower limit of −7.5 in condition (7) is not reached, the power of the second lens group having negative refractive power becomes strong. For this reason, axial performance on the high magnification side and off-axis performance on the low magnification side become worse as is the case with condition (6). The reason is that since light rays are strongly bent through the second lens group, coma is generated on the low magnification side and spherical aberrations are generated on the high magnification side and, hence, it is impossible to keep any satisfactory performance on both the high and the low magnification side. In addition, the height of light rays through the third lens group is raised on the low magnification side, resulting in an increase in the outer diameters of lenses.

When the upper limit of −1.5 in condition (7) is exceeded, the power of the second lens group having negative refractive power becomes too weak to achieve any high zoom ratio, as is the case with condition (6). An unreasonable attempt to achieve high zoom ratios offers another problem that the length of the zoom objective lens system becomes too long. In addition, the negative refractive power of the second lens group becomes small, and so the flatness of the image plane becomes worse due to undercorrection of field curvature on the high magnification side.

It is here noted when the lens system is of the three-group construction, it is more preferable to satisfy the following condition (7') instead of condition (7).

$$-6.5 \leq F3/F2 \leq -2.0 \quad (7')$$

If conditions (6) and (7) or condition (6) and (7') are simultaneously satisfied, it is then possible to achieve a more compact zoom objective lens system having an increased zoom ratio. This compact zoom objective lens system is more preferable because aberrations can be better corrected all over the range from the low to the high magnification side.

Constructed as in any one of the first to fourth inventions, the tenth microscope zoom objective lens system according to the invention is characterized in that t is of the three-group construction wherein for low-to-high zooming, said first lens group moves along the optical axis in an opposite direction to that of movement of said second lens group, so that a shorter working distance can be achieved.

Since the working distance for low-to-high zooming is so reduced that the height of axial rays through the first lens group can be lowered. It is thus possible to make better correction for spherical aberrations and longitudinal chromatic aberrations in particular. In this arrangement, too, the zooming role is primarily allocated to the second lens group and the action to keep constant changes in the image plane position with zooming is taken by the third lens group. The action to make correction for aberrations on the low-to-high magnification side is performed as in any one of the aforesaid zoom objective lens systems.

Constructed in the fifth invention, the eleventh microscope zoom objective lens system according to the invention is characterized by satisfying the following condition (8):

$$0 < FB1/D1 \leq 0.4 \quad (8)$$

where FB1 is a distance from the lens surface in the first lens group, which surface is located nearest to the second lens group side, to the back focus position of the first lens group.

By satisfying condition (8), it is possible to locate the exit pupil position of the zoom objective lens system nearer to the high magnification side. In short, since the separation between the first lens group and the second lens group becomes narrow on the low magnification side, the second lens group moves over the back focus position of the first lens group to the object side. For this reason, the back focus positions of two lens groups defined by the first and second lens groups move over the back focus position of the first lens group to the third lens group side. Since the second lens group has negative refractive power, the exit angle of a chief ray incident on the second lens group becomes moderate. Leaving the third lens group (or optionally the lens group subsequent thereto), the chief ray travels toward the image side, and the exit pupil position of the system on the low magnification side is located in a direction away from the first lens group, so that it can be positioned nearer to that on the high zoom size.

In addition, since the angle of the chief ray leaving the second lens group becomes moderate, the height of an off-axis light beam through the third lens group (or optionally the lens group subsequent thereto) can be so lowered that off-axis aberrations on the low magnification side can be satisfactorily corrected. This arrangement is preferable because the effective diameter of the third lens group (or optionally the lens group subsequent thereto) can be so reduced that the construction of the moving lens groups can be made compact.

When the lower limit of 0 in condition (8) is not reached, the back focus position of the first lens group is located within the first lens group, and so the chief ray incident on the second lens group becomes high on the low magnification side. Since the second lens group has negative refractive power, a light beam emanating from the second lens group becomes high and, hence, the angle of the chief ray becomes sharp. For this reason, it is difficult to make correction for aberration performance on the low magnification side. In addition, the exit pupil position is located nearer to the first lens group on the low magnification side, resulting in considerable fluctuations of the exit pupil position. When the upper limit of 0.4 in condition (8) is exceeded, the positive refractive power of the first lens group becomes weak, and so it is impossible to make satisfactory correction for aberrations on the high magnification side or it is difficult to achieve zooming to the high magnification side and keep large numerical aperture.

Constructed as in the fifth or eleventh invention, the twelfth microscope zoom objective lens system according to the invention is characterized by being of the four-group construction wherein the following conditions (9) and (10) are satisfied:

$$-3 \leq F3/F2 \leq -1.5 \tag{9}$$

$$3 \leq F4/F2 \leq 6 \tag{10}$$

where F2 is the focal length of the second lens group, F3 is the focal length of the third lens group, and F4 is the focal length of the fourth lens group.

By satisfying conditions (9) and (10), it is possible to keep satisfactory optical performance all over the zooming range while reducing the amount of zooming movement of the third and fourth lens groups and maintaining high zoom ratios. In addition, this microscope zoom objective lens system can be made compact in such a way as to have a length of about 60 mm to about 90 mm and set the exit pupil at a substantially constant position on both the low and the high magnification side. It is understood that the fact that the inventive microscope zoom objective lens system can be shorter in length than a conventional zooming means is also preferable in view of the system and operability of an associated microscope.

When the upper limit of −1.5 in condition (9) is exceeded, the negative refractive power of the second lens group becomes too weak to achieve any high zoom ratio. An unreasonable attempt to achieve high zoom ratios offers another problem that the length of the zoom objective lens system becomes too long. In addition, the negative refractive power of the second lens group becomes weak, and so the flatness of the image plane becomes worse due to undercorrection of field curvature on the high magnification side. When the positive refractive power of the third lens group becomes excessively strong, aberration performance becomes worse on the low magnification side and the exit pupil is located nearer to the first lens group.

When the lower limit of −3 in condition (9) is not reached, the power of the second lens group having negative refractive power becomes strong. For this reason, axial performance on the high magnification side and off-axis performance on the low magnification side become worse. The reason is that since light rays are strongly bent through the second lens group, coma is generated on the low magnification side and spherical aberrations are generated on the high magnification side and, hence, it is impossible to keep any satisfactory performance on both the high and the low magnification side. In addition, the height of light rays through the third lens group is raised on the low magnification side, resulting in an increase in the outer diameters of lenses. Otherwise, since the positive refractive power of the third lens group becomes moderate, an attempt to keep high zoom ratios results in an increase in the total length of the zoom objective lens system.

When the lower limit of 3 in condition (10) is not reached, the negative refractive power of the second lens group becomes too weak to achieve any high zoom ratio, as is the case with condition (4). An unreasonable attempt to achieve high zoom ratios offers another problem that the length of the zoom objective lens system becomes too long. In addition, the negative refractive power of the second lens group becomes weak, and so the flatness of the image plane becomes worse due to undercorrection of field curvature on the high magnification side, and on the low magnification side the exit pupil is located at a position nearer to the first lens group. Alternatively, when the negative refractive power of the fourth lens group becomes excessively strong, off-axis aberration performance becomes worse on the low magnification side.

When the upper limit of 6 in condition (10) is exceeded, the power of the second lens group having negative refractive power becomes strong. For this reason, axial performance on the high magnification side and off-axis performance on the low magnification side become worse, as is the case with condition (4). The reason is that since light rays are strongly bent through the second lens group, coma is generated on the low magnification side and spherical aberrations are generated on the high magnification side and, hence, it is impossible to keep any satisfactory performance on both the high and the low magnification side. In addition, the height of light rays through the third lens group is raised on the low magnification side, resulting in an increase in the outer diameters of lenses.

Constructed as in the twelfth invention, the thirteenth microscope zoom objective lens system according to the invention is characterized in that the lens subgroup in the first lens group, which subgroup is located nearest to the object side, is made up of a doublet meniscus lens consisting of a negative lens concave on the object side and a positive lens The doublet component located nearest to the object side is constructed of a negative lens concave on the object side thereof and a positive lens, with the cemented surface having negative refractive power. At this cemented surface, the height of axial rays is raised. Then, the axial rays are converted into a converging light beam through the first lens group portion through which the light beam is in turn guided to the second lens group. In short, the effect on reducing the Petzval sum is imparted to within the first lens group, so that the flatness of the image plane can be satisfactorily corrected. This doublet meniscus lens, because of being concave on the object side, is effective to reduce off-axis aberrations such as coma and astigmatism and make correction for aberrations on the high and the low magnification side.

Constructed as in the thirteenth invention, the fourteenth microscope zoom objective lens system according to the invention is characterized in that the first lens group comprises a plurality of doublet components, and any one of said doublet components in the first lens group satisfies the following condition (11):

$$\nu P - \nu N \geq 35 \tag{11}$$

where νP is the Abbe number of a positive lens in the doublet component and νN is the Abbe number of a negative lens in the doublet component.

Axial rays through the first lens group become highest during high zooming. By the provision of a plurality of doublet components conforming to condition (11), it is possible to make satisfactory correction for spherical aberrations and longitudinal chromatic aberration. Since an off-axis chief ray becomes highest on the low magnification side, it is also possible to make satisfactory correction for chromatic aberration of magnification.

Further, if a vitreous material of anomalous dispersion is used for the doublet components in the first lens group, it is then possible to make better correction for chromatic aberrations.

Unless condition (11) is satisfied, it is then difficult to make correction for spherical aberrations and longitudinal chromatic aberration on the high magnification side and chromatic aberration of magnification on the low magnification side.

Constructed as in the twelfth invention, the fifteenth microscope zoom objective lens system according to the invention is characterized in that the second lens group is made up of at least two lens components facing each other at concave surfaces.

With the arrangement wherein the second lens group is made up of two lens components facing each other at concave surfaces, it is possible to impart strong negative refractive power to the second lens group, thereby reducing the Petzval sum. It is thus possible to make satisfactory correction for the flatness of an image plane at the high magnification side in particular. Unless the second lens group is composed of lens components facing each other at concave surfaces, it is then impossible to decrease the Petzval sum because the negative refractive power of the second lens group becomes weak. Otherwise, off-axis aberrations at the second lens group become worse because of a decrease in the radii of curvature of the surfaces of the lens components except the opposite concave surfaces.

Constructed as in the twelfth invention, the sixteenth microscope zoom objective lens system according to the invention is characterized in that the fourth lens group is at least made up of a doublet meniscus lens component consisting of a positive lens convex on the third lens group side and a negative lens, and a lens component concave on the third lens group side and having negative refractive power.

The doublet meniscus lens located on the third lens group side, because of acting substantially just as a Gauss lens, is effective for lowering the height of an off-axis light beam to make correction for coma. In addition, the light beam, the height of which is lowered by the doublet meniscus lens, is converted into an infinite light beam by the lens component that is located on the image side, is concave on the third lens group side and has negative refractive power. An off-axis chief ray enters and leaves the doublet meniscus lens at much the same height. In other words, the height and angle of the chief ray incident on the lens component that is concave on the third lens group side and has negative refractive power remain substantially unchanged irrespective of zooming. Consequently, there is no substantial change in the position of an exit pupil between the low and the high magnification side, which exit pupil is defined by the lens component that is concave on the third lens group side and has negative refractive power.

Constructed as in the sixteenth invention, the seventeenth microscope zoom objective lens system is characterized in that the fourth lens group comprises, in order from the third lens group side, a doublet meniscus lens consisting of a positive lens and a negative lens and doublet negative lens consisting of a double-concave lens and a positive meniscus lens, and satisfies the following conditions (12), (13) and (14):

$$0.5 \leq |F4b/F4| \leq 2 \quad (12)$$

$$\nu 4n - \nu 4p \geq 25 \quad (13)$$

$$N4p \geq 1.68 \quad (14)$$

where

F4 is the focal length of the fourth lens group,

F4b is the focal length of the doublet negative lens,

ν4n is the Abbe number of the double-concave lens in the doublet negative lens,

ν4p is the Abbe number of the positive meniscus lens in the doublet negative lens, and N4p is the refractive index of the positive meniscus lens in the doublet negative lens.

By satisfying condition (12) it is possible to reduce astigmatism produced at the fourth lens group on the low magnification side. It is also possible to produce spherical aberrations and coma in a direction opposite to the direction of those produced at the third lens group. In other words, the aberrations are produced in such a direction as to cancel out aberrations produced at the third lens group, so that they can be effectively corrected.

By satisfying condition (13) it is possible to make correction for chromatic aberration of magnification especially on the high magnification side because, on the high magnification side, a chief ray becomes highest in the fourth lens group, as already explained.

By satisfying condition (14) it is possible to make effective correction for coma and astigmatism on the low magnification side and spherical aberrations on the high magnification side, because the radius of curvature of the lens located on the image side is defined by a relatively gentle surface.

Any failure in satisfying condition (12) is not preferable, because correction of coma and spherical aberrations on the low magnification side becomes worse.

Unless condition (13) is satisfied, it is then impossible to make correction for chromatic aberration of magnification on the high magnification side.

Any deviation from condition (14) is not preferable, because the radius of curvature of the positive meniscus lens becomes tight and so spherical aberrations and coma become worse on the low magnification side.

Constructed as in any one of the first to fifth inventions and the eleventh invention, the eighteenth microscope zoom objective lens system according to the invention is characterized in that an aperture stop is located in the vicinity of the back focus position of the first lens group.

A general microscope objective lens has the form of a telecentric optical system wherein an entrance pupil is located at an infinite position and, hence, an aperture stop is located in the vicinity of the back focus position of a first lens group. The microscope zoom objective lens system according to the invention, too, may be constructed in the form of a telecentric optical system wherein an aperture stop is located in the vicinity of the back focus position of the first lens group. It is not necessary to move the aperture stop along the optical axis during zooming, because the aperture stop is located on the object side with respect to the second lens group. Thus, this arrangement is preferable because of no fluctuation of the entrance pupil position.

This arrangement is also preferable because, as is the case with a conventional objective lens system, the numerical aperture and quantity of rim rays can be ensured by varying the diameter of the aperture stop in such a way that the diameter of the aperture stop is increased to increase the numerical aperture on the high magnification side and the diameter of the aperture stop is decreased to decrease the aperture stop on the low magnification side.

It is here noted that when the lens system is of the three-group construction, the second lens group is always located on the image side with respect to the back focus position of the first lens group. Accordingly, it is possible to vary the diameter of the aperture stop depending on zooming, as mentioned above. When the lens system is of the four-group construction, on the other hand, the second lens group is located on the first lens group side with respect to the back focus position of the first lens group in the state where the system is on the high magnification side. To prevent the aperture stop from coming into contact with the second lens group, too, it is effective to make the diameter of the stop variable.

As constructed in any one of the first to fifth inventions and the eleventh to twelfth inventions, the nineteenth microscope zoom objective lens system according to the invention is characterized by satisfying the following condition (15):

$$WD \leq 0.25F1 \quad (15)$$

where WD is the separation between the first lens group and the object, and F1 is the focal length of the first lens group.

More exactly in the nineteenth invention, WD represents the axial separation between the lens surface in the first lens group, which surface is located nearest to the object side and the object. However, it is noted that WD is substantially tantamount to a working distance. In other words, condition (15) is provided to define the working distance.

Especially if condition (15) is satisfied in the eleventh or twelfth invention, it is then possible to make well-balanced correction for a relatively long working distance WD and spherical aberrations on the high magnification side. In addition, if condition (8) is satisfied as explained in conjunction with the eleventh microscope zoom objective lens system, it is then possible to achieve high zoom ratios while fluctuations of the exit pupil position with zooming are reduced.

Exceeding the upper limit of 0.25F1 in condition (15) is not preferred, because the working distance becomes too long and rays incident on the first lens group become too high to make correction for spherical aberrations or to achieve any high zoom ratio.

In conjunction with the first to fourth inventions, it is preferable to satisfy the following condition (15'):

$$WD \leq 0.2F1 \tag{15'}$$

If condition (15') is satisfied in the first to fourth inventions, it is possible to prevent the height of axial rays through the first lens group from being raised to an extreme level on the high magnification side. Consequently, it is possible to decrease the number of lenses in the first lens group and reduce the length thereof, so that spherical aberrations and longitudinal chromatic aberration can be satisfactorily corrected.

When the upper limit of 0.2F1 in condition (15') is exceeded, spherical aberrations and longitudinal chromatic aberration become worse on the high magnification side. To correct spherical aberration deterioration, it is necessary to increase the number of lenses. In addition, the contribution of the second or third lens group to correction of aberrations becomes too large to maintain satisfactory performance in the low-to-high zoom range.

Constructed as in any one of the first to fourth invention and the fifteenth invention, the 20th microscope zoom objective lens system according to the invention is characterized in that the second lens group comprises a doublet meniscus lens consisting of at least one positive lens and at least one negative lens, and satisfies the following conditions (16) and (17):

$$N2P \geq 1.65 \tag{16}$$

$$v2N - v2P \geq 20 \tag{17}$$

where N2P is the refractive index of the positive lens, $v2P$ is the Abbe number of the positive lens, and $v2N$ is the Abbe number of the negative lens.

For the first to fourth inventions, it is preferable to satisfy the following conditions (16) and (17'):

$$N2P \geq 1.65 \tag{16}$$

$$v2N - v2P \geq 25 \tag{17'}$$

By satisfying condition (16), it is possible to increase the radius of curvature of the lens surface in the second lens group, which surface is located on the third lens group side, i.e., define that lens surface with a relatively gentle surface, because the positive lens of the doublet has a high refractive index. Consequently, it is possible to inhibit the occurrence of coma and astigmatism. It is preferable that the refractive index of the negative lens of the doublet should be relatively low, because the Petzval sum can be reduced.

When the lower limit of 1.65 in condition (16) is not reached, the radius of curvature of the lens surface in the second lens group, which surface is located on the third lens group, becomes relatively small and so coma and astigmatism become worse. In addition, there is a large bending—on aberration curves—of longitudinal chromatic aberration and spherical aberrations on the high magnification side.

By satisfying condition (17') it is possible to make satisfactory correction for chromatic aberration of magnification. When the lens system is of the three-group construction, an off-axis chief ray becomes high in the second and the third lens group on the high magnification side. On the low magnification side, the off-axis chief ray becomes high in the third lens group and low in the second lens group. Condition (17') is provided to make satisfactory correction for chromatic aberration of magnification on the high magnification side.

When the lower limit of 25 in condition (17') is not reached, chromatic aberration of magnification becomes worse. When the effect of the third lens group on correction of chromatic aberration of magnification is enhanced, longitudinal chromatic aberration and off-axis aberrations on the low magnification side become worse to such a degree that difficulty is involved in well-balanced correction of them in the low-to-high zoom range.

For the fifteenth invention, on the other hand, it is preferable to satisfy conditions (16') and (17).

$$N2P \geq 1.68 \tag{16'}$$

$$v2N - v2P \geq 20 \tag{17}$$

By satisfying condition (16') it is possible to make the radius of curvature of the lens surface in the second lens group relatively large, which surface is located on the third lens group side, because the positive lens of the doublet has a high refractive index. Consequently, it is possible to obtain a great effect on correction of coma and astigmatism. The negative lens of the doublet should preferably have a relatively low refractive index, because the Petzval sum can be reduced. When the lower limit of 1.68 in condition (16') is not reached, coma and astigmatism become worse because the radius of curvature of the lens surface in the second lens group, which surface is located on the third lens group, becomes small due to the low refractive index of the positive lens of the doublet. There is also a large bending—on aberration curves—of longitudinal chromatic aberration and spherical aberrations on the high magnification side.

By satisfying condition (17) it is possible to make satisfactory correction for chromatic aberration of magnification. When the lens system is of the four-group construction, this is effective for making well-balanced correction for chromatic aberration of magnification on the low and the high magnification side, because a chief ray through the second lens group varies in sign between the high and the low magnification side. When the lower limit of 20 in condition (17) is not reached, chromatic aberration of magnification becomes worse on either one of the high and the low magnification side. It is thus difficult to make correction for chromatic aberration of magnification all over the zoom range.

Constructed as in any one of the first to fourth inventions and the twelfth invention, the 21st microscope zoom objective lens system according to the invention is characterized by satisfying the following condition (18):

$$\nu 3p - \nu 3n \geq 35 \tag{18}$$

where $\nu p3$ is the Abbe number of a positive lens that has the highest Abbe number in the third lens group, and $\nu 3n$ is the Abbe number of a negative lens that has the lowest Abbe number in the third lens group.

In the first to fourth inventions, this lens arrangement enables spherical aberrations and off-axis aberrations on the low magnification side to be effectively corrected. Furthermore, if condition (18) is satisfied, it is then possible to make satisfactory correction for longitudinal chromatic aberration on the low magnification side and chromatic aberration of magnification throughout the low-to-high zoom range. If a vitreous material of anomalous dispersion is used, it is then possible to make much better correction for chromatic aberrations.

When the lower limit of 35 in condition (18) is not reached, it is difficult to make correction for longitudinal chromatic aberration on the low magnification side and chromatic aberration of magnification throughout the low-to-high zoom range. Chromatic aberration of magnification on the high magnification side, too, becomes worse. Consequently, when chromatic aberrations are corrected by other lens group, it is impossible to make well-balanced correction for performance on the low and the high magnification side.

Referring back to the twelfth invention, the third lens group receives a light beam from the second lens group having zooming action. The third lens group is also a moving group serving to keep an image plane constant, and so there is no considerable change in the height of the light beam incident on the third lens group all over the zooming range. Thus, if a microscope zoom objective lens system is constructed as in the twelfth invention, it is then possible to make effective correction for spherical aberrations and off-axis aberrations on the low magnification side.

If the twelfth invention, too, satisfies condition (18) as mentioned above, it is then possible to make satisfactory correction for longitudinal chromatic aberration on the low magnification side and chromatic aberration of magnification throughout the low-to-high zoom range. If a vitreous material of anomalous dispersion is used, it is then possible to make much better correction for chromatic aberrations. When the lower limit of 35 in condition (18) is not reached, it is difficult to make correction for longitudinal chromatic aberration on the low magnification side and chromatic aberration of magnification throughout the low-to-high zoom range. Chromatic aberration of magnification on the high magnification side, too, becomes worse. Consequently, when chromatic aberrations are corrected by other lens group, it is impossible to make well-balanced correction for performance on the low and the high magnification side.

Constructed as in any one of the first to fifth, the eleventh and the twelfth invention, the 22nd microscope zoom objective lens system is characterized by having a zoom ratio of at least 3. It is here noted that the fifth, the eleventh and the twelfth invention have a zoom ratio of at least 4.

The 23rd microscope zoom objective lens system according to the invention is characterized by comprising at least three lens groups or, in order from an object, a first lens group having positive refractive power, a second lens group having negative refractive power and a third lens group having positive refractive power with at least one aspheric surface, and satisfying the following condition (19):

$$NA \geq 0.5 \tag{19}$$

where NA is the numerical aperture of the microscope zoom objective lens system on the high magnification side.

By using at least one aspheric surface in the first lens group, it is possible to increase the zoom ratio or numerical aperture of a microscope zoom objective lens system well corrected for aberration performance on the high magnification side. In addition, it is possible to reduce the length of the first lens group. Moreover, it is possible to achieve high zoom ratios and reduce fluctuations of the exit pupil position with zooming while the amount of movement of the second lens group having zooming action is ensured.

If the lenses in the first lens group are all composed of spherical lenses, several problems arise. An attempt to increase the zoom ratio and numerical aperture results in a large increase in the positive refractive power of the first lens group, which increase incurs considerable spherical aberrations and longitudinal chromatic aberration. For correction of them, it is required to use a large number of lenses in the first lens group. To add to this, the power of the second lens group having zooming action becomes strong and, accordingly, the amount of zooming movement of the second lens group must be much more increased.

However, the increases in the length of the first lens group and the amount of movement of the second lens group make it unavoidably impossible to reduce the length of a microscope zoom objective lens system that is of the four-group construction, because of the location of the third and fourth lens groups. As the length of the first lens group becomes long, it is impossible to reduce fluctuations of the exit pupil position with zooming because the back focus position of the first lens group is located in the first lens group, resulting in deterioration of system performance of an associated microscope. In addition, costs increase as the number of lenses in the first lens group increases.

Constructed as in the fifth or eleventh invention, the 24th microscope zoom objective lens system according to the invention is characterized in that at least one aspheric surface is used in the first or third lens group.

By using at least one aspheric surface in the first lens group, it is possible to increase the zoom ratio or numerical aperture of a microscope zoom objective lens system well corrected for aberration performance on the high magnification side. In addition, it is possible to reduce the length of the first lens group. Moreover, it is possible to achieve high zoom ratios and reduce fluctuations of the exit pupil position with zooming while the amount of movement of the second lens group having zooming action is ensured.

By using at least one aspheric surface in the third lens group, it is possible to achieve a microscope zoom objective lens system generally well corrected for spherical aberrations and off-axis aberrations throughout the low-to-high magnification side. It is also possible to make correction for spherical aberrations and coma on the low magnification side and astigmatism and coma on the high magnification side, because on the low-to-high magnification side, there is no extreme change in the diameter of a light beam incident on the third lens group.

No provision of any aspheric surface in the third lens group offers several problems. An attempt to achieve high zoom ratios or high numerical aperture causes the positive refractive power of the first lens group to become strong and the power of the second lens group having zooming action to become strong as well. Consequently, the diameter of a light beam incident on the third lens group increases with sharp angles of incidence of axial rays and an off-axis chief ray. This in turn leads to an increase in the number of lenses in the third lens group with the result that the length of the microscope zoom objective lens system cannot be reduced.

Constructed as in any one of the first to fifth, the eleventh, the twelfth, the twenty-third and the twenty-fourth invention, the 25th microscope zoom objective lens system according to the invention is characterized by satisfying the following condition (20):

$$0.5 \leq WD \leq 1.5 \text{ (mm)} \tag{20}$$

where WD is the working distance of the microscope zoom objective lens system.

A general microscope objective lens has a working distance of about 0.5 mm at 40 magnifications, and a working distance of about 3 to 10 mm at 10 magnifications although varying with numerical aperture. As the working distance becomes long, there is an increasing chance of avoiding contact of the distal end of the objective lens with a sample and operability becomes better as well. However, too long a working distance makes it difficult to make correction for spherical aberrations. Thus, if the inventive microscope zoom objective lens system is designed to conform to condition (20), it is then possible to achieve high zoom ratios while spherical aberrations on the high magnification side are corrected, and make a sensible tradeoff between ease of sample handling and the avoidance of contact of the distal end of the objective lens with a sample.

Falling below the lower limit of 0.5 mm in condition (20) is not preferred, because the working distance becomes short and so there is a risk of a sample failure due to contact of the sample with the distal end of the objective lens system upon focusing. In addition, sample positioning and ease of sample handling become worse.

As the upper limit of 1.5 mm in condition (20) is exceeded, the working distance becomes so long that ease of sample handling is improved. However, it is difficult to make correction for spherical aberrations on the high magnification side. Otherwise, it is difficult to achieve high zoom ratios.

Constructed as in any one of the first to fifth, the eleventh, the twelfth, the twenty-third and the twenty-fourth invention, the 26th microscope zoom objective lens system according to the invention is characterized by satisfying the following condition (21):

$$55 \leq L \leq 110 \text{ (mm)} \tag{21}$$

where L is the distance from the surface, located in the image side, in a lens group located in, and nearest to, the image side of the microscope zoom objective lens system to an object.

When the lens system is of the three-group construction, the final lens group is defined by the third lens group. When the lens system is of the four-group construction, the final lens group is defined by the fourth lens group.

By satisfying condition (21), the microscope zoom objective lens system and microscope system according to the invention can be constructed with high zoom ratios and in a much more compact form than would be achieved by conventional methods.

When the lower limit of 55 mm in condition (21) is not reached, the space allowed for movement of the second, third and fourth lens groups is too limited to achieve high zoom ratios. When the amount of movement of the second, third and fourth lens groups is ensured so as to achieve high zoom ratios, it is difficult to make correction for spherical aberrations on the high magnification side, because the length of the first lens group becomes short.

Exceeding the lower limit of 110 mm in condition (21) may be preferable for high magnifications or high zoom ratios. However, this is not preferable because any compact microscope system cannot be constructed because of an extended length of the microscope objective lens system.

Constructed as in any one of the first to fifth, the eleventh, the twelfth, the twenty-third and the twenty-fourth invention, the 27th microscope zoom objective lens system according to the invention is characterized by being of the four-group construction wherein the following condition (22) is satisfied:

$$|E1-E2| \leq 15 \text{ (mm)} \tag{22}$$

where E1 is an exit pupil position on the lowest magnification side, and E2 is an exit pupil position on the highest magnification side.

By satisfying condition (22) it is possible to keep the conjugate relation between the pupil position of the microscope zoom objective lens system and the pupil position of an associated illumination optical system substantially constant throughout the low-to-high magnification side. It is also possible to prevent a decrease in the amount of rim light due to shading of off-axis rays, etc. Accordingly, many types of mountable intermediate barrel (accessory) units are so available that the system performance of an associated microscope is greatly improved. It is here noted that the term "exit pupil position" means that of the microscope zoom objective lens system.

When the upper limit of 15 mm in condition (22) is exceeded, shading of light rays by an associated microscope illumination optical system takes place because of large fluctuations of the exit pupil position between the low and the high magnification side. In addition, the system performance of the microscope drops because of a decrease in the amount of rim light when an intermediate barrel unit is used in combination.

Constructed as in the fifth or eleventh invention, the 28th microscope zoom objective lens system according to the invention is characterized in that a lens surface with an aspheric surface provided thereon is configured in such a way that its radius of curvature increases farther off the optical axis.

Referring here to a spherical lens system, when there is a large numerical aperture on the high magnification side, spherical aberrations produced at the first lens group become very large. This is because the inclination of the surface with respect to incident light rays (refractive power) is large. When the aspheric surface is configured in such a way that its radius of curvature becomes gentle farther off the optical axis, the refracting power of the surface becomes weak. Thus, if the aspheric surface is configured in such a way that as the aperture ratio for axial light rays increases, the refracting power of the aspheric surface becomes weak, as in the 28th invention, it is then possible to make effective correction for spherical aberrations.

If the amount of spherical aberrations produced within the first lens group can be reduced by the aspheric effect, then it is possible to reduce opposite spherical aberrations produced at other lens groups, thereby making correction for overall spherical aberrations. This means that the aberration correction capabilities of other lens groups can be used to make correction for aberrations other than spherical aberrations. Thus, it is also possible to make satisfactory correction for aberrations other than spherical aberrations. In addition, tight fabricating tolerances can be lifted off because the amount of aberrations produced at each lens group can be limited.

In connection with the 28th microscope zoom objective lens system according to the invention, it is noted that the second lens group may be constructed as in the second invention as well as in such a way as to satisfy conditions (16) and (17) for the 20th invention.

Constructed as in the 28th invention, the 29th microscope zoom objective lens system according to the invention is characterized by further comprising the fourth lens group wherein said fourth lens group is at least made up of a doublet meniscus lens component consisting of a positive lens convex on the third lens group side and a negative lens and a lens component concave on the third lens group side, and conditions (12) and (13) are satisfied.

The fourth lens group has generally negative refractive power, and is made up of a doublet meniscus lens component consisting of a positive lens convex on the third lens group side and a negative lens, and a lens component concave on the third lens group side and having negative refractive power. The doublet meniscus lens located on the third lens group side acts just like a Gauss lens. At the doublet meniscus lens component, the height of an off-axis light beam is lowered to make effective correction for coma. In addition, since negative refractive power is imparted to the lens component located on the image side and concave on the third lens group side, the light beam, the height of which is lowered by the doublet meniscus lens component, is converted by the lens component having this negative refractive power into an infinite light beam.

Through the doublet meniscus lens, there is little or no change in the angle and height of an off-axis chief ray upon zooming. For this reason, the angle and height of the off-axis chief ray incident on the lens component having negative refractive power is kept substantially constant between the low and the high magnification side, so that fluctuations of the exit pupil position can be reduced on the low and the high magnification side.

The microscope zoom objective lens systems of the invention are now explained with reference to examples.

First, Examples 1 to 10 each of the three-group construction are given. The following Examples 1 to 10 are each directed to a microscope zoom objective lens system designed to be focused at infinity and not to form an image by itself. In other words, each microscope zoom objective lens system is used in combination of an image-forming lens system located on the image side thereof. The image-forming lens system is made up of a doublet consisting of a double-convex lens and a negative meniscus lens concave on the object side thereof and a doublet consisting of a convex lens and a double-concave lens, and has such lens data as described later. It is here noted that this image-formation lens system has a focal length of 179.994 mm.

Aberration diagrams for Examples 1 to 8 are obtained when the image-forming lens system is located in the rear of each microscope zoom objective lens system while the distance from an object to the object-side lens surface of the image-formation lens system is set at 150 mm. Aberration diagrams for Examples 9 and 10 are obtained when the image-formation lens system is located in the rear of each microscope zoom objective lens system while the distance from an object to the object-side lens surface of the image-formation lens system is set at 100 mm. It is here noted that there are little or no aberration changes when the separation between the object and the object-side surface of the image-formation lens system is about 100 mm to about 200 mm.

Examples 1 to 10 of the zoom objective lens system according to the invention will now be explained with reference to the drawings and lens data tables. It is here noted that the data about the image-forming lens system are shown in the lens data tables.

Example 1 is constructed as shown in FIGS. 1(a), 1(b) and 1(c). FIG. 1(a) is illustrative of a sectional lens arrangement and an optical path at 10 magnifications and an NA of 0.25, FIG. 1(b) is illustrative of a sectional lens arrangement and an optical path at 20 magnifications and an NA of 0.4, and FIG. 1(c) is illustrative of a sectional lens arrangement and an optical path at 40 magnifications and an NA of 0.6. This example is constructed of, in order from the object side thereof, a first lens group G1 having positive refractive power, a second lens group G2 having negative refractive power and a third lens group G3 having positive refractive power. Upon zooming from the low to the high magnification side, the second lens group G2 and third lens group G3 move on the optical path while the separation between the first lens group G1 and the second lens group G2 becomes wide and the separation between the second lens group G2 and the third lens group G3 becomes narrow.

Concave on the object side of the system, the first lens group G1 is made up of, in order from the object side thereof, a doublet negative meniscus lens consisting of a double-concave lens and a double-convex lens, a double-convex lens, a doublet positive lens consisting of a negative meniscus lens convex on the object side and a double-convex lens, a double-convex lens, a doublet negative lens consisting of a negative meniscus lens convex on the object side and a double-convex lens and a double-convex lens. The second lens group G2 is made up of a doublet negative lens consisting of a double-concave lens and a negative meniscus lens and a substantially powerless doublet negative meniscus lens consisting of a double-concave lens and a double-convex lens. The third lens group G3 is made up of a double-convex lens and a doublet positive lens consisting of a negative meniscus lens convex on the object side and a double-convex lens.

The zoom objective lens system of Example 1 has 22 fields, a zoom ratio of 10 to 40 and a numerical aperture of 0.25 to 0.6. An aperture stop S is located between the first lens group G1 and the second lens group G2 and in the vicinity of the back focus position of the first lens group G1, and includes a mechanism for varying the diameter of the stop with zooming in such a way as to provide a given numerical aperture.

Example 2 is constructed as shown in FIGS. 2(a), 2(b) and 2(c) illustrative of a sectional lens arrangement and an optical path at 10 magnifications and an NA of 0.25, at 20 magnifications and an NA of 0.4, and at 30 magnifications and an NA of 0.55, respectively. This example is constructed of, in order from the object side thereof, a first lens group G1 having positive refractive power, a second lens group G2 having negative refractive power and a third lens group G3 having positive refractive power. Upon zooming from the low to the high magnification side, the second lens group G2 and third lens group G3 move on the optical path while the separation between the first lens group G1 and the second lens group G2 becomes wide and the separation between the second lens group G2 and the third lens group G3 becomes narrow.

Concave on the object side of the system, the first lens group G1 is made up of a doublet negative meniscus lens consisting of a double-concave lens and a double-convex lens, a double-convex lens, a substantially powerless doublet positive meniscus lens consisting of a double-concave lens and a double convex lens, a double-convex lens, a double-convex lens, a doublet negative lens consisting of a negative meniscus lens convex on the object side and a double-convex lens, and a positive meniscus lens convex on the object side. The second lens group G2 is made up of a cemented lens consisting of a positive meniscus lens concave on the object side, a double-concave lens and a substantially powerless positive meniscus lens. The third lens group G3 is made up of a doublet positive lens consisting of a negative meniscus lens convex on the object side and a double-convex lens.

The zoom objective lens system of Example 2 has 22 fields, a zoom ratio of 10 to 30 and a numerical aperture of 0.25 to 0.55. An aperture stop S is located between the first lens group G1 and the second lens group G2 and in the vicinity of the back focus position of the first lens group G1, and includes a mechanism for varying the diameter of the stop with zooming in such a way as to provide a given numerical aperture.

Figure 3B:
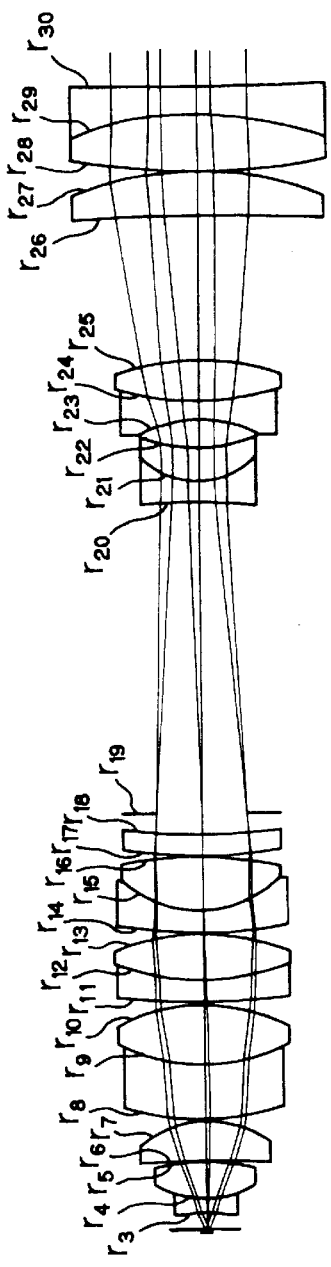
Figure 3C:
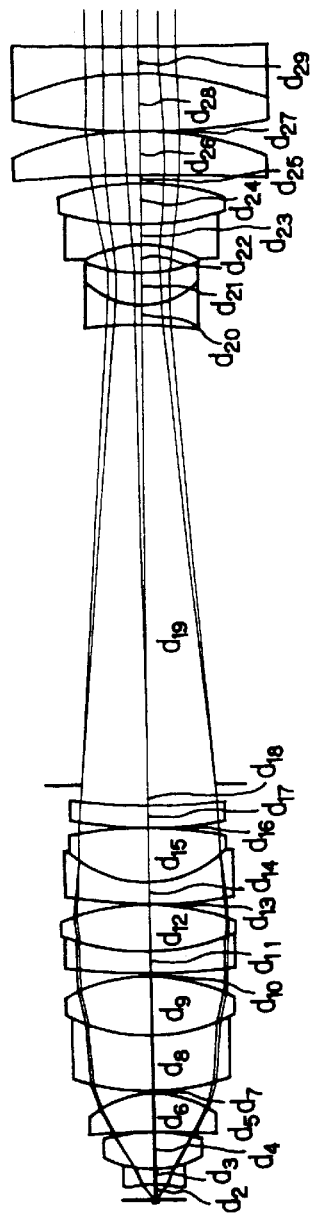

Example 3 is constructed as shown in FIGS. 3(*a*), 3(*b*) and 3(*c*) illustrative of a sectional lens arrangement and an optical path at 20 magnifications and an NA of 0.25, at 20 magnifications and an NA of 0.4, and at 40 magnifications and an NA of 0.6, respectively. This example is constructed of, in order from the object side thereof, a first lens group G1 having positive refractive power, a second lens group G2 having negative refractive power and a third lens group G3 having positive refractive power. Upon zooming from the low to the high magnification side, the second lens group G2 and third lens group G3 move on the optical path while the separation between the first lens group G1 and the second lens group G2 becomes wide and the separation between the second lens group G2 and the third lens group G3 becomes narrow.

Concave on the object side of the system, the first lens group G1 is made up of, in order from the object side thereof, a doublet positive meniscus lens consisting of a double-concave lens and a double-convex lens and having weak refractive power, a double-convex lens, a doublet negative meniscus lens consisting of a double-concave lens and a double-convex lens, a positive meniscus lens having a gentle concave surface on the object side, a double-convex lens, a doublet positive lens consisting of a negative meniscus lens convex on the object side and a double-convex lens, and a negative meniscus lens convex on the object side. The second lens group G2 is made up of a doublet negative lens consisting of a double-concave lens and a positive meniscus lens and a doublet positive meniscus lens consisting of a double-concave lens and a double-convex lens. The third lens group G3 is made up of a positive meniscus lens concave on the object side and a doublet negative meniscus lens having weak power and consisting of a double-convex lens and a double-concave lens.

The zoom objective lens system of Example 3 has 22 fields, a zoom ratio of 10 to 40 and a numerical aperture of 0.25 to 0.6. An aperture stop S is located between the first lens group G1 and the second lens group G2 and in the vicinity of the back focus position of the first lens group G1, and includes a mechanism for varying the diameter of the stop with zooming in such a way as to provide a given numerical aperture.

Example 4 is constructed as shown in FIGS. 4(*a*), 4(*b*) and 4(*c*) illustrative of a sectional lens arrangement and an optical path at 20 magnifications and an NA of 0.25, at 20 magnifications and an NA of 0.4, and at 30 magnifications and an NA of 0.55, respectively. This example is constructed of, in order from the object side thereof, a first lens group G1 having positive refractive power, a second lens group G2 having negative refractive power and a third lens group G3 having positive refractive power. Upon zooming from the low to the high magnification side, the second lens group G2 and third lens group G3 move on the optical path while the separation between the first lens group G1 and the second lens group G2 becomes wide and the separation between the second lens group G2 and the third lens group G3 becomes narrow.

Concave on the object side of the system, the first lens group G1 is made up of, in order from the object side thereof, a doublet positive meniscus lens that consists of a double-concave lens and a double-convex lens and has weak refractive power, a double-convex lens, a doublet negative meniscus lens consisting of a double-concave lens and a double-convex lens, a positive meniscus lens having a gentle concave surface on the object side, a double-convex lens, a doublet positive lens consisting of a negative meniscus lens convex on the object side and a double-convex lens, and a negative meniscus lens convex on the object side. The second lens group G2 is made up of a doublet negative lens consisting of a double-concave lens and a positive meniscus lens and a doublet positive meniscus lens consisting of a negative meniscus lens concave on the object side and a positive meniscus lens. The third lens group G3 is made up of a double-convex lens having a gentle convex surface on the image side and a doublet positive lens having weak power and consisting of a negative meniscus lens having a gentle convex surface on the object side and a double-convex lens.

As in Example 1, an aperture stop S is located between the first lens group G1 and the second lens group G2 and in the vicinity of the back focus position of the first lens group G1, and includes a mechanism for varying the diameter of the stop with zooming in such a way as to provide a given numerical aperture.

The zoom objective lens system of Example 4 has 22 fields, a zoom ratio of 10 to 30 and a numerical aperture of 0.25 to 0.55.

Figure 5A:
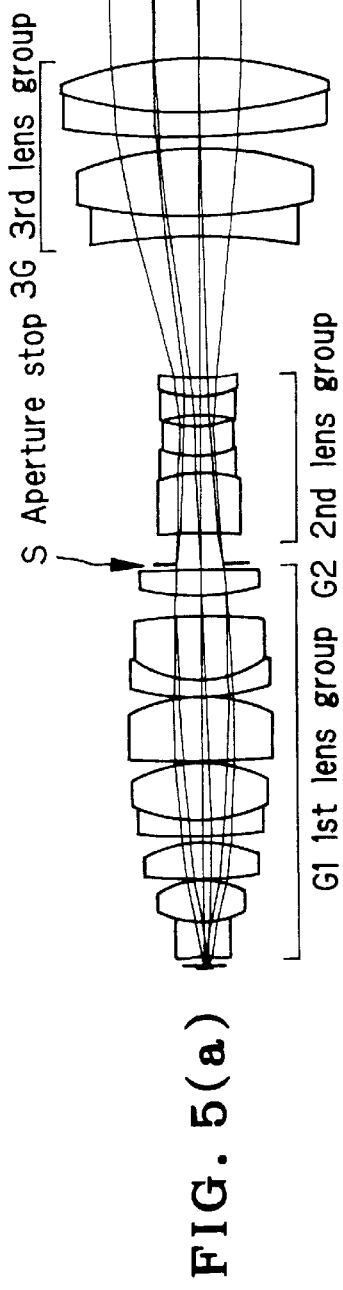
FIGS. 5(a) to 5(c) are illustrative in section of the arrangement and optical path for Example 5 of the microscope zoom objective lens system.
Figure 5B:
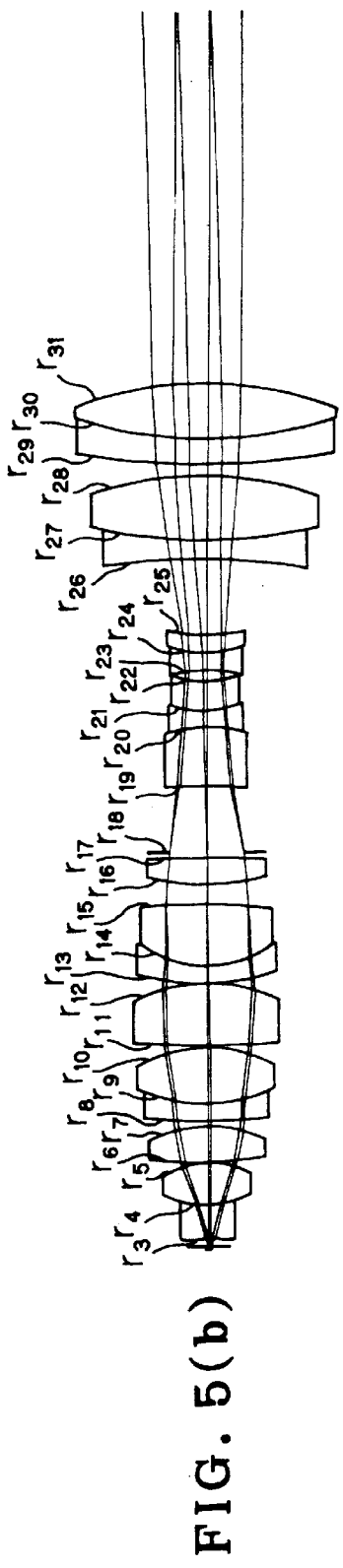
Figure 5C:
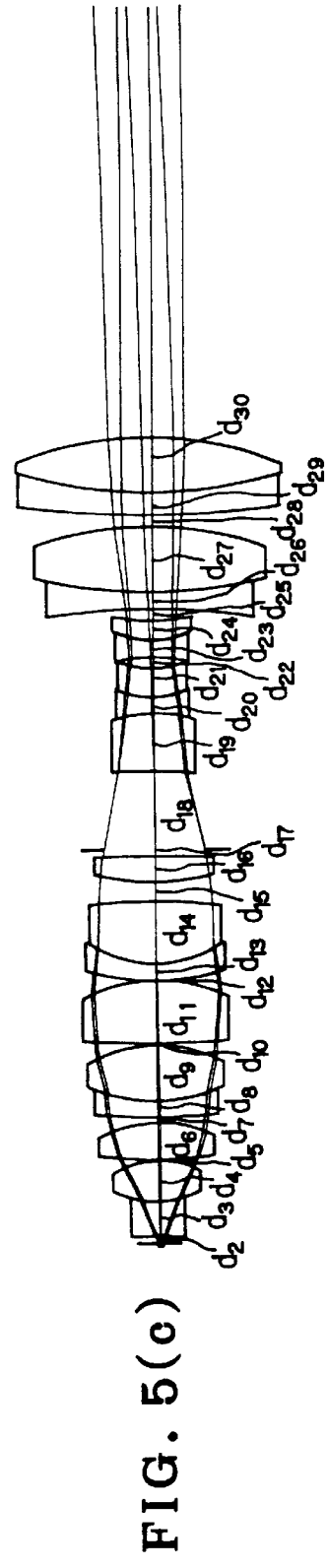

Example 5 is constructed as shown in FIGS. 5(*a*), 5(*b*) and 5(*c*) illustrative of a sectional lens arrangement and an optical path at 10 magnifications and an NA of 0.25, at 20 magnifications and an NA of 0.4, and at 30 magnifications and an NA of 0.55, respectively. This example is constructed of, in order from the object side thereof, a first lens group G1 having positive refractive power, a second lens group G2 having negative refractive power and a third lens group G3 having positive refractive power. Upon zooming from the low to the high magnification side, the second lens group G2 and third lens group G3 move on the optical path while the separation between the first lens group G1 and the second lens group G2 becomes wide and the separation between the second lens group G2 and the third lens group G3 becomes narrow.

Concave on the object side of the system, the first lens group G1 is made up of a doublet negative meniscus lens that consists of a double-concave lens and a double-convex lens, a double-convex lens, a doublet positive lens consisting of a negative meniscus lens convex on the object side and a double-convex lens, a double-convex lens having a gentle convex surface on the object side, a doublet positive lens having gentle power and consisting of a negative meniscus lens convex on the object side and a double-convex lens, and a double convex lens. The second lens group G2 is made up of a cemented negative lens consisting of a positive meniscus lens having a gentle concave surface on the object side, a double-concave lens and a positive meniscus lens and a doublet negative lens consisting of a double-concave lens and a positive meniscus lens. The third lens group G3 is made up of a doublet positive meniscus lens consisting of a double-concave lens and a double-convex lens and a doublet positive lens consisting of a negative meniscus lens convex on the object side and a double-convex lens.

The zoom objective lens system of Example 5 has 22 fields, a zoom ratio of 10 to 30 and a numerical aperture of 0.25 to 0.55. An aperture stop S is located between the first lens group G1 and the second lens group G2 and in the vicinity of the back focus position of the first lens group G1, and includes a mechanism for varying the diameter of the stop with zooming in such a way as to provide a given numerical aperture.

Figure 6A:
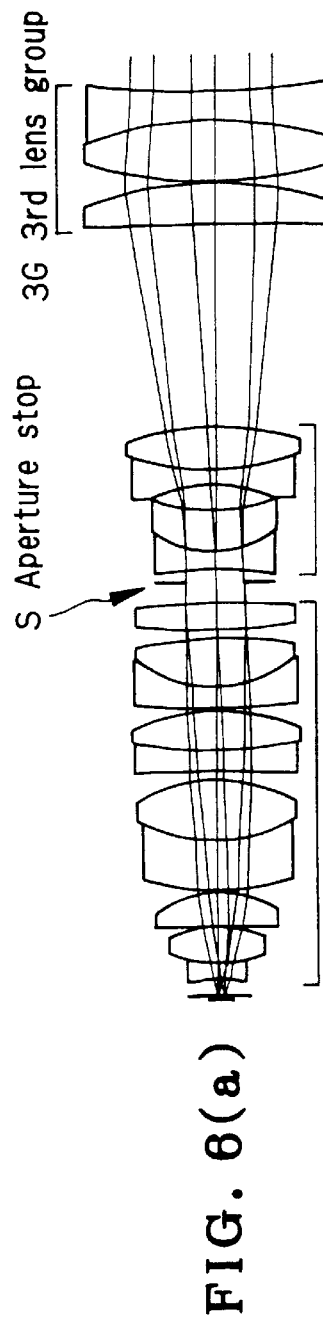
FIGS. 6(a) to 6(c) are illustrative in section of the arrangement and optical path for Example 6 of the microscope zoom objective lens system.
Figure 6B:
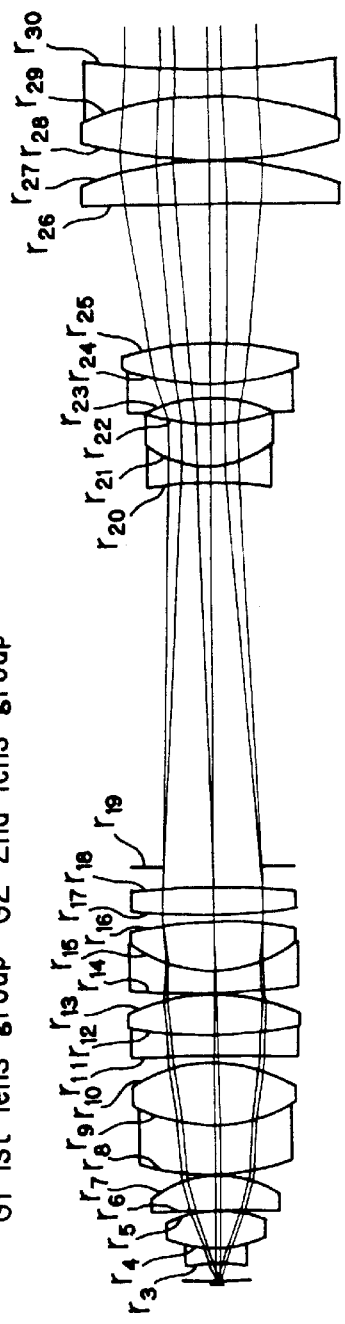
Figure 6C:
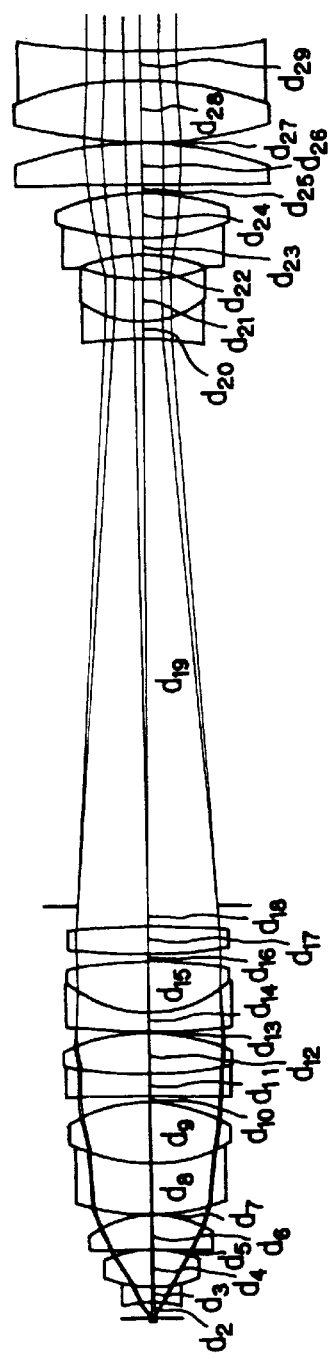

Example 6 is constructed as shown in FIGS. 6(a), 6(b) and 6(c) illustrative of a sectional lens arrangement and an optical path at 10 magnifications and an NA of 0.25, at 20 magnifications and an NA of 0.4, and at 40 magnifications and an NA of 0.6, respectively. This example is constructed of, in order from the object side thereof, a first lens group G1 having positive refractive power, a second lens group G2 having negative refractive power and a third lens group G3 having positive refractive power. Upon zooming from the low to the high magnification side, the second lens group G2 and third lens group G3 move on the optical path while the separation between the first lens group G1 and the second lens group G2 becomes wide and the separation between the second lens group G2 and the third lens group G3 becomes narrow.

Concave on the object side of the system, the first lens group G1 is made up of a doublet negative meniscus lens that consists of a double-concave lens and a double-convex lens, a positive meniscus lens concave on the object side, a doublet positive lens consisting of a negative meniscus lens convex on the object side and a double-convex lens, a doublet positive meniscus lens consisting of a double-concave lens and a double-convex lens, a substantially powerless doublet negative lens consisting of a negative meniscus lens having a gentle convex surface on the object side and a double-convex lens and a double-convex lens. The second lens group G2 is made up of a doublet negative lens consisting of a double-concave lens and a positive meniscus lens and a doublet positive meniscus lens consisting of a double-concave lens and a double-convex lens. The third lens group G3 is made up of a double-convex lens having a gentle convex surface on the object side and a doublet negative meniscus lens consisting of a double-convex lens and a double-concave lens.

The zoom objective lens system of Example 6 has 22 fields, a zoom ratio of 10 to 40 and a numerical aperture of 0.25 to 0.6. An aperture stop S is located between the first lens group G1 and the second lens group G2 and in the vicinity of the back focus position of the first lens group G1, and includes a mechanism for varying the diameter of the stop with zooming in such a way as to provide a given numerical aperture.

Figures 7A, 7B, 7C:
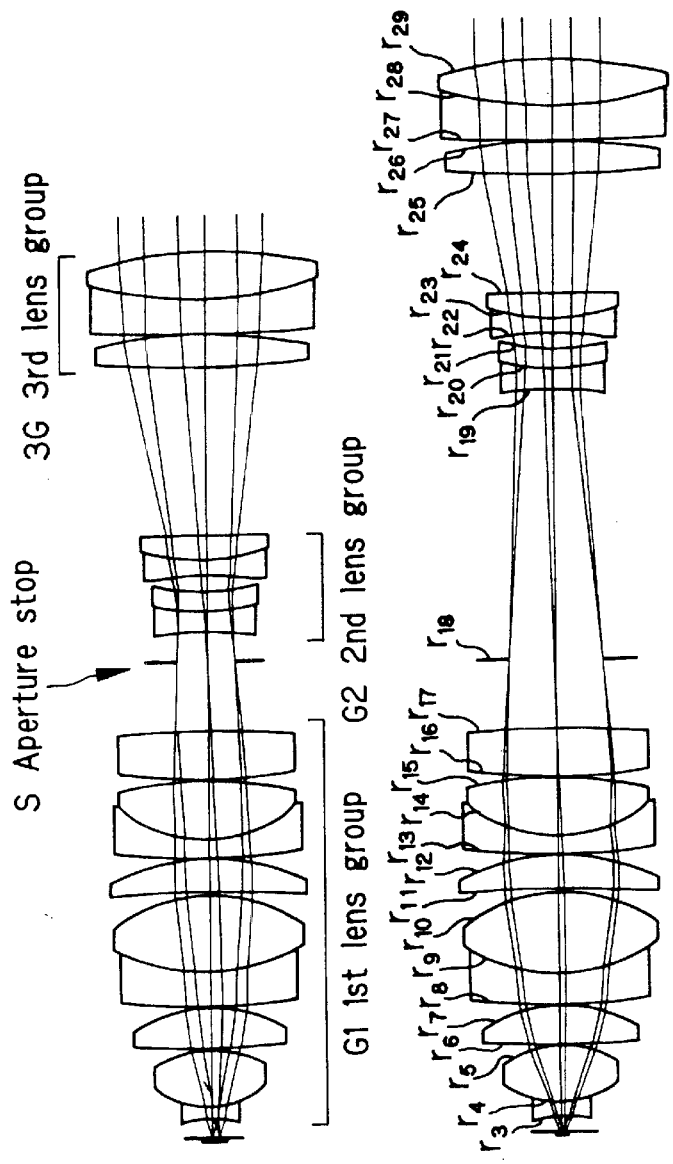
FIGS. 7(a) to 7(c) are illustrative in section of the arrangement and optical path for Example 7 of the microscope zoom objective lens system.

Example 7 is constructed as shown in FIGS. 7(a), 7(b) and 7(c) illustrative of a sectional lens arrangement and an optical path at 10 magnifications and an NA of 0.25, at 20 magnifications and an NA of 0.4, and at 40 magnifications and an NA of 0.6, respectively. This example is constructed of, in order from the object side thereof, a first lens group G1 having positive refractive power, a second lens group G2 having negative refractive power and a third lens group G3 having positive refractive power. Upon zooming from the low to the high magnification side, the first lens group G1, second lens group G2 and third lens group G3 move on the optical axis while the separation between the first lens group G1 and the second lens group G2 becomes wide, the separation between the second lens group G2 and the third lens group G3 becomes narrow, and the first lens group G1 moves on the optical axis in a direction opposite to that of the second lens group G2.

Concave on the object side of the system, the first lens group G1 is made up of, in order from the object side thereof, a doublet negative meniscus lens consisting of a double-concave lens and a double-convex lens, a double-convex lens, a doublet positive lens consisting of a negative meniscus lens convex on the object side and a double-convex lens, a positive meniscus lens concave on the object side, a doublet negative lens having gentle power and consisting of a negative meniscus lens convex on the object side and a double-convex lens, and a double-convex lens. The second lens group G2 is made up of a doublet negative meniscus lens consisting of a double-concave lens and a negative meniscus lens and a substantially powerless doublet negative meniscus lens consisting of a double-concave lens and a double-convex lens. The third lens group G3 is made up of a double-convex lens and a doublet positive lens consisting of a negative meniscus lens convex on the object side and a double-convex lens.

The zoom objective lens system of Example 7 has 22 fields, a zoom ratio of 10 to 40 and a numerical aperture of 0.25 to 0.6. An aperture stop S is located between the first lens group G1 and the second lens group G2 and in the vicinity of the back focus position of the first lens group G1, and includes a mechanism for varying the diameter of the stop with zooming in such a way as to provide a given numerical aperture.

Figure 8A:
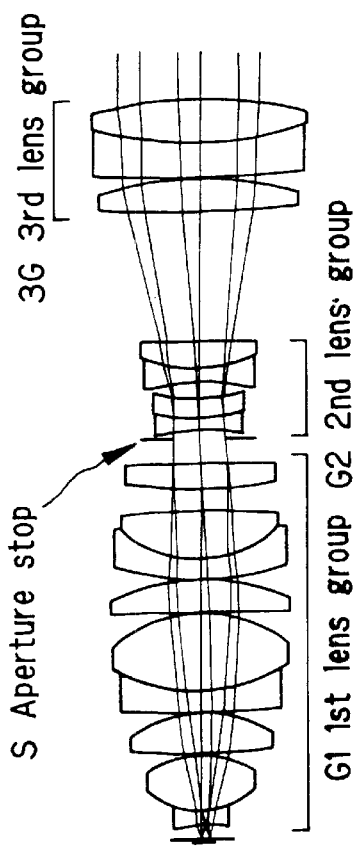
FIGS. 8(a) to 8(c) are illustrative in section of the arrangement and optical path for Example 8 of the microscope zoom objective lens system.
Figure 8B:
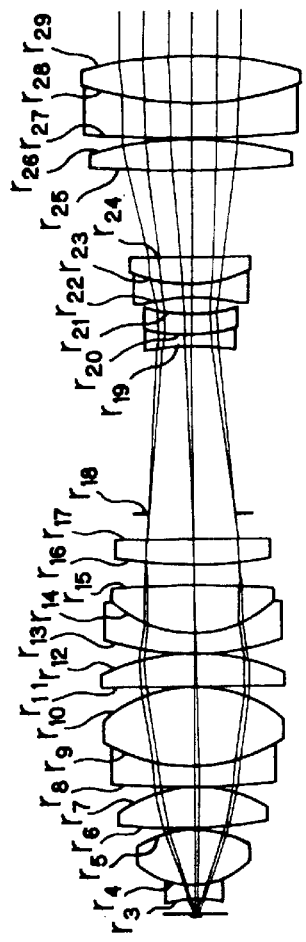
Figure 8C:
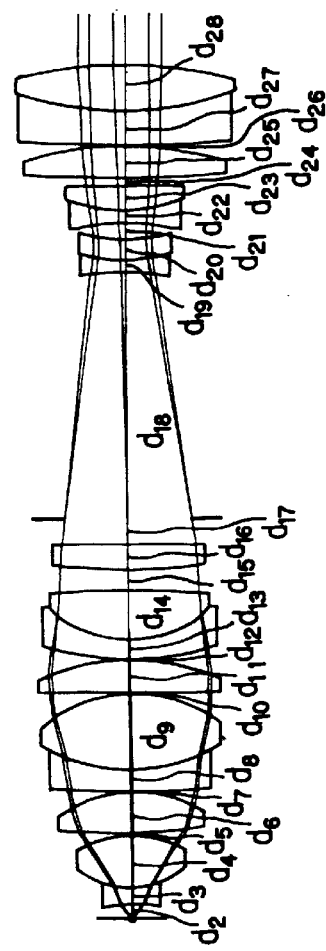

Example 8 is constructed as shown in FIGS. 8(a), 8(b) and 8(c) illustrative of a sectional lens arrangement and an optical path at 10 magnifications and an NA of 0.25, at 20 magnifications and an NA of 0.4, and at 40 magnifications and an NA of 0.6, respectively. This example is constructed of, in order from the object side thereof, a first lens group G1 having positive refractive power, a second lens group G2 having negative refractive power and a third lens group G3 having positive refractive power. Upon zooming from the low to the high magnification side, the second lens group G2 and third lens group G3 move on the optical path while the separation between the first lens group G1 and the second lens group G2 becomes wide and the separation between the second lens group G2 and the third lens group G3 becomes narrow.

Concave on the object side of the system, the first lens group G1 is made up of, in order from the object side thereof, a doublet negative meniscus lens consisting of a double-concave lens and a double-convex lens, a double-convex lens, a doublet positive lens consisting of a negative meniscus lens convex on the object side and a double-convex lens, a double-convex lens having a very gentle convex surface on the object side, a substantially powerless doublet negative lens consisting of a negative meniscus lens convex on the object side and a double-convex lens and a double-convex lens. The second lens group G2 is made up of a doublet negative lens consisting of a double-concave lens and a negative meniscus lens and a doublet negative meniscus lens consisting of a double-concave lens and a double-convex lens. The third lens group G3 is made up of a double-convex lens and a doublet positive lens consisting of a negative meniscus lens convex on the object side and a double-convex lens.

The zoom objective lens system of Example 8 has 22 fields, a zoom ratio of 10 to 40 and a numerical aperture of 0.25 to 0.6. An aperture stop S is located between the first lens group G1 and the second lens group G2 and in the vicinity of the back focus position of the first lens group G1, and includes a mechanism for varying the diameter of the stop with zooming in such a way as to provide a given numerical aperture.

Figures 9A, 9B, 9C:
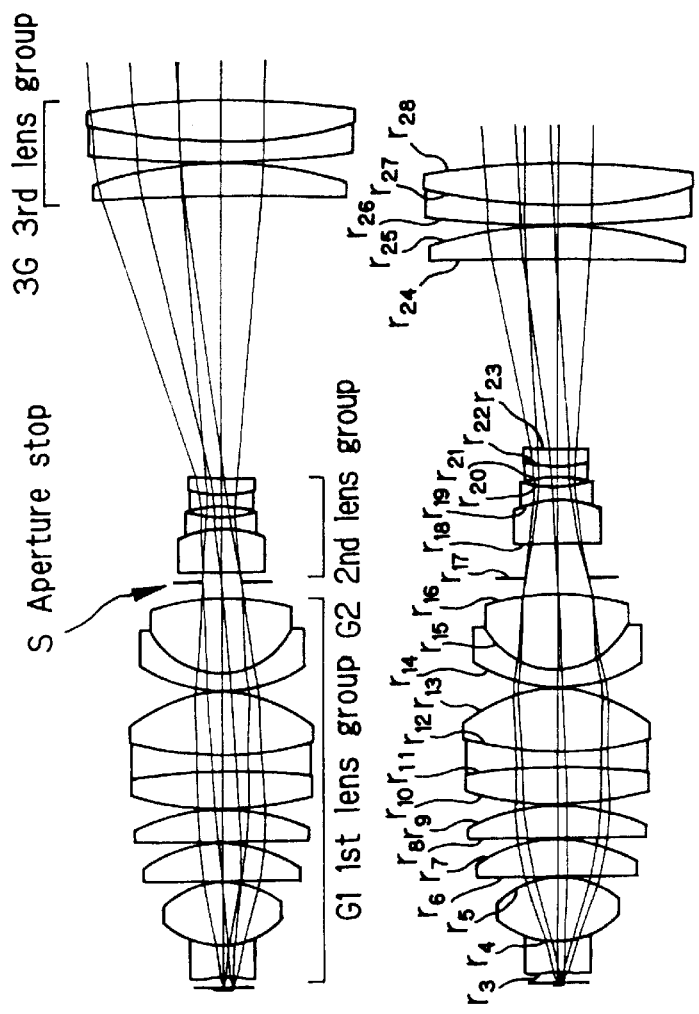
FIGS. 9(a) to 9(c) are illustrative in section of the arrangement and optical path for Example 9 of the microscope zoom objective lens system.

Example 9 is constructed as shown in FIGS. 9(a), 9(b) and 9(c) illustrative of a sectional lens arrangement and an optical path at 10 magnifications and an NA of 0.25, at 20 magnifications and an NA of 0.4, and at 40 magnifications and an NA of 0.7, respectively. This example is constructed of, in order from the object side thereof, a first lens group G1 having positive refractive power, a second lens group G2 having negative refractive power and a third lens group G3 having positive refractive power. Upon zooming from the low to the high magnification side, the second lens group G2 and third lens group G3 move on the optical path while the separation between the first lens group G1 and the second lens group G2 becomes wide and the separation between the second lens group G2 and the third lens group G3 becomes narrow.

Concave on the object side of the system, the first lens group G1 is made up of, in order from the object side, a doublet negative meniscus lens consisting of a double-concave lens and double-convex lens, a planoconvex lens flat on the object side, a double-convex lens having a large radius-of-curvature convex surface on the object side, a triplet positive lens consisting of a double-convex lens, a double-concave lens and a double-convex lens, and a doublet positive lens consisting of a negative meniscus lens convex on the object side and a double-convex lens. The second lens group G2 is made up of a doublet consisting of a positive meniscus lens concave on the object side and a double-concave lens and a doublet consisting of a double-concave lens and a positive meniscus lens convex on the object side. The third lens group G3 is made up of a positive meniscus lens concave on the object side and a doublet consisting of a negative meniscus lens convex on the object side and a double-convex lens.

Three aspheric surfaces are used, one for the convex surface of the planoconvex lens in the first lens group G1, one for the object-side convex surface of the triplet in the first lens group G1, and one for the convex surface—located on the second lens group G2—in the second lens group G2.

In the first lens group G1, one aspheric surface is located at the convex surface of the triplet positive lens having relatively high axial marginal rays on the high magnification side and another is located at the convex surface of the planoconvex lens having relatively high off-axis chief and depending ray, so that spherical aberrations and coma can be effectively corrected on the high magnification side. The triplet positive lens in the first lens group G1 is effective for correction of longitudinal chromatic aberration, etc. The doublet negative meniscus lens located on the object side of the first lens group G1 acts to reduce the Petzval sum, and is effective for correction of aberrations on the high and the low magnification side as well, because the doublet negative meniscus lens is so concave on the object side that off-axis aberrations such as coma and astigmatism can be reduced.

The zoom objective lens system of Example 9 has 22 fields, a zoom ratio of 10 to 40 and a numerical aperture of 0.25 to 0.7. An aperture stop S is located between the first lens group G1 and the second lens group G2 and in the vicinity of the back focus position of the first lens group G1, and includes a mechanism for varying the diameter of the stop with zooming in such a way as to provide a given numerical aperture.

Figure 10A:
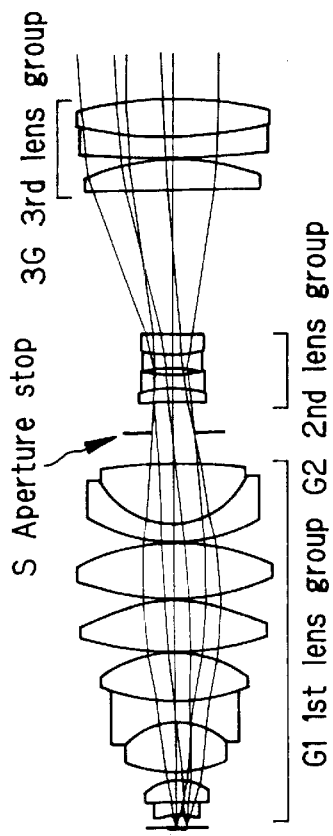
FIGS. 10(a) to 10(c) are illustrative in section of the arrangement and optical path for Example 10 of the microscope zoom objective lens system.
Figure 10B:
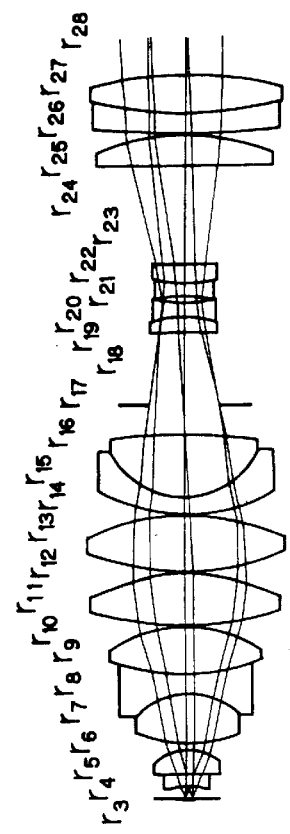
Figure 10C:
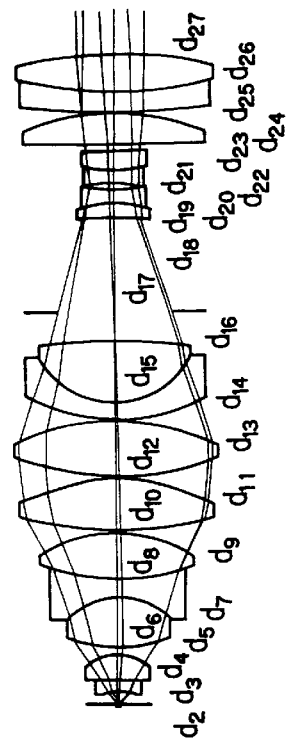

Example 10 is constructed as shown in FIGS. 10(a), 10(b) and 10(c) illustrative of a sectional lens arrangement and an optical path at 10 magnifications and an NA of 0.25, at 20 magnifications and an NA of 0.4, and at 40 magnifications and an NA of 0.65, respectively. This example is constructed of, in order from the object side thereof, a first lens group G1 having positive refractive power, a second lens group G2 having negative refractive power and a third lens group G3 having positive refractive power. Upon zooming from the low to the high magnification side, the second lens group G2 and third lens group G3 move on the optical path while the separation between the first lens group G1 and the second lens group G2 becomes wide and the separation between the second lens group G2 and the third lens group G3 becomes narrow.

The first lens group G1 is made up of, in order from the object side, a doublet negative meniscus lens consisting of a double-concave lens and a double-convex lens, a triplet positive lens consisting of a double-convex lens, a double-concave lens and a double-convex lens, a double-convex lens having an aspheric surface on the second lens group side, a double-convex lens, and a doublet positive lens consisting of a negative meniscus lens convex on the object side and a double-convex lens. The second lens group G2 is made up of a doublet negative lens consisting of a positive meniscus lens concave on the first lens group and a double-concave lens and a doublet negative lens consisting of a double-concave lens and a planoconvex lens convex o the object side. The third lens group G3 is made up of a positive meniscus lens concave on the object side and a doublet positive lens consisting of a negative meniscus lens convex on the object side and a double-convex lens.

The aspheric surface in the first lens group G1 is located where axial marginal rays become high on the high magnification side, so that spherical aberrations can be effectively corrected. As in Example 9, the doublet negative meniscus lens located on the object side of the first lens group G1 acts to reduce the Petzval sum. The triplet positive lens, too, is effective to reduce the Petzval sum and correct coma, because the height of rays is raised by the negative refracting power of the cemented surface of the doublet positive lens.

The zoom objective lens system of Example 10 has 22 fields, a zoom ratio of 10 to 40 and a numerical aperture of 0.25 to 0.65. An aperture stop S is located between the first lens group G1 and the second lens group G2 and in the vicinity of the back focus position of the first lens group G1, and includes a mechanism for varying the diameter of the stop with zooming in such a way as to provide a given numerical aperture.

Aberration diagrams for Examples 1 to 10 of the microscope zoom objective lens system according to the invention are shown as FIGS. 17 to 26. In these aberration diagrams, (a), (b) and (c) are those at the magnifications corresponding to the states (a), (b) and (c) in FIGS. 1 to 10. In each state, "SA", "AS", "DZ" and "DT" represent spherical aberrations, astigmatism, off-axis longitudinal aberrations and distortion, respectively. In these aberration diagrams, "IH" represents image height.

Figure 12A:
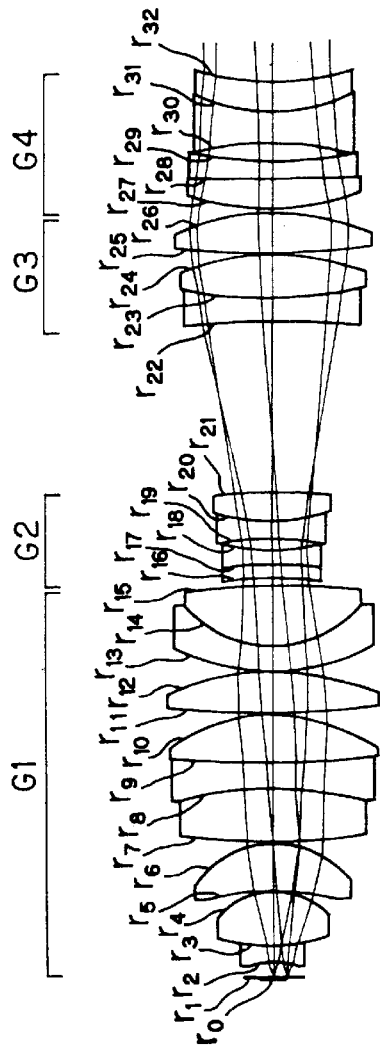
FIGS. 12(a) to 12(c) are illustrative in section of the arrangement and optical path for Example 12 of the microscope zoom objective lens system.
Figure 12B:
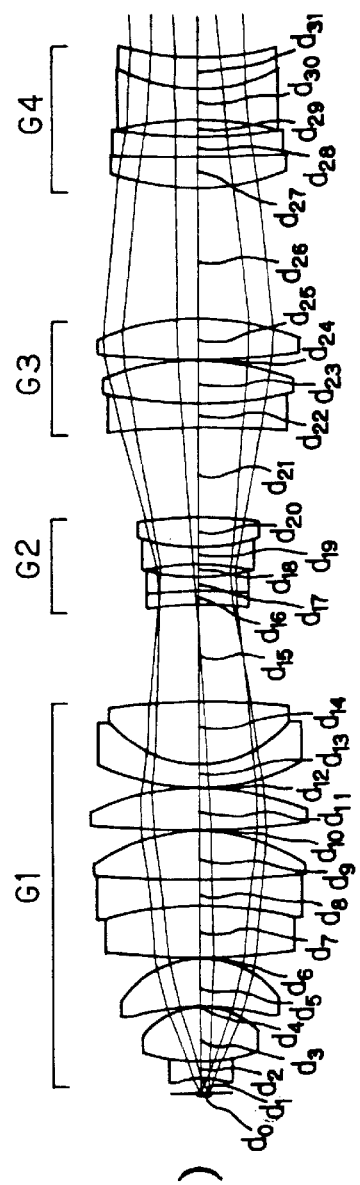
Figure 12C:
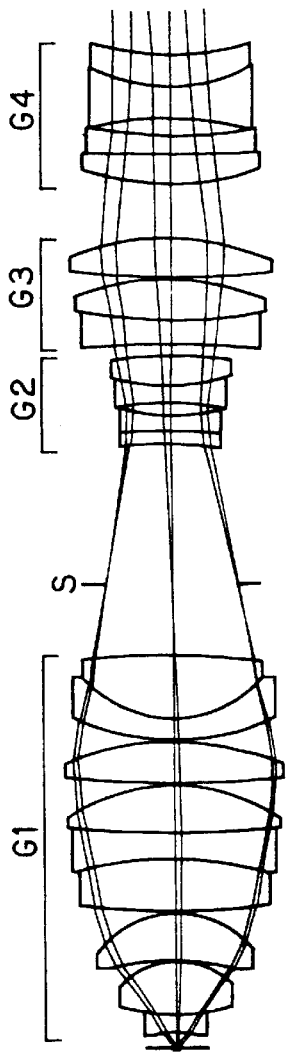
Figure 15A:
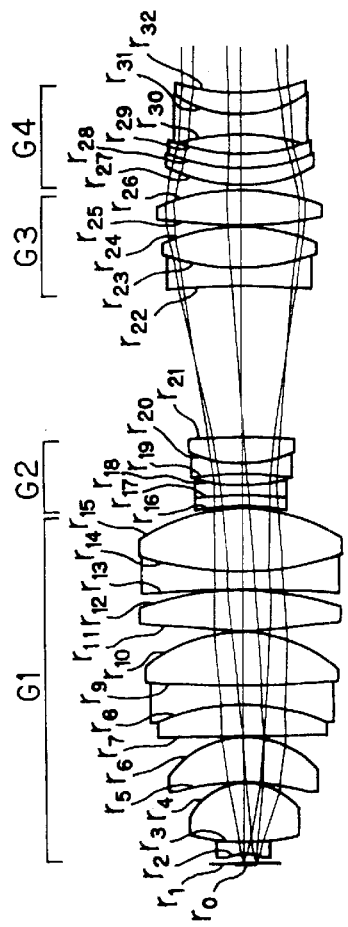
FIGS. 15(a) to 15(c) are illustrative in section of the arrangement and optical path for Example 15 of the microscope zoom objective lens system.
Figure 15B:
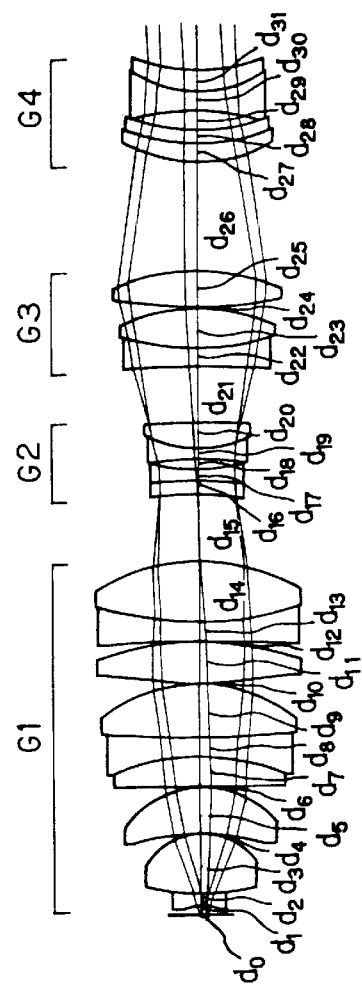
Figure 15C:
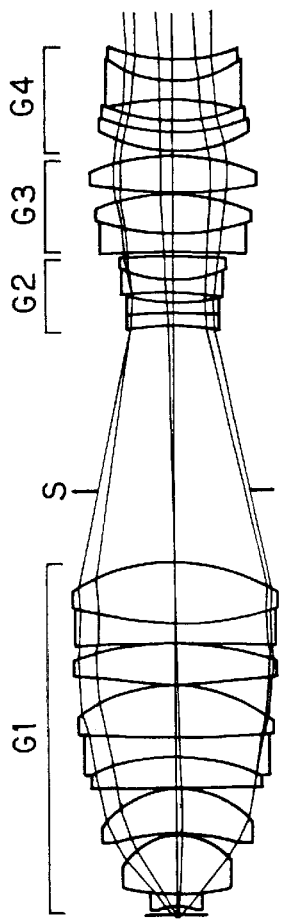

Next, Examples 11 to 15 of the inventive microscope zoom objective lens system of the four-group construction will be explained. Lens data about each example will be described. FIGS. 11 to 15 are illustrative in section of the lens arrangements of Examples 11 to 15. FIGS. 11(a), 11(b) and 11(c) are illustrative in section of optical paths for Example 11 at 10, 20 and 40 magnifications, FIGS. 12(a), 12(b) and 12(c) are illustrative in section of optical paths for Example 12 at 10, 20 and 40 magnifications, FIGS. 13(a), 13(b) and 13(c) are illustrative in section of optical paths for Example 13 at 20, 40 and 80 magnifications, FIGS. 14(a), 14(b) and 14(c) are illustrative in section of optical paths for Example 14 at 10, 20 and 50 magnifications, and FIGS. 15(a), 15(b) and 15(c) are illustrative in section of optical paths for Example 15 at 10, 20 and 40 magnifications.

Figure 16:
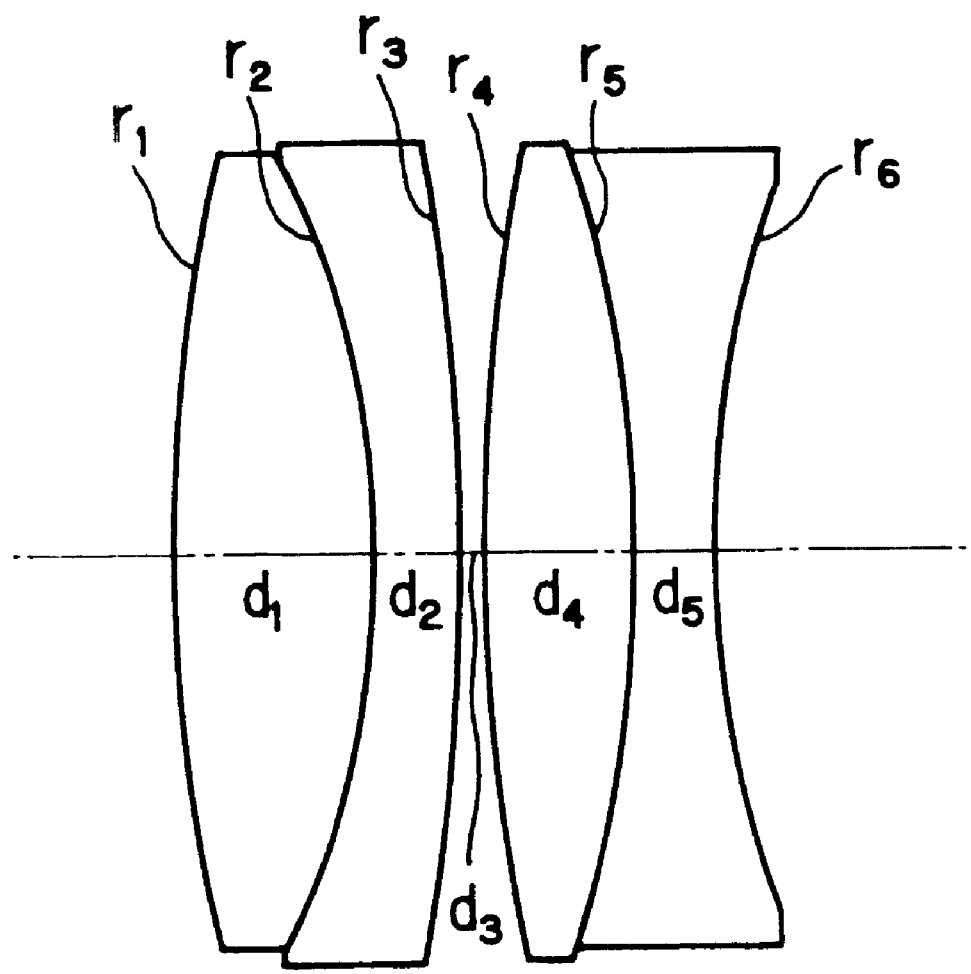
FIG. 16 is illustrative of the arrangement and optical path for an image-formation lens located in the rear of Example 1 to 15 of the microscope zoom objective lens system of the present invention.
Figure 17A:
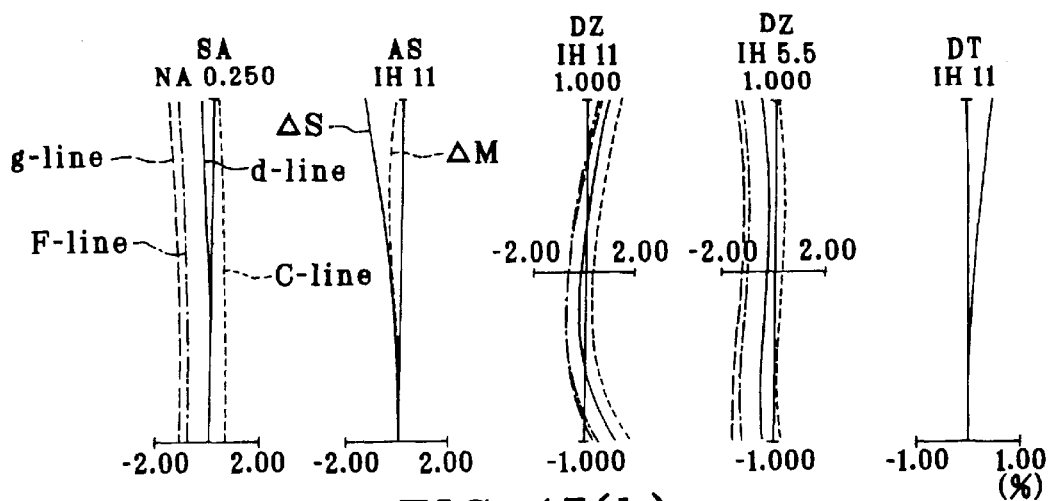
FIGS. 17(a) to 17(c) are aberration diagrams for Example 1.
Figure 17B:
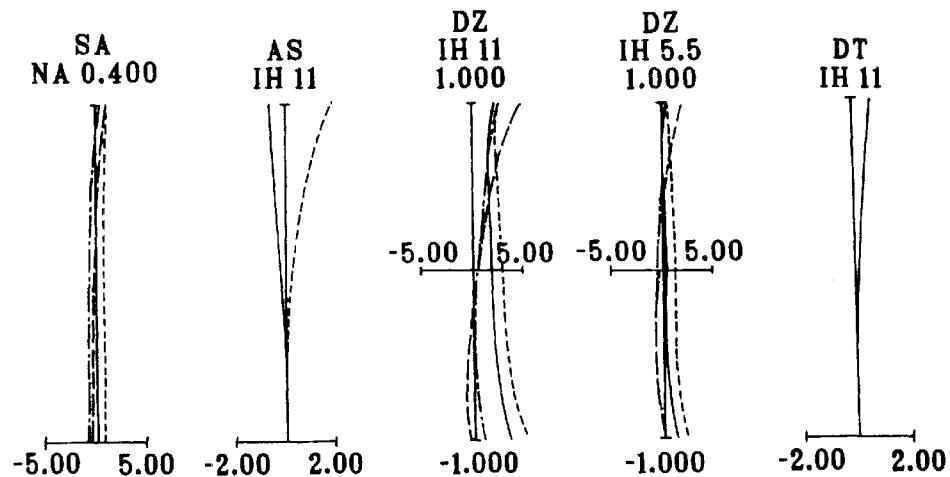
Figure 17C:
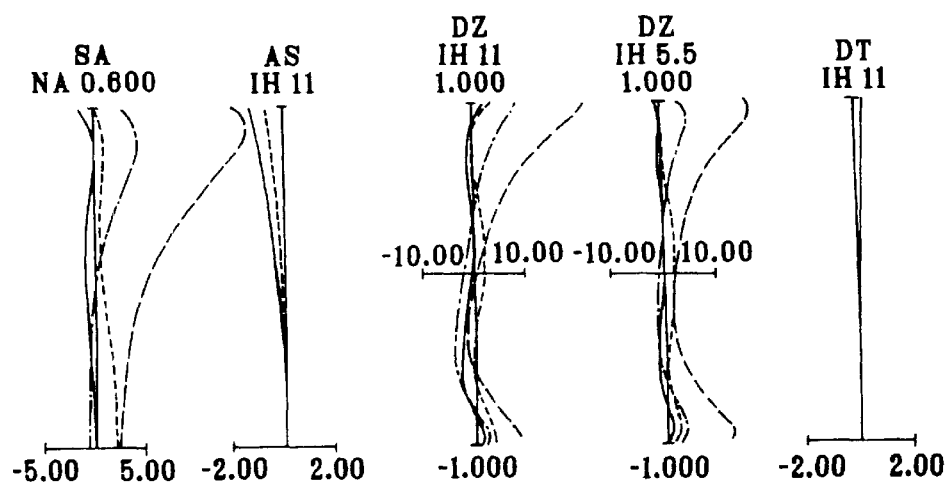
Figure 18A:
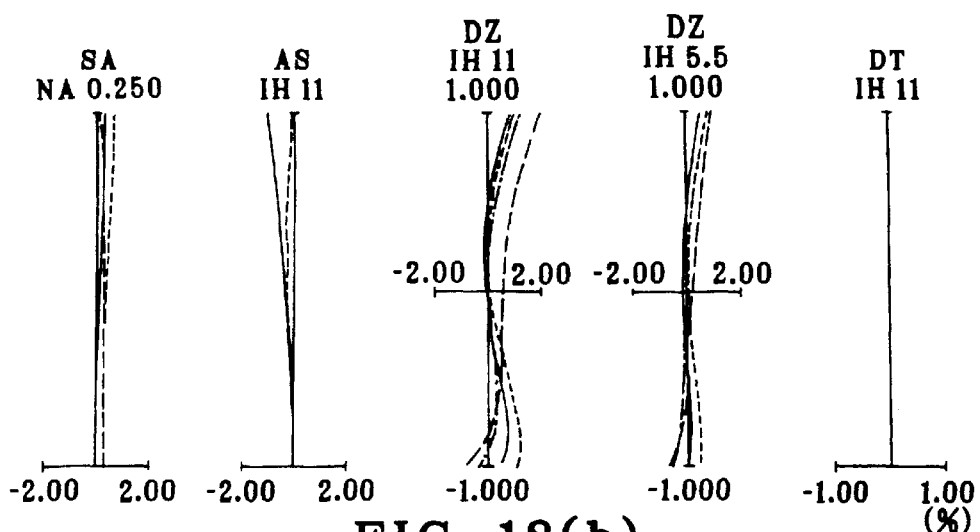
FIGS. 18(a) to 18(c) are aberration diagrams for Example 2.
Figure 18B:
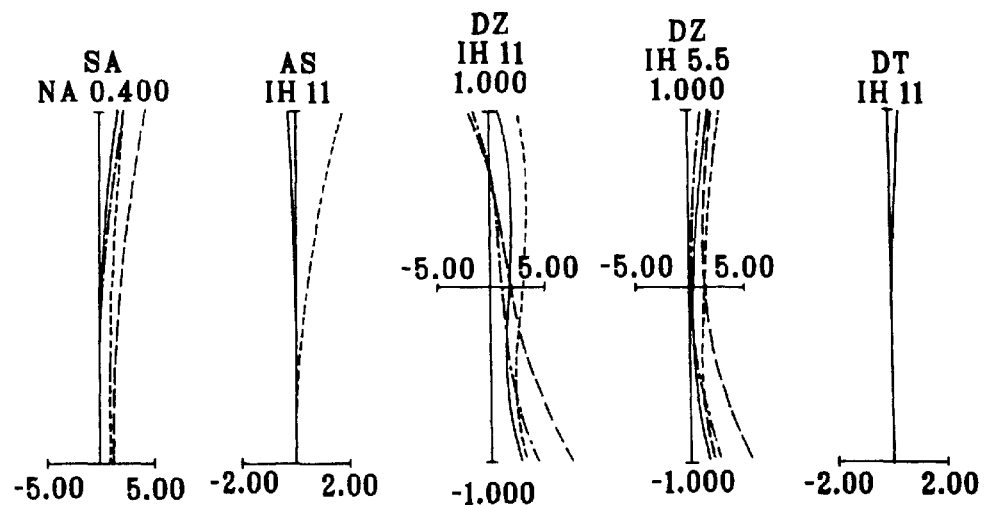
Figure 18C:
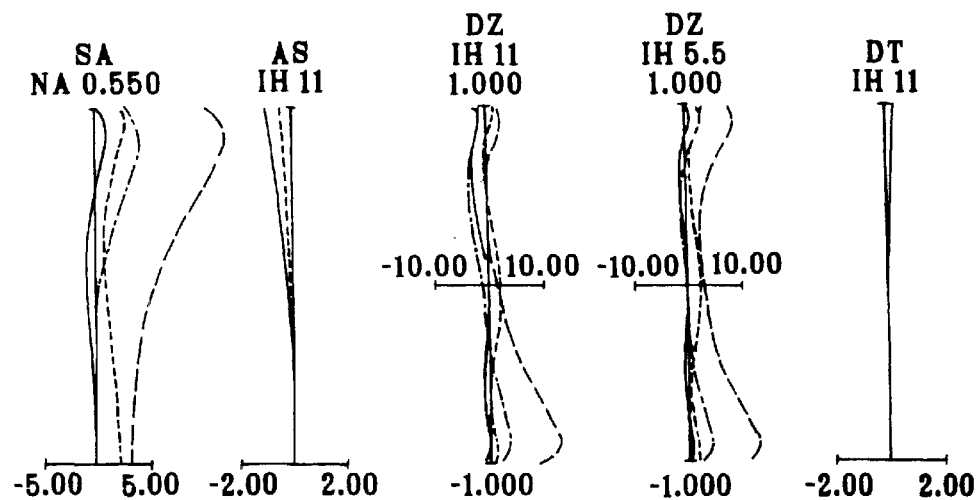
Figure 19A:
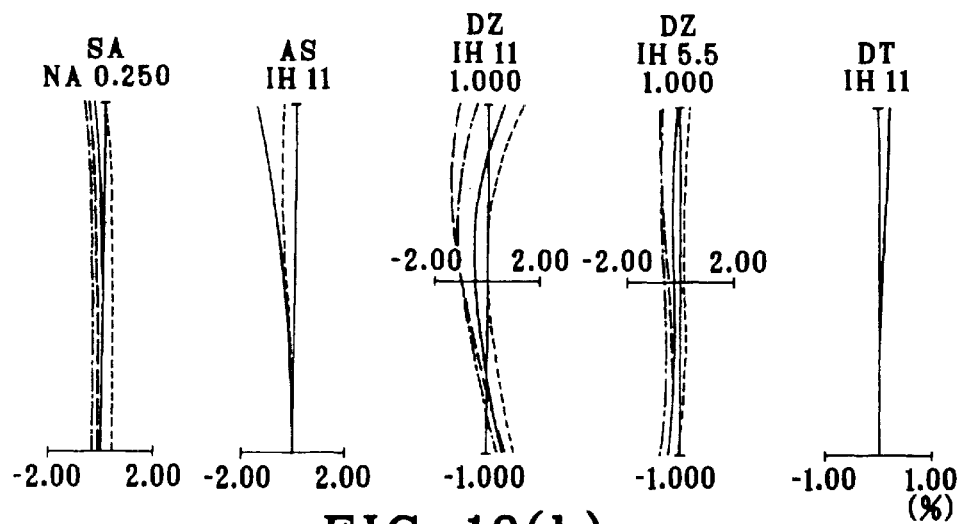
FIGS. 19(a) to 19(c) are aberration diagrams for Example 3.
Figure 19B:
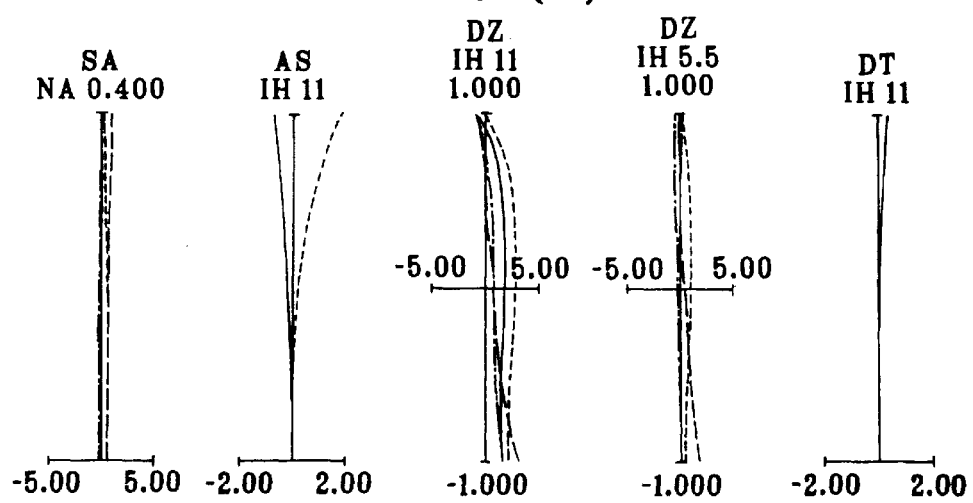
Figure 19C:
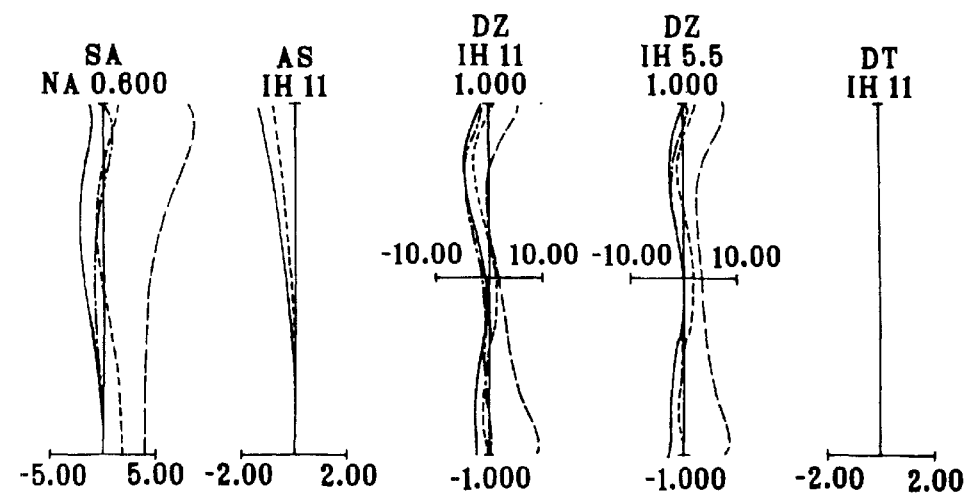
Figure 20A:
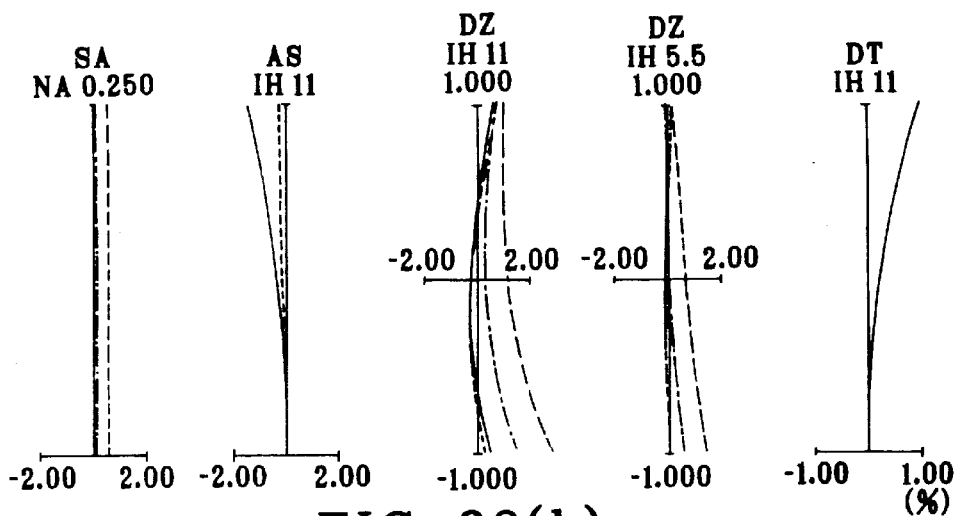
FIGS. 20(a) to 20(c) are aberration diagrams for Example 4.
Figure 20B:
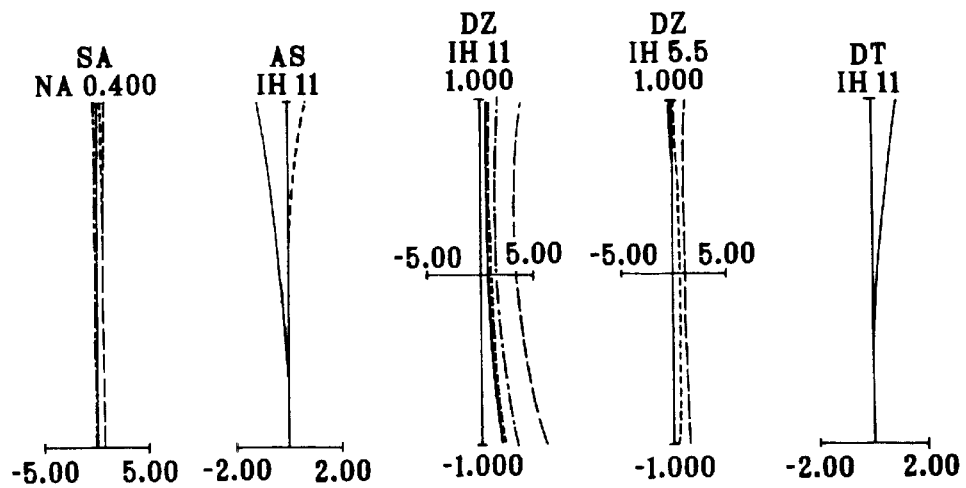
Figure 20C:
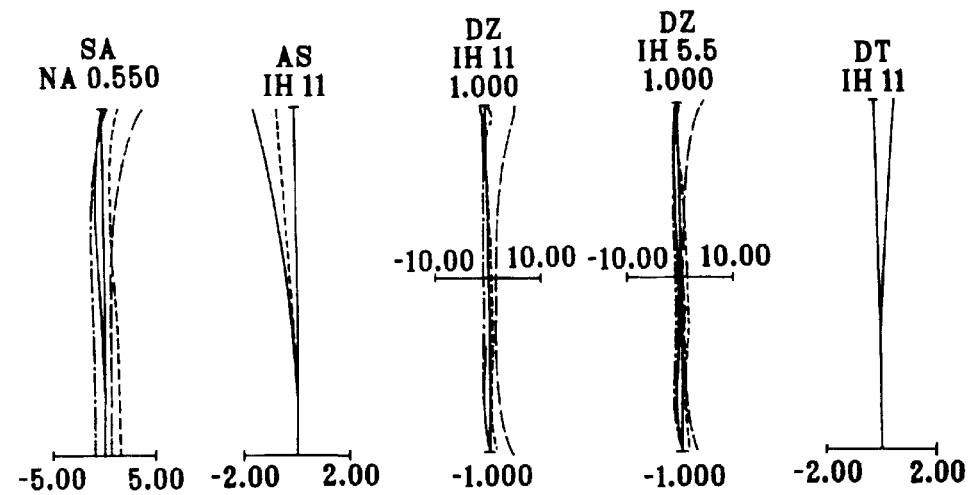
Figure 21A:
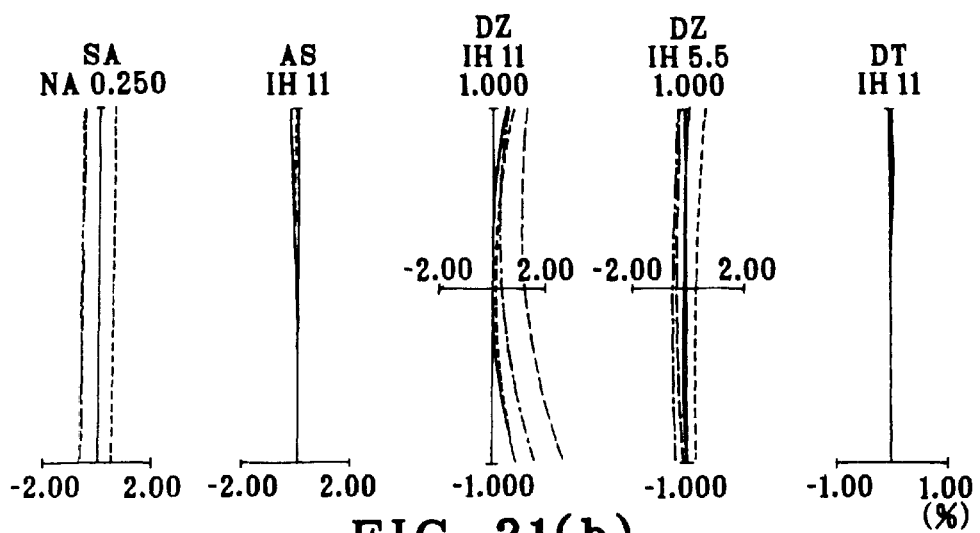
FIGS. 21(a) to 21(c) are aberration diagrams for Example 5.
Figure 21B:
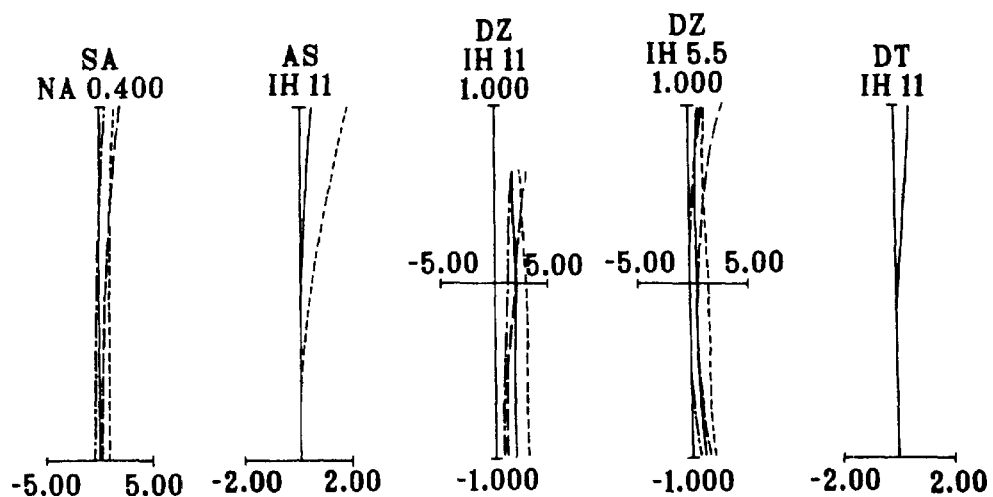
Figure 21C:
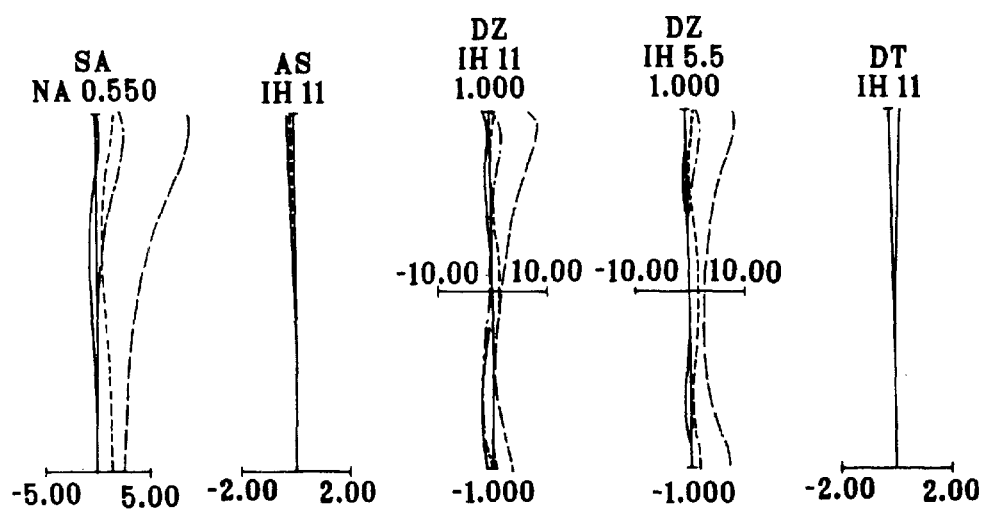
Figure 22A:
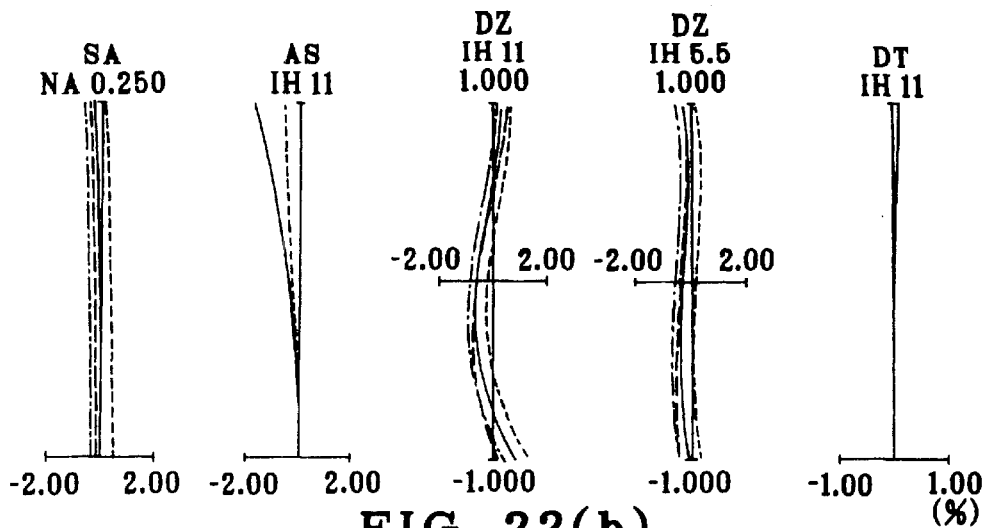
FIGS. 22(a) to 22(c) are aberration diagrams for Example 6.
Figure 22B:
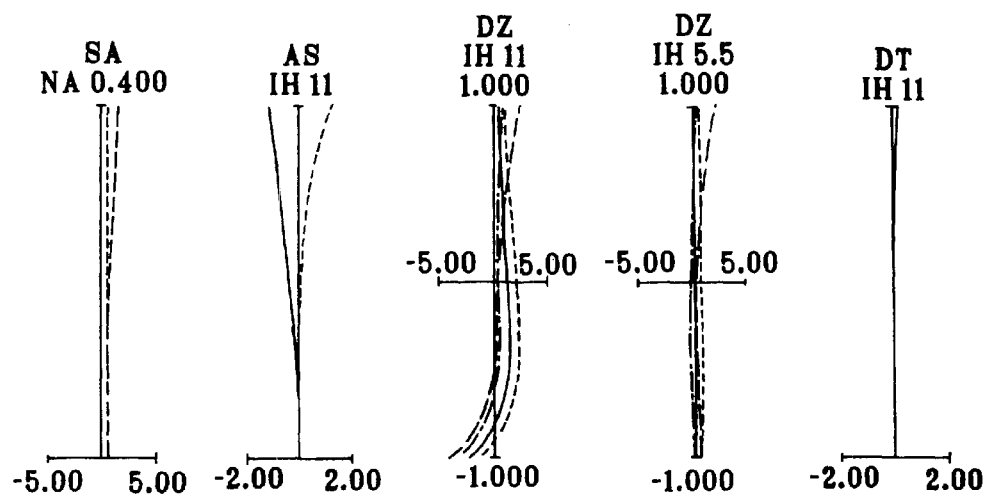
Figure 22C:
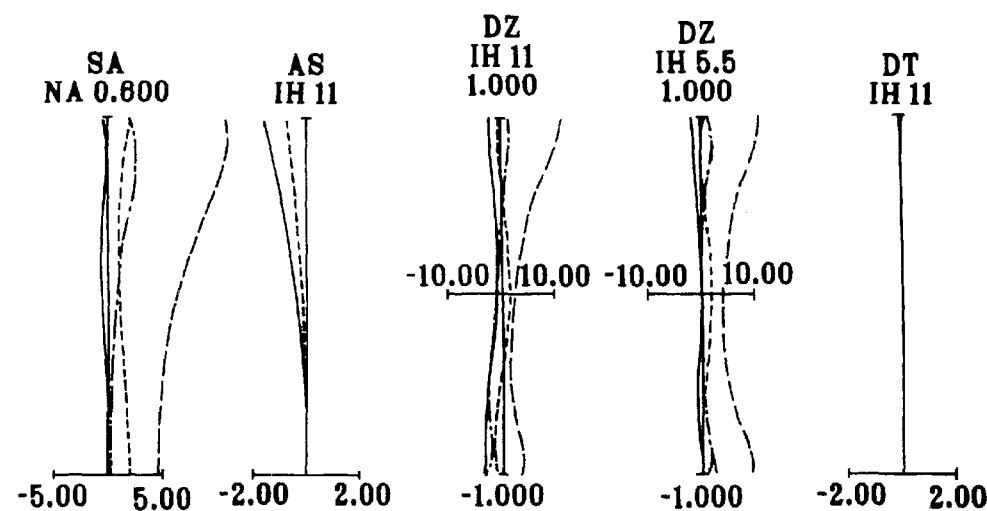
Figure 23A:
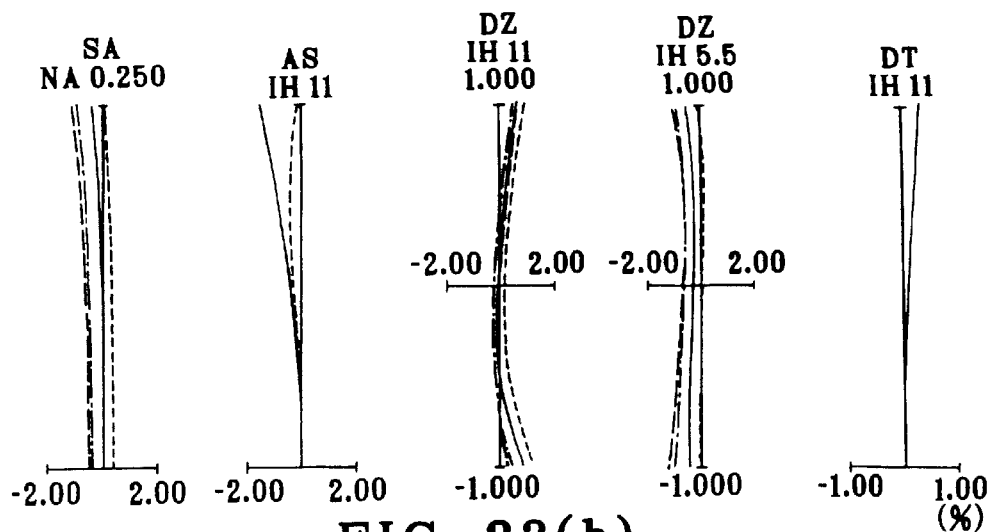
FIGS. 23(a) to 23(c) are aberration diagrams for Example 7.
Figure 23B:
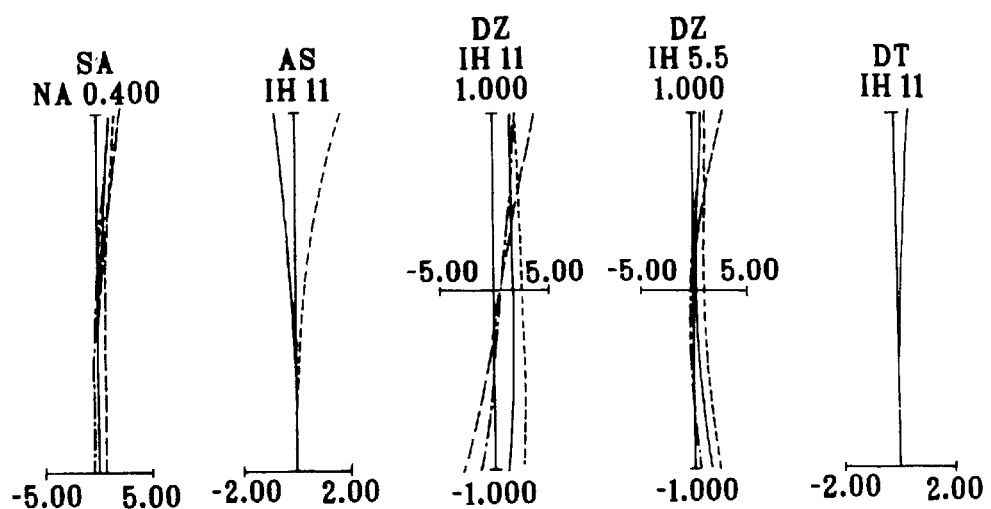
Figure 23C:
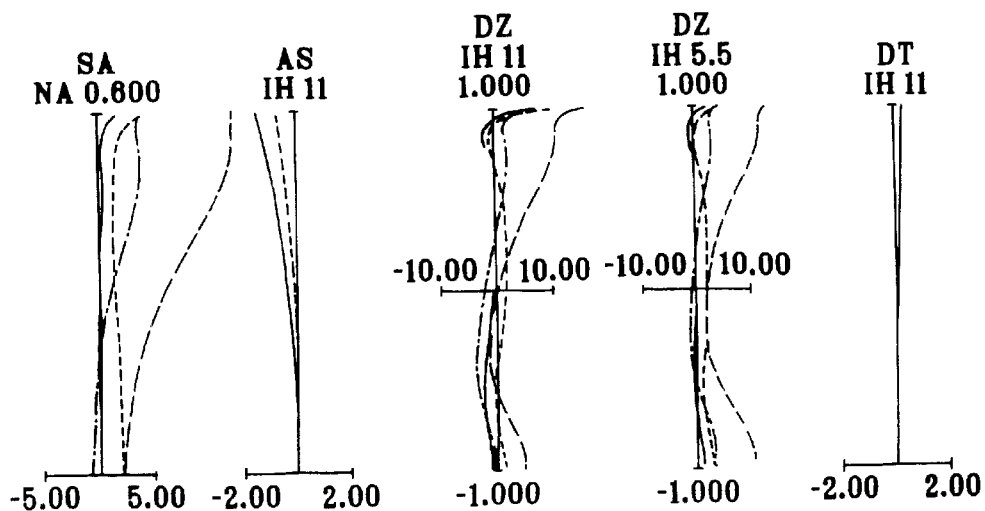
Figure 24A:
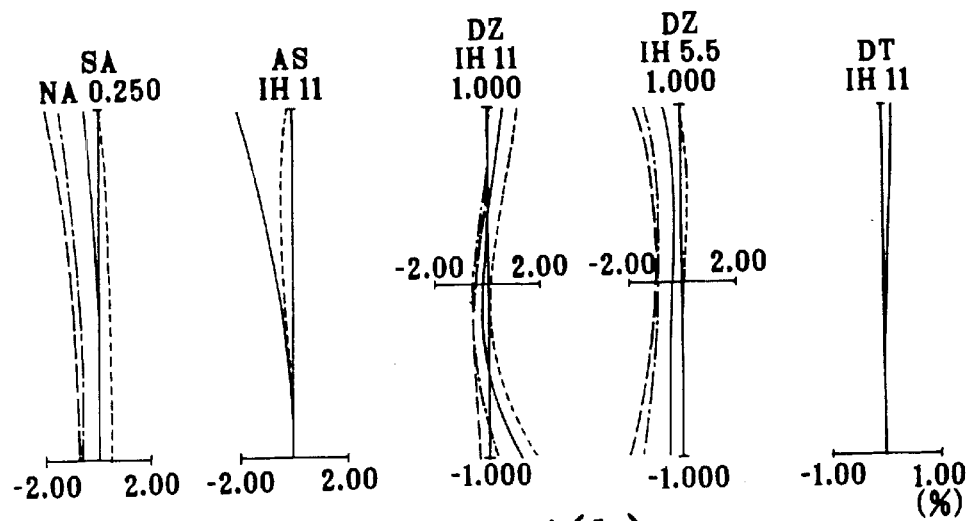
FIGS. 24(a) to 24(c) are aberration diagrams for Example 8.
Figure 24B:
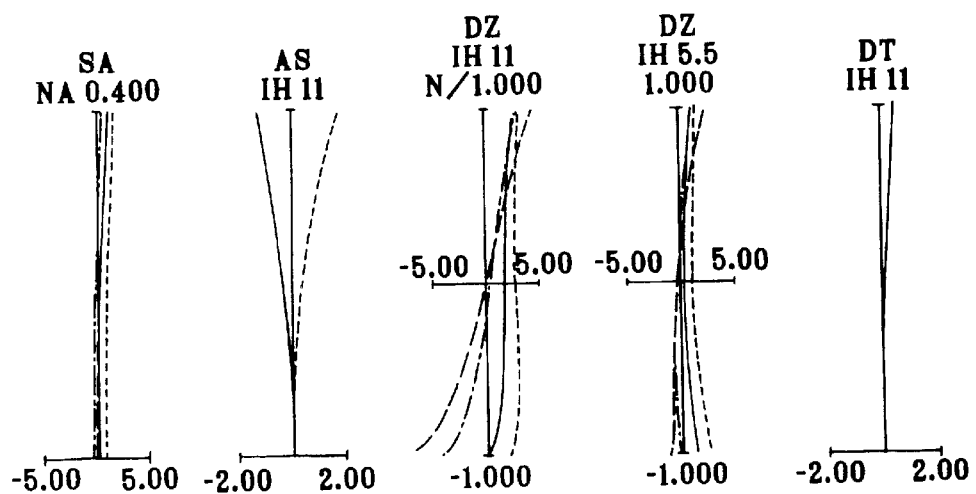
Figure 24C:
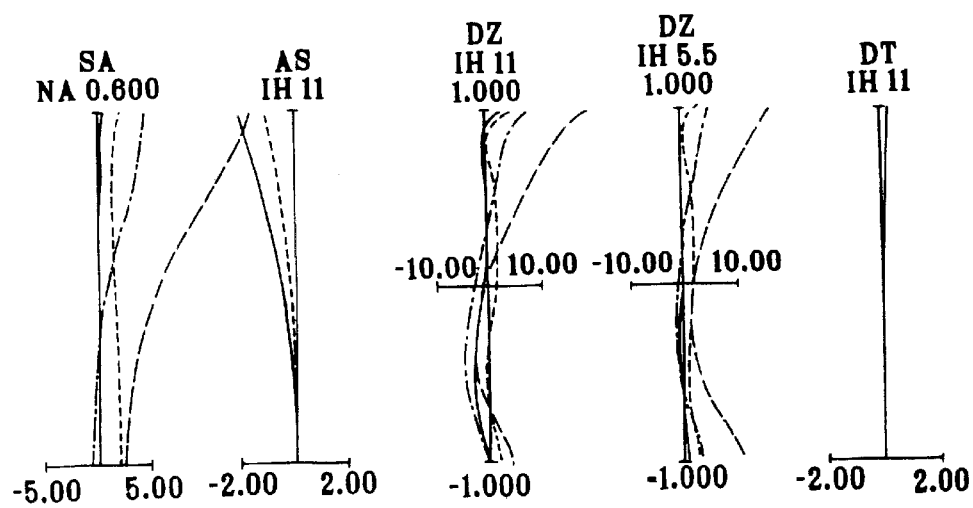
Figure 25A:
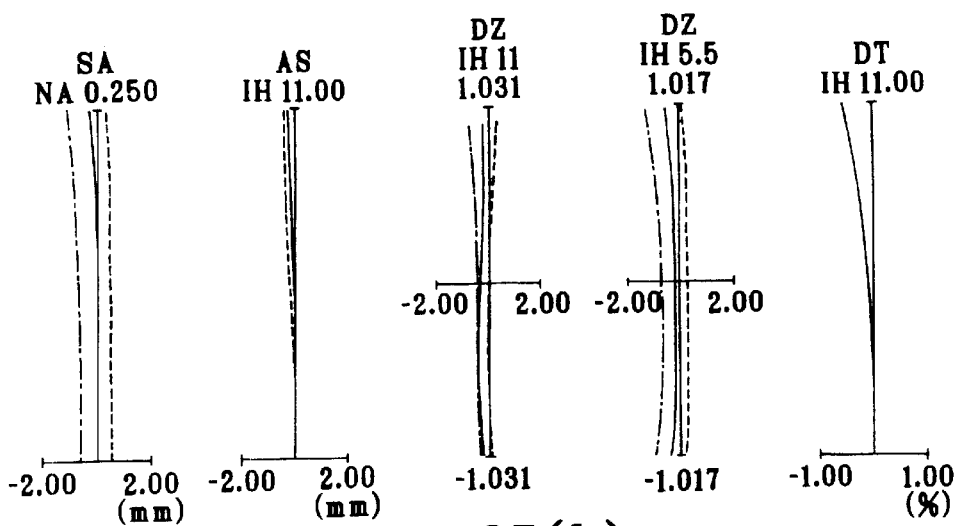
FIGS. 25(a) to 25(c) are aberration diagrams for Example 9.
Figure 25B:
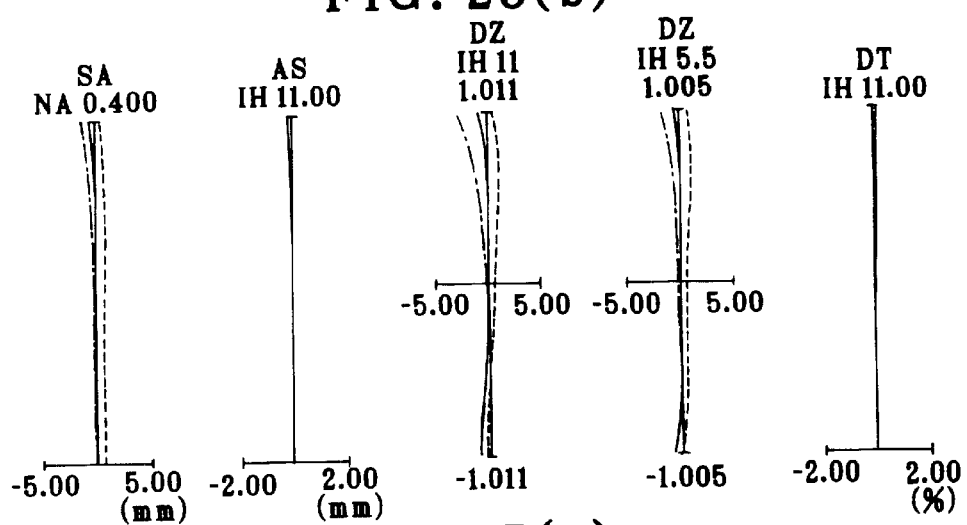
Figure 25C:
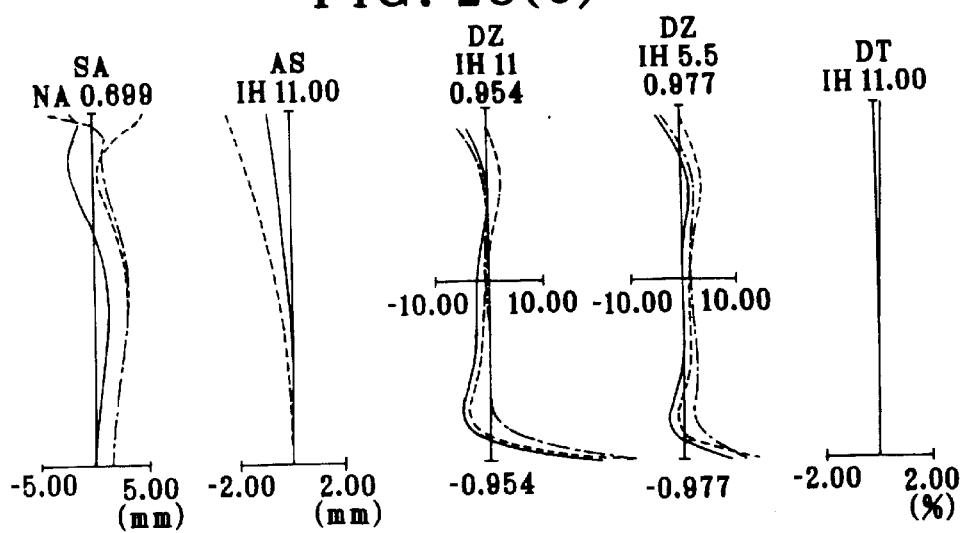
Figure 26A:
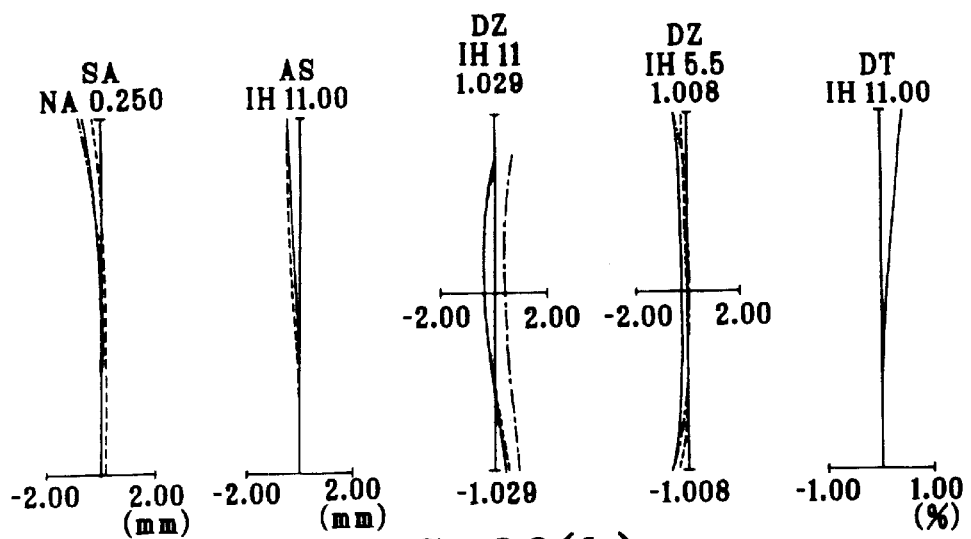
FIGS. 26(a) to 26(c) are aberration diagrams for Example 10.
Figure 26B:
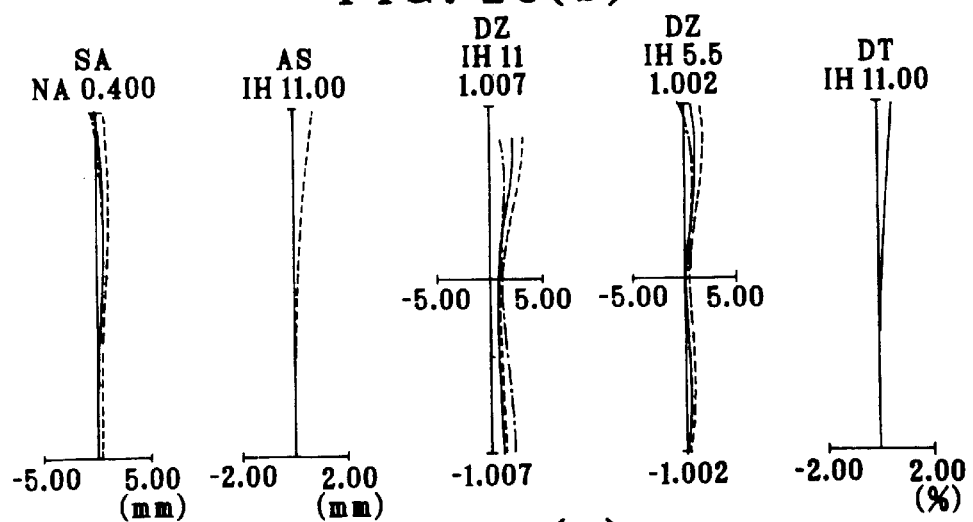
Figure 26C:
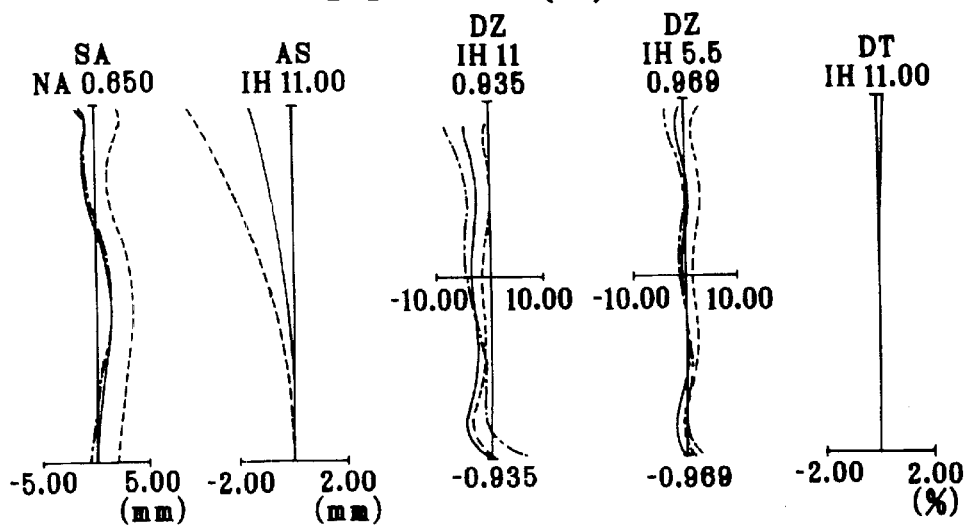

The following examples are each directed to a microscope zoom objective lens system designed to be focused at infinity and not to form an image by itself. For this reason, each microscope zoom objective lens system is used in combination of an image-forming lens system located on the image side thereof. The image-forming lens system is constructed as shown in FIG. 16 with the lens data to be described later. It is here noted that the lens data about each example include those on this image-forming lens.

Aberration diagrams for Examples 11 to 15 are obtained when the image-forming lens system is located in the rear of each microscope zoom objective lens system while the distance from an object to the object-side lens surface of the image-formation lens system is set at 100 mm. It is here noted that there are little aberration changes when the separation between the object and the object-side surface of the image-formation lens system is about 100 mm to about 200 mm.

Examples 11 to 15 of the zoom objective lens system according to the invention will now be explained with reference to the drawings and the lens data enumerated later.

Example 11 is constructed as shown in FIG. 11. This example is constructed of, in order from the object side, a first lens group G1 having positive refractive power, a second lens group G2 having negative refractive power, a third lens group G3 having positive refractive power and a fourth lens group G4 having negative refractive power. Upon zooming from the low to the high magnification side, the second lens group G2, the third lens group G3 and the fourth lens group G4 move on the optical axis while the separation between the first lens group G1 and the second lens group G2 becomes wide, the separation between the second lens group G2 and the third lens group G3 becomes narrow and the separation between the third lens group G3 and the fourth lens group G4 becomes first wide and then narrow.

Concave on the object side of the system, the first lens group G1 is made up of, in order from the object side thereof, a doublet negative meniscus lens consisting of a double-concave lens and a double-convex lens, a doublet positive meniscus lens consisting of a negative meniscus lens concave on the object side and a positive meniscus lens, a doublet positive lens consisting of a negative meniscus lens having a gentle convex surface on the object side and a double-convex lens having a strong convex surface on the second lens group G2 side, a double-convex single lens and a doublet negative lens consisting of a negative meniscus lens convex on the object side and a double-convex lens.

The second lens group G2 is made up of a doublet negative lens consisting of a double-concave lens and a negative meniscus lens and a doublet negative meniscus lens consisting of a double-concave lens and a double-convex lens. These doublets face each other at concave surfaces.

The third lens group G3 is made up of a doublet positive lens consisting of a double-concave lens and a double-convex lens, and a double-convex lens.

The fourth lens group G4 is made up of a positive doublet meniscus lens having gentle power and consisting of a positive meniscus lens convex on the third lens group G3 side and a negative meniscus lens concave on the image side and a doublet negative lens consisting of a double-concave lens and a positive meniscus lens.

Figure 27A:
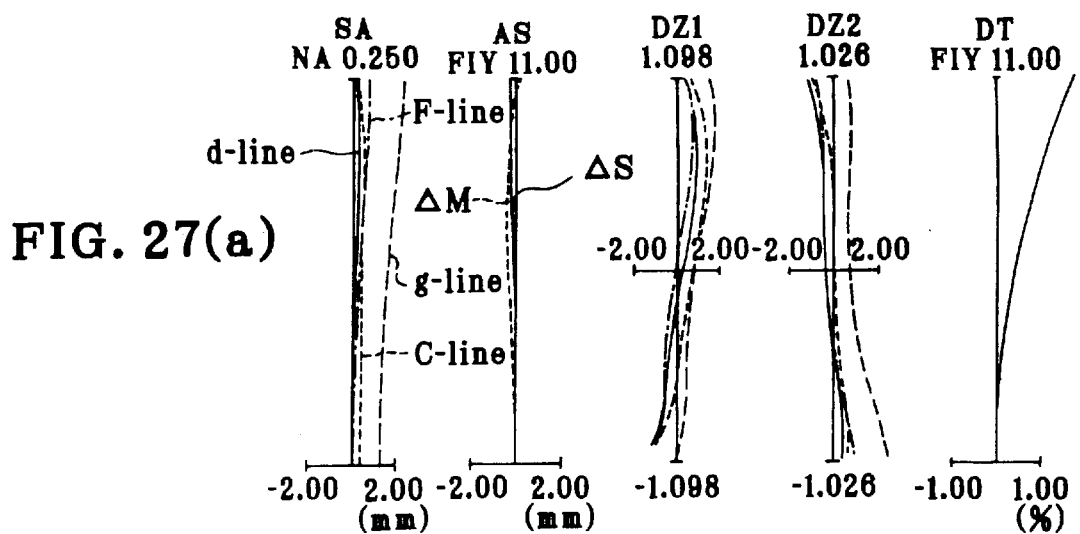
FIGS. 27(a) to 27(c) are aberration diagrams for Example 11.
Figure 27B:
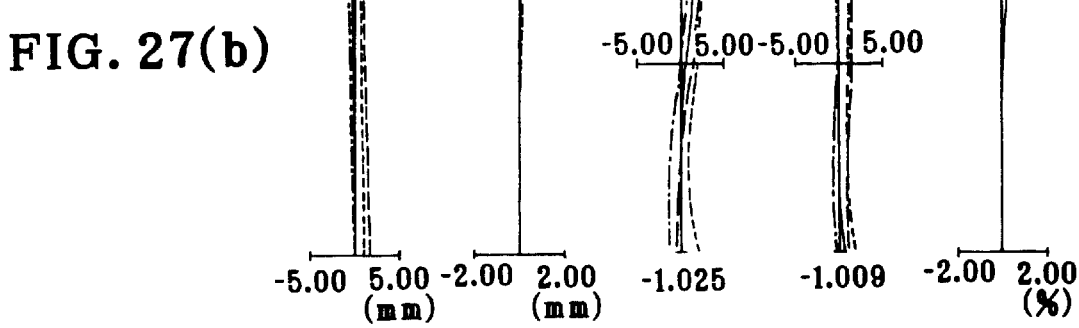
Figure 27C:
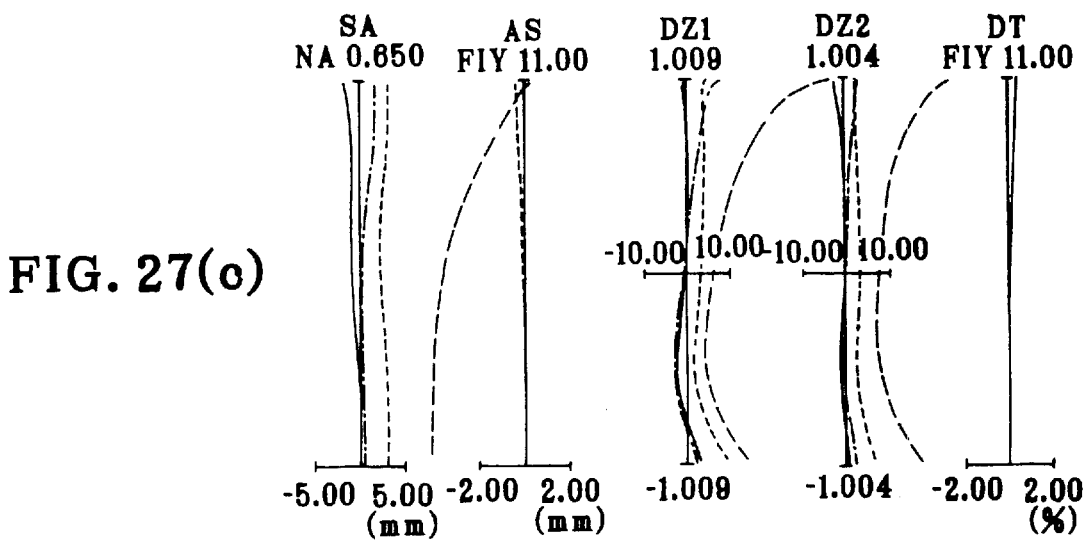

The zoom objective lens system of Example 11 has 22 fields, a zoom ratio of 10 to 40 and a numerical aperture of 0.25 to 0.65. An aperture stop S is located between the first lens group G1 and the second lens group G2 and in the vicinity of the back focus position of the first lens group G1, and includes a mechanism for varying the diameter of the stop with zooming in such a way as to provide a given numerical aperture. Aberration diagrams at the respective magnifications are shown as FIGS. 27(*a*), 27(*b*) and 27(*c*), respectively. In the diagrams, "SA", "AS", "DZ1", "DZ2" and "DT" represent spherical aberrations, astigmatism, off-axis aberrations at an image height ratio of 1.0, off-axis aberrations at an image height ratio of 0.5 and distortion, respectively. "FLY" has the same meaning as "IH" in the aberration diagrams for Examples 1 to 10. The same will go true for the diagrams to be referred to later.

Example 12 is constructed as shown in FIG. 12. This example is constructed of, in order from the object side, a first lens group G1 having positive refractive power, a second lens group G2 having negative refractive power, a third lens group G3 having positive refractive power and a fourth lens group G4 having negative refractive power. Upon zooming from the low to the high magnification side, the second lens group G2, the third lens group G3 and the fourth lens group G4 move on the optical axis while the separation between the first lens group G1 and the second lens group G2 becomes wide, the separation between the second lens group G2 and the third lens group G3 becomes narrow and the separation between the third lens group G3 and the fourth lens group G4 becomes first wide and then narrow.

Concave on the object side of the system, the first lens group G1 is made up of, in order from the object side, a doublet negative meniscus lens consisting of a double-concave lens and a double-convex lens, a positive meniscus lens concave on the object side, a triplet positive lens consisting of a double-convex lens, a double-concave lens and a double-convex lens, a double-convex lens and a doublet positive lens consisting of a negative meniscus The second lens group G2 is made up of a doublet negative lens consisting of a negative meniscus lens concave on the first lens group G1 side and a double-concave lens having a gentle radius of curvature and a doublet negative meniscus lens consisting of a double-concave lens and a double-convex lens. Both doublets face each other at concave surfaces.

The third lens group G3 is made up of a doublet positive lens consisting of a double-concave lens and a double-convex lens and a double-convex lens.

The fourth lens group G4 is made up of a doublet positive meniscus lens having gentle power and consisting of a positive meniscus lens convex on the third lens group G3 side and a negative meniscus lens concave on the image side and a doublet positive lens consisting of a double-concave lens and a positive meniscus lens.

Figure 28A:
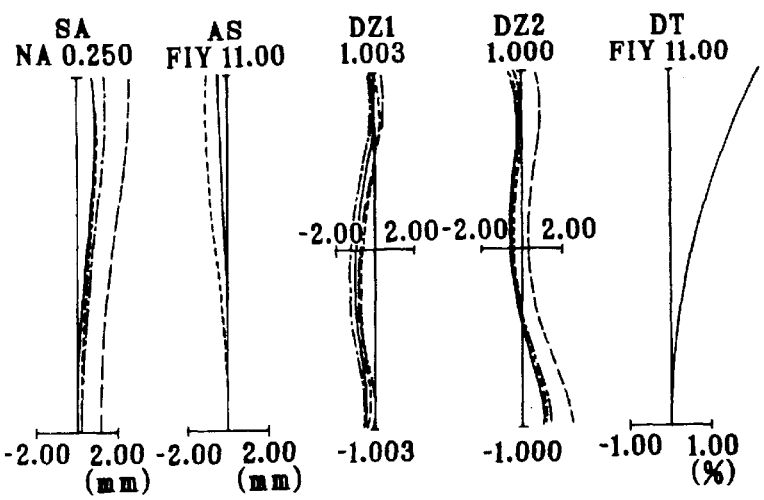
FIGS. 28(a) to 28(c) are aberration diagrams for Example 12.
Figure 28B:
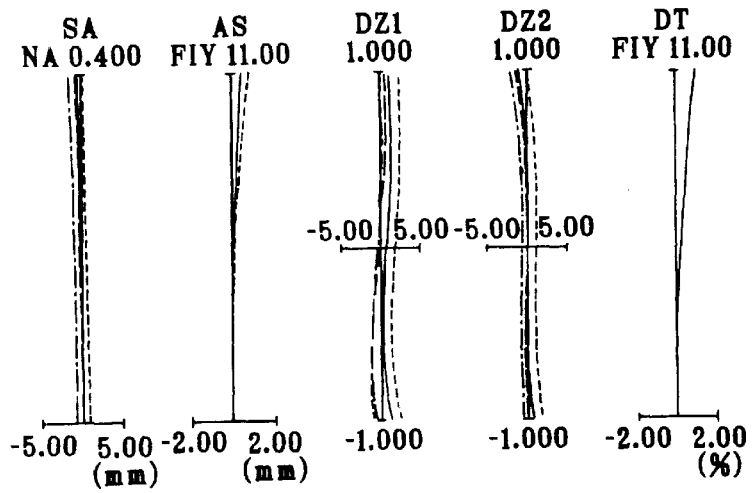
Figure 28C:
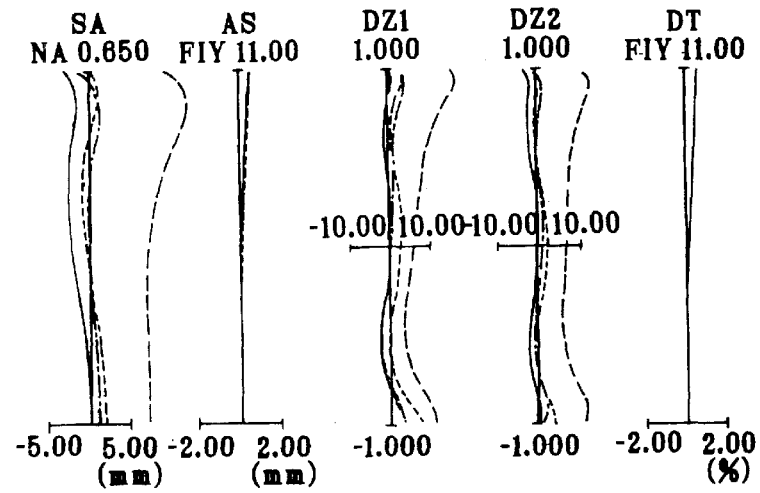

The zoom objective lens system of Example 12 has 22 fields, a zoom ratio of 10 to 40 and a numerical aperture of 0.25 to 0.65. An aperture stop S is located between the first lens group G1 and the second lens group G2 and in the vicinity of the back focus position of the first lens group G1, and includes a mechanism for varying the diameter of the stop with zooming in such a way as to provide a given numerical aperture. Aberration diagrams at the respective magnifications are shown as FIGS. 28(*a*), 28(*b*) and 28(*c*), respectively.

Example 13 is constructed as shown in FIG. 13. This example is constructed of, in order from the object side, a first lens group G1 having positive refractive power, a second lens group G2 having negative refractive power, a third lens group G3 having positive refractive power and a fourth lens group G4 having negative refractive power. Upon zooming from the low to the high magnification side, the second lens group G2, the third lens group G3 and the fourth lens group G4 move on the optical axis while the separation between the first lens group G1 and the second lens group G2 becomes wide, the separation between the second lens group G2 and the third lens group G3 becomes narrow and the separation between the third lens group G3 and the fourth lens group G4 becomes first wide and then narrow.

Concave on the object side of the system, the first lens group G1 is made up of, in order from the object side thereof, a doublet negative meniscus lens consisting of a double-concave lens and a double-convex lens, a positive meniscus lens concave on the object side, a triplet positive lens consisting of a double-convex lens, a double-concave lens and a double-convex lens, and a doublet positive lens consisting of a negative meniscus lens convex on the object side and a double-convex lens.

Here, two aspheric surfaces are used, one for the object side of the triplet positive lens consisting of a double-convex lens, a double-concave lens and a double-convex lens and another for the surface of contact of the triplet with air on the second lens group G2 side.

The second lens group G2 is made up of a negative meniscus lens having a gentle convex surface on the first lens group G1 side and a doublet positive lens consisting of a double-concave lens and a double-convex lens. The meniscus lens and the doublet face each other at concave surfaces.

The third lens group G3 is made up of a positive meniscus lens concave on the second lens group G2 side and a doublet positive lens consisting of a double-convex lens and a negative meniscus lens.

The fourth lens group G4 is made up of a doublet negative meniscus lens consisting of a positive meniscus lens having a strong convex surface on the third lens group G3 side and a negative meniscus lens having a strong concave surface on the image side and a doublet negative lens consisting of a double-concave lens and a positive meniscus lens.

It is here noted that the convex lens surface of the fourth lens group G4 located nearest to the third lens group G3 is defined by an aspheric surface.

Figure 29A:
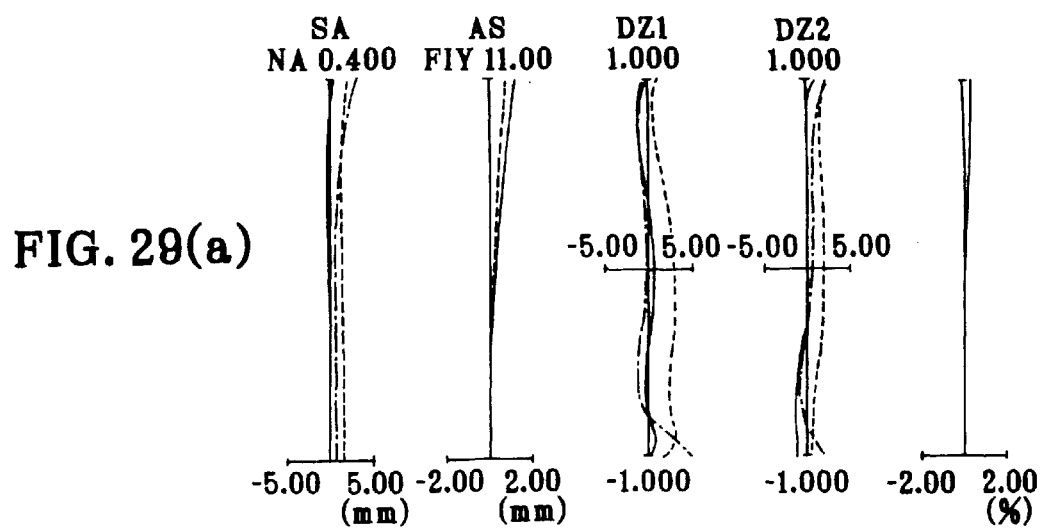
FIGS. 29(a) to 29(c) are aberration diagrams for Example 13.
Figure 29B:
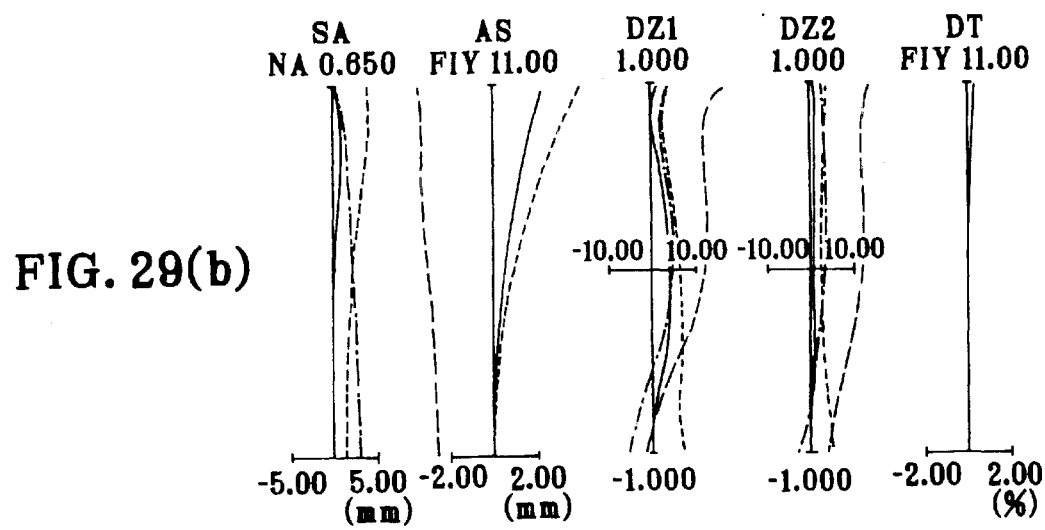
Figure 29C:
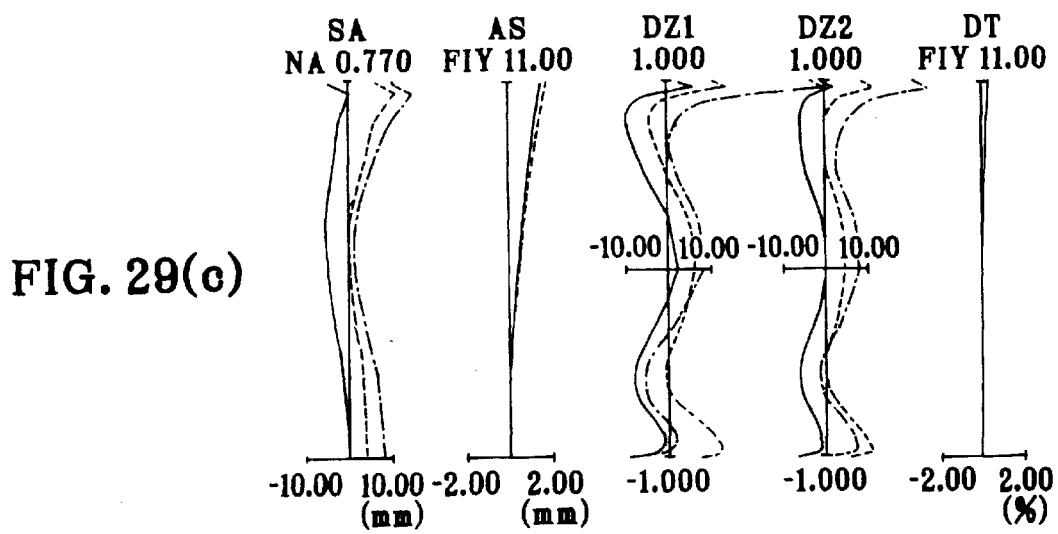

The zoom objective lens system of Example 13 has 22 fields, a zoom ratio of 20 to 80 and a numerical aperture of 0.4 to 0.77. An aperture stop S is located between the first lens group G1 and the second lens group G2 and in the vicinity of the back focus position of the first lens group G1, and includes a mechanism for varying the diameter of the stop with zooming in such a way as to provide a given numerical aperture. Aberration diagrams at the respective magnifications are shown as FIGS. 29(*a*), 29(*b*) and 29(*c*), respectively.

In Example 13, two aspheric surfaces are provided in the first lens group G1 and one aspheric surface is provided in the fourth lens group G4. It is thus possible to achieve a lens system having an ever-higher numerical aperture, an ever-higher zoom ratio and a much more reduced length while fluctuations of the exit pupil are limited to within 5 mm.

Example 14 is constructed as shown in FIG. 14. This example is constructed of, in order from the object side, a first lens group G1 having positive refractive power, a second lens group G2 having negative refractive power, a third lens group G3 having positive refractive power and a fourth lens group G4 having negative refractive power. Upon zooming from the low to the high magnification side, the second lens group G2, the third lens group G3 and the fourth lens group G4 move on the optical axis while the separation between the first lens group G1 and the second lens group G2 becomes wide, the separation between the second lens group G2 and the third lens group G3 becomes narrow and the separation between the third lens group G3 and the fourth lens group G4 becomes first wide and then narrow.

Concave on the object side of the system, the first lens group G1 is made up of, in order from the object side thereof, a doublet negative meniscus lens consisting of a double-concave lens and a double-convex lens, a positive meniscus lens having a gentle concave surface on the object side, a triplet positive lens consisting of a double-convex lens, a negative meniscus lens and a positive meniscus lens, a positive meniscus lens concave on the object side and a doublet positive lens consisting of a negative meniscus lens convex on the object side and a double-convex lens.

It is here noted that the lens surface of the fourth lens component as counted from the object side and located on the second lens group G2 side is defined by an aspheric surface.

The second lens group G2 is made up of a doublet negative lens consisting of a positive meniscus lens having a concave surface on the first lens group G1 side and a double-concave lens and a doublet negative meniscus lens consisting a double-concave lens and a double-convex lens. Both doublets face each other at concave surfaces.

The third lens group G3 is made up of a doublet positive lens consisting of a negative meniscus lens having a gentle convex surface on the object side and a double-convex lens and a double-convex lens.

The fourth lens group G4 is made up of a doublet positive meniscus lens having gentle power and consisting of a positive meniscus lens convex on the third lens group G3 side and a negative meniscus lens concave on the image side and a doublet negative lens consisting of a double-concave lens and a positive meniscus lens.

As in Example 11, an aperture stop S is located between the first lens group G1 and the second lens group G2 and in the vicinity of the back focus position of the first lens group G1, and includes a mechanism for varying the diameter of the stop with zooming in such a way as to provide a given numerical aperture.

Figure 30A:
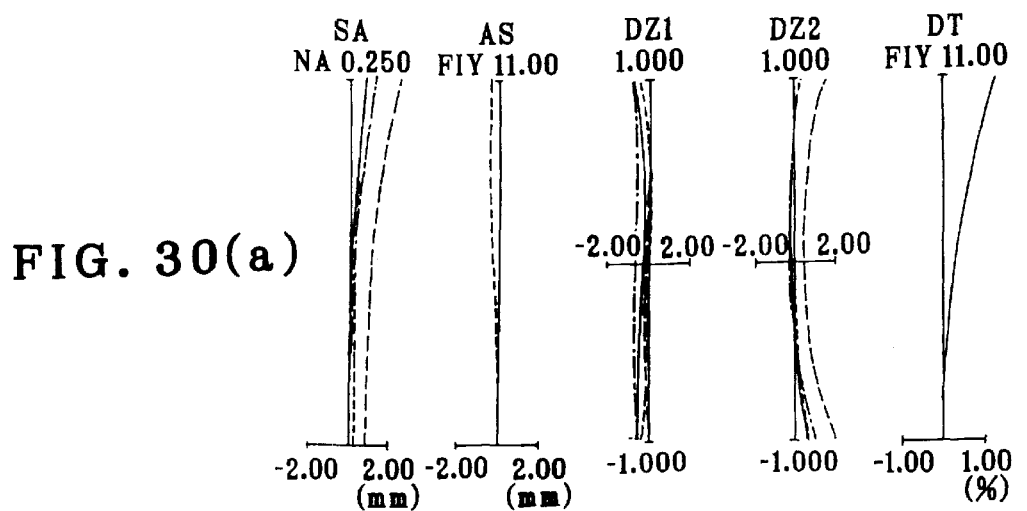
FIGS. 30(a) to 30(c) are aberration diagrams for Example 14.
Figure 30B:
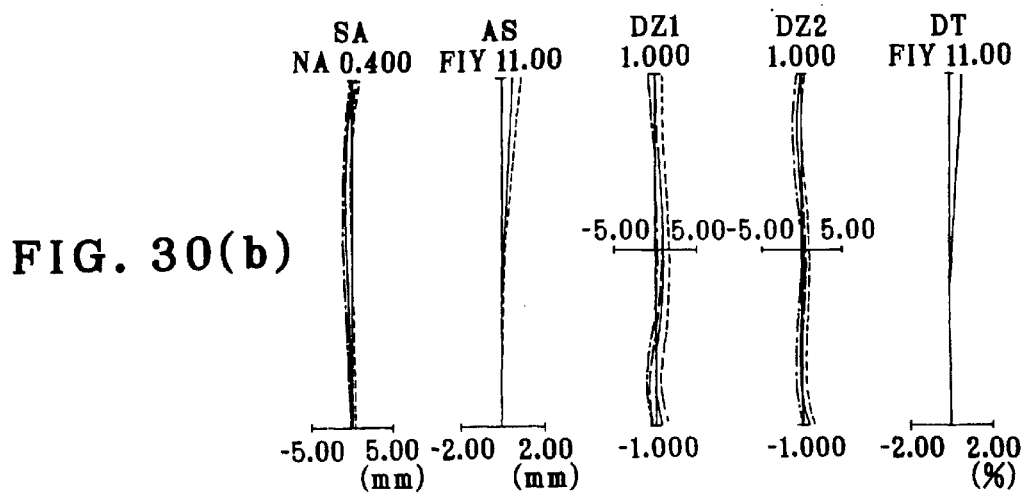
Figure 30C:
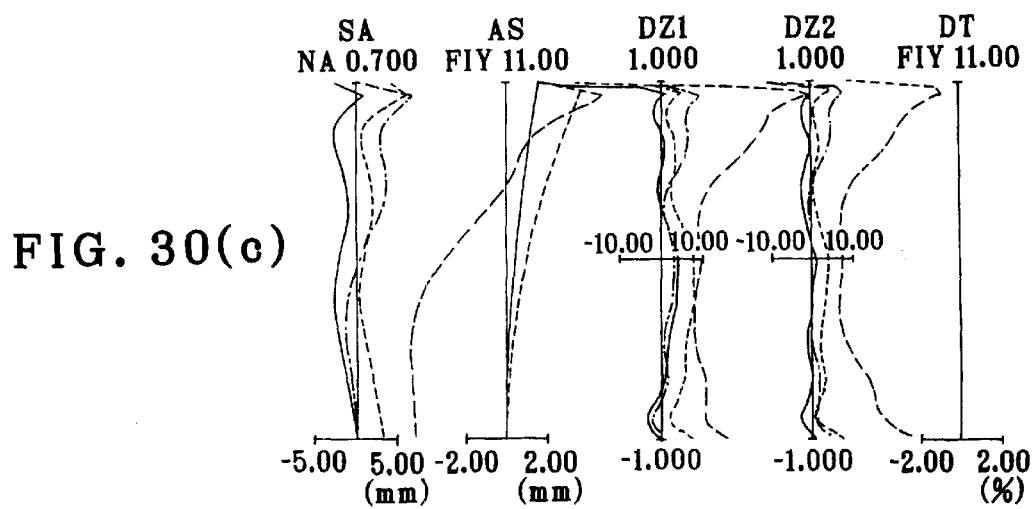

The zoom objective lens system of Example 14 has 22 fields, a zoom ratio of 10 to 50 and a numerical aperture of 0.25 to 0.7. Aberration diagrams at the respective magnifications are shown as FIGS. 30(*a*), 30(*b*) and 30(*c*), respectively.

In Example 14, one aspheric surface is provided in the first lens group. It is thus possible to achieve a lens system having an ever-higher numerical aperture, while fluctuations of the exit pupil are limited to a substantially constant value within 10 mm all over the low-to-high zoom range.

Example 15 is constructed as shown in FIG. 15. This example is constructed of, in order from the object side, a first lens group G1 having positive refractive power, a second lens group G2 having negative refractive power, a third lens group G3 having positive refractive power and a fourth lens group G4 having negative refractive power. Upon zooming from the low to the high magnification side, the second lens group G2, the third lens group G3 and the fourth lens group G4 move on the optical axis while the separation between the first lens group G1 and the second lens group G2 becomes wide, the separation between the second lens group G2 and the third lens group G3 becomes narrow and the separation between the third lens group G3 and the fourth lens group G4 becomes first wide and then narrow.

Concave on the object side of the system, the first lens group G1 is made up of, in order from the object side thereof, a doublet negative meniscus lens consisting of a double-concave lens and a double-convex lens, a positive meniscus lens concave on the object side, a triplet positive meniscus lens consisting of a double-convex lens, a double-concave lens and a double-convex lens, a double-convex lens having an aspheric surface on the object side and a doublet positive meniscus lens consisting of a double-concave lens and a double-convex lens.

The second lens group G2 is made up of a doublet negative lens consisting of a negative meniscus lens concave on the object side and a double-concave lens and a doublet negative meniscus lens consisting of a double-concave lens and a double-convex lens. Both doublets face each other at concave surfaces.

The third lens group G3 is made up of a doublet positive meniscus lens consisting of a double-concave lens and a double-convex lens and a double-convex lens.

The fourth lens group G4 is made up of a doublet positive meniscus lens consisting of a positive meniscus lens convex on the object side and a negative meniscus lens convex on the object side and a doublet negative lens consisting of a double-concave lens and a positive meniscus lens. In the fourth lens group G4, both doublets face each other at concave surfaces.

The doublet negative meniscus lens located on the object side of the first lens group G1 acts to reduce the Petzval sum, as in Example 9. The triplet positive lens, too, is effective to reduce the Petzval sum and make correction for coma and longitudinal chromatic aberration, because the height of rays is raised by the negative refracting power of the cemented surface of the triplet positive lens. By using an aspheric surface at a position where axial marginal rays become high on the high magnification side, it is possible to make effective correction for spherical aberrations on the high magnification side.

Figure 31A:
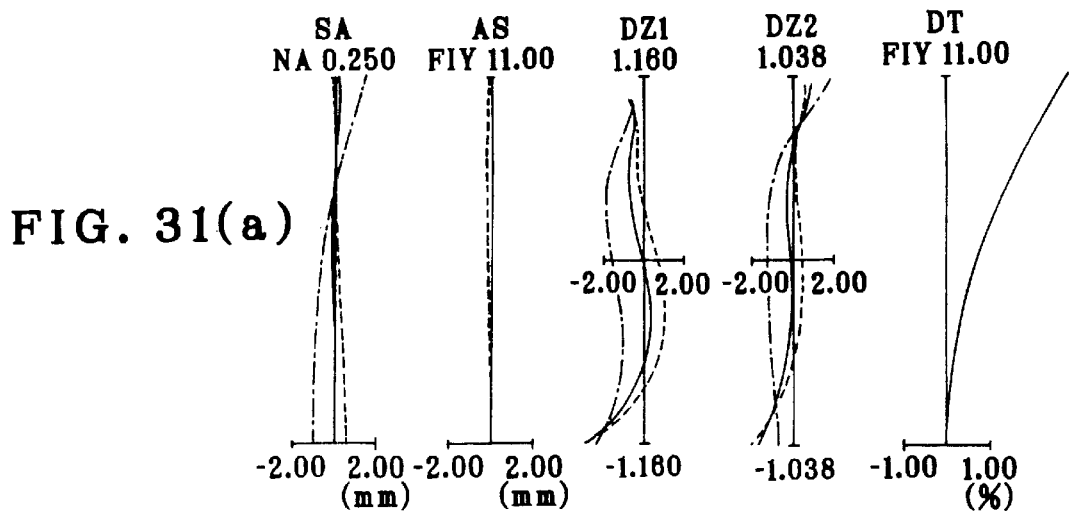
FIGS. 31(a) to 31(c) are aberration diagrams for Example 15.
Figure 31B:
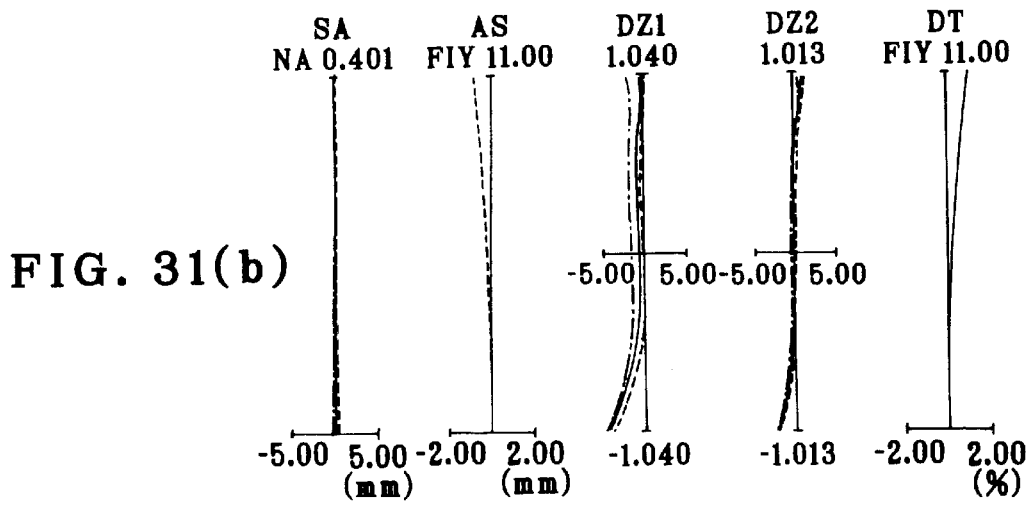
Figure 31C:
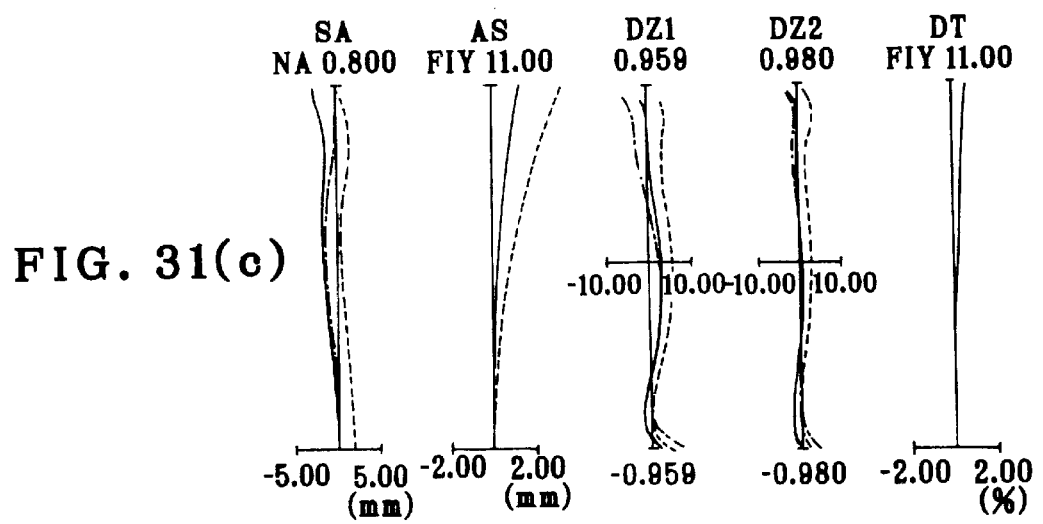

The zoom objective lens system of Example 15 has 22 fields, a zoom ratio of 10 to 40 and a numerical aperture of 0.25 to 0.8. An aperture stop S is located in the vicinity of the back focus position of the first lens group G1, and on the low magnification side the second lens group G2 moves over the back focus position of the first lens group G1 toward the object side. At this time, the second lens group G2 moves close to the exit pupil position on the high magnification side without sinking the exit pupil position. The aperture stop S includes a mechanism for varying the diameter of the stop in such a way as to provide a desired numerical aperture. Aberration diagrams for this example at the respective magnifications are shown as FIGS. 31(a), 31(b) and 31(c).

According to Example 15 wherein one aspheric surface is used on the object side of the double-convex lens in the first lens group G1, it is possible to achieve a lens system which, albeit having a numerical aperture of 0.8 and a zoom ratio of 4, is reduced in length and keeps fluctuations of the exit pupil within 5 mm by use of four lens groups.

Set out below are the lens data on the image-forming lens system used commonly throughout the above exemplified microscope zoom objective lens systems. Symbols used hereinafter but not referred to hereinbefore have the following meanings.

M: magnification,
φ: an aperture stop diameter,
NA: a numerical aperture,
IH: an image height,
$r_1, r_2, \ldots$: the radii of curvature of lens surfaces indicated in order the object side,
$d_1, d_2, \ldots$: the separation between adjacent lenses indicated from the object side,
$n_{d1}, n_{d2}, \ldots$: the refractive indices of lenses indicated from the object side, and
$v_{d1}, v_{d2}, \ldots$: the Abbe numbers of lenses indicated in order from the object side.

Let x represent an optical axis with the proviso that the direction of propagation of light is positive and y stand for a direction perpendicular to the optical axis. Then, aspheric shape is given by $$x=(y^2/r)/[1+\{1-(K+1)(y/r)^2\}^{1/2}]+A_4 y^4+A_6 y^6+A_8 y^8+A_{10} y^{10}$$

where r is a paraxial radius of curvature, K is a conical coefficient, and $A_4$, $A_6$, $A_8$ and $A_{10}$ are the fourth, sixth, eighth and tenth aspheric coefficients.

In the microscope zoom objective lens systems of Examples 1 to 10, however, $r_1$, $r_2$ are the radii of curvature of the object plane and the surface of the cover glass mounted thereon, $r_3, \ldots$ are the radii of curvature of lens surfaces, $d_1$ is the thickness of the cover glass, and $d_2$ is the distance between the cover glass and the first surface of the microscope zoom objective lens system. In the microscope zoom objective lens systems of Examples 11 to 15, $r_0$ is the radius of curvature of the object plane, $r_0$ and $r_1$ are the radii of curvature of both surface of the cover glass, $d_0$ is the separation between both surfaces of the cover glass, $d_1$ is a working distance, $n_{d0}$ is the d-line refractive index of the cover glass and $v_{d0}$ is the Abbe number of the cover glass.

EXAMPLE 1

| | | | |
|---|---|---|---|
| $r_1 = \infty$ (Object plane) | $d_1 = 0.17$ | $n_{d_1} = 1.521$ | $v_{d_1} = 56.02$ |
| $r_2 = \infty$ | $d_2 = 1.2514$ | | |
| $r_3 = -6.7337$ | $d_3 = 1.2783$ | $n_{d_2} = 1.834$ | $v_{d_2} = 37.16$ |
| $r_4 = 5.9444$ | $d_4 = 4.789$ | $n_{d_3} = 1.651$ | $v_{d_3} = 56.16$ |
| $r_5 = -8.7211$ | $d_5 = 0.1$ | | |
| $r_6 = 42.787$ | $d_6 = 2.9416$ | $n_{d_4} = 1.56907$ | $v_{d_4} = 71.3$ |
| $r_7 = -12.5242$ | $d_7 = 0.1$ | | |
| $r_8 = 46.2811$ | $d_8 = 2.2857$ | $n_{d_5} = 1.788$ | $v_{d_5} = 47.37$ |
| $r_9 = 13.3863$ | $d_9 = 5.7435$ | $n_{d_6} = 1.497$ | $v_{d_6} = 81.54$ |
| $r_{10} = -14.6612$ | $d_{10} = 0.15$ | | |
| $r_{11} = 101.2916$ | $d_{11} = 2.5665$ | $n_{d_7} = 1.497$ | $v_{d_7} = 81.54$ |
| $r_{12} = -21.4783$ | $d_{12} = 0.1$ | | |
| $r_{13} = 51.9492$ | $d_{13} = 3.3424$ | $n_{d_8} = 1.804$ | $v_{d_8} = 46.57$ |
| $r_{14} = 9.1121$ | $d_{14} = 3.9815$ | $n_{d_9} = 1.43875$ | $v_{d_9} = 94.99$ |
| $r_{15} = -37.5765$ | $d_{15} = 0.1$ | | |
| $r_{16} = 50.6501$ | $d_{16} = 2.0367$ | $n_{d_{10}} = 1.51823$ | $v_{d_{10}} = 58.9$ |
| $r_{17} = -136.7298$ | $d_{17} = 3.3779$ | | |
| $r_{18} = \infty$ (Stop) | $d_{18} = d1$ (Variable) | | |
| $r_{19} = -32.4034$ | $d_{19} = 2.2472$ | $n_{d_{11}} = 1.741$ | $v_{d_{11}} = 52.64$ |
| $r_{20} = 24.5965$ | $d_{20} = 1.5$ | $n_{d_{12}} = 1.7552$ | $v_{d_{12}} = 27.51$ |
| $r_{21} = 13.0278$ | $d_{21} = 1.4452$ | | |
| $r_{22} = -16.7672$ | $d_{22} = 1.0203$ | $n_{d_{13}} = 1.51823$ | $v_{d_{13}} = 58.9$ |
| $r_{23} = 14.2484$ | $d_{23} = 2.1115$ | $n_{d_{14}} = 1.80518$ | $v_{d_{14}} = 25.42$ |
| $r_{24} = -84.0355$ | $d_{24} = d2$ (Variable) | | |
| $r_{25} = 90.7258$ | $d_{25} = 2.4841$ | $n_{d_{15}} = 1.48749$ | $v_{d_{15}} = 70.23$ |
| $r_{26} = -44.9254$ | $d_{26} = 0.1$ | | |
| $r_{27} = 200.2317$ | $d_{27} = 2.5$ | $n_{d_{16}} = 1.7185$ | $v_{d_{16}} = 33.52$ |
| $r_{28} = 27.3412$ | $d_{28} = 3.7906$ | $n_{d_{17}} = 1.48749$ | $v_{d_{17}} = 70.23$ |
| $r_{29} = -29.2453$ | $d_{29} = d3$ (Variable) | | |
| $r_{30} = 68.7541$ | $d_{30} = 7.7321$ | $n_{d_{18}} = 1.48749$ | $v_{d_{18}} = 70.21$ |
| $r_{31} = -37.5679$ | $d_{31} = 3.4742$ | $n_{d_{19}} = 1.8061$ | $v_{d_{19}} = 40.95$ |
| $r_{32} = -102.8477$ | $d_{32} = 0.6973$ | | |
| $r_{33} = 84.3099$ | $d_{33} = 6.0238$ | $n_{d_{20}} = 1.834$ | $v_{d_{20}} = 37.17$ |
| $r_{34} = -50.71$ | $d_{34} = 3.0298$ | $n_{d_{21}} = 1.6445$ | $v_{d_{21}} = 40.82$ |
| $r_{35} = 40.6619$ | $d_{35} = 157.0375$ | | |
| $r_{36} = \infty$ (Image plane) | | | |

-continued

Zooming Data

| M | 10 X | 20 X | 40 X |
|---|---|---|---|
| d1 | 1.50356 | 20.3202 | 29.72845 |
| d2 | 12.6587 | 8.6095 | 0.5111 |
| d3 | 84.32435 | 69.55691 | 68.24706 |
| φ | 4.2088 | 6.7442 | 10.1344 |
| NA | 0.25 | 0.4 | 0.6 |
| IH | 11 | 11 | 11 |

EXAMPLE 2

| | | | |
|---|---|---|---|
| $r_1 = \infty$ (Object plane) | $d_1 = 0.1700$ | $n_{d_1} = 1.521$ | $\nu_{d_1} = 56.02$ |
| $r_2 = \infty$ | $d_2 = 1.2558$ | | |
| $r_3 = -29.0283$ | $d_3 = 2.7211$ | $n_{d_2} = 1.834$ | $\nu_{d_2} = 37.16$ |
| $r_4 = 8.8314$ | $d_4 = 4.1924$ | $n_{d_3} = 1.48749$ | $\nu_{d_3} = 70.23$ |
| $r_5 = -10.6379$ | $d_5 = 0.1438$ | | |
| $r_6 = 40.7184$ | $d_6 = 2.9333$ | $n_{d_4} = 1.497$ | $\nu_{d_4} = 81.54$ |
| $r_7 = -11.9302$ | $d_7 = 0.3039$ | | |
| $r_8 = -117.4806$ | $d_8 = 1.5119$ | $n_{d_5} = 1.755$ | $\nu_{d_5} = 52.32$ |
| $r_9 = 15.1444$ | $d_9 = 5.6036$ | $n_{d_6} = 1.43875$ | $\nu_{d_6} = 94.99$ |
| $r_{10} = -17.3463$ | $d_{10} = 0.2288$ | | |
| $r_{11} = 37.5871$ | $d_{11} = 2.6003$ | $n_{d_7} = 1.497$ | $\nu_{d_7} = 81.54$ |
| $r_{12} = -45.9781$ | $d_{12} = 0.1886$ | | |
| $r_{13} = 403.3639$ | $d_{13} = 2.6142$ | $n_{d_8} = 1.755$ | $\nu_{d_8} = 52.32$ |
| $r_{14} = -22.6293$ | $d_{14} = 0.1$ | | |
| $r_{15} = 78.429$ | $d_{15} = 1.5$ | $n_{d_9} = 1.834$ | $\nu_{d_9} = 37.16$ |
| $r_{16} = 10.6152$ | $d_{16} = 4.4291$ | $n_{d_{10}} = 1.43875$ | $\nu_{d_{10}} = 94.99$ |
| $r_{17} = -39.0207$ | $d_{17} = 3.1111$ | | |
| $r_{18} = 21.9$ | $d_{18} = 2.4089$ | $n_{d_{11}} = 1.755$ | $\nu_{d_{11}} = 52.32$ |
| $r_{19} = 156.282$ | $d_{19} = 0.7027$ | | |
| $r_{20} = \infty$ (Stop) | $d_{20} = d1$ (Variable) | | |
| $r_{21} = -174.9921$ | $d_{21} = 2.4556$ | $n_{d_{12}} = 1.76182$ | $\nu_{d_{12}} = 26.52$ |
| $r_{22} = -17.643$ | $d_{22} = 1.3688$ | $n_{d_{13}} = 1.741$ | $\nu_{d_{13}} = 52.64$ |
| $r_{23} = 8.7892$ | $d_{23} = 3.6611$ | $n_{d_{14}} = 1.78472$ | $\nu_{d_{14}} = 25.68$ |
| $r_{24} = 7.4509$ | $d_{24} = 1.5433$ | | |
| $r_{25} = -7.5666$ | $d_{25} = 1$ | $n_{d_{15}} = 1.51823$ | $\nu_{d_{15}} = 58.9$ |
| $r_{26} = 9.9751$ | $d_{26} = 2$ | $n_{d_{16}} = 1.80518$ | $\nu_{d_{16}} = 25.42$ |
| $r_{27} = 41.1135$ | $d_{27} = d2$ (Variable) | | |
| $r_{28} = 109.4189$ | $d_{28} = 2$ | $n_{d_{17}} = 1.762$ | $\nu_{d_{17}} = 40.1$ |
| $r_{29} = 41.8065$ | $d_{29} = 4.1948$ | $n_{d_{18}} = 1.497$ | $\nu_{d_{18}} = 81.54$ |
| $r_{30} = -21.6991$ | $d_{30} = 0.1$ | | |
| $r_{31} = 93.0066$ | $d_{31} = 2.4973$ | $n_{d_{19}} = 1.7185$ | $\nu_{d_{19}} = 33.52$ |
| $r_{32} = 31.9759$ | $d_{32} = 4.63$ | $n_{d_{20}} = 1.497$ | $\nu_{d_{20}} = 81.54$ |
| $r_{33} = -30.4422$ | $d_{33} = d3$ (Variable) | | |
| $r_{34} = 68.7541$ | $d_{34} = 7.7321$ | $n_{d_{21}} = 1.48749$ | $\nu_{d_{21}} = 70.21$ |
| $r_{35} = -37.5679$ | $d_{35} = 3.4742$ | $n_{d_{22}} = 1.8061$ | $\nu_{d_{22}} = 40.95$ |
| $r_{36} = -102.8477$ | $d_{36} = 0.6973$ | | |
| $r_{37} = 84.3099$ | $d_{37} = 6.0238$ | $n_{d_{23}} = 1.834$ | $\nu_{d_{23}} = 37.17$ |
| $r_{38} = -50.71$ | $d_{38} = 3.0298$ | $n_{d_{24}} = 1.6445$ | $\nu_{d_{24}} = 40.82$ |
| $r_{39} = 40.6619$ | $d_{39} = 157.0375$ | | |
| $r_{40} = \infty$ (Image plane) | | | |

Zooming Data

| M | 10 X | 20 X | 30 X |
|---|---|---|---|
| d1 | 0.69938 | 8.15942 | 9.64603 |
| d2 | 8.4951 | 4.8404 | 1.1858 |
| d3 | 75.63512 | 74.82978 | 76.99777 |
| φ | 5.1554 | 8.2924 | 11.48 |
| NA | 0.25 | 0.4 | 0.55 |
| IH | 11 | 11 | 11 |

EXAMPLE 3

| | | | |
|---|---|---|---|
| $r_1 = \infty$ (Object plane) | $d_1 = 0.17$ | $n_{d_1} = 1.521$ | $\nu_{d_1} = 56.02$ |
| $r_2 = \infty$ | $d_2 = 1.2122$ | | |
| $r_3 = -9.0363$ | $d_3 = 1.0066$ | $n_{d_2} = 1.8061$ | $\nu_{d_2} = 40.92$ |
| $r_4 = 7.9051$ | $d_4 = 2.6665$ | $n_{d_3} = 1.48749$ | $\nu_{d_3} = 70.23$ |
| $r_5 = -15.8132$ | $d_5 = 0.1$ | | |
| $r_6 = -35.8191$ | $d_6 = 2.7258$ | $n_{d_4} = 1.755$ | $\nu_{d_4} = 52.32$ |
| $r_7 = -7.6127$ | $d_7 = 0.1$ | | |
| $r_8 = 19.8866$ | $d_8 = 3.9235$ | $n_{d_5} = 1.8061$ | $\nu_{d_5} = 40.92$ |
| $r_9 = 12.361$ | $d_9 = 4.5515$ | $n_{d_6} = 1.497$ | $\nu_{d_6} = 81.54$ |
| $r_{10} = -12.6055$ | $d_{10} = 0.191$ | | |
| $r_{11} = 77.8705$ | $d_{11} = 1.5$ | $n_{d_7} = 1.6445$ | $\nu_{d_7} = 40.82$ |
| $r_{12} = 16.3541$ | $d_{12} = 3.4674$ | $n_{d_8} = 1.497$ | $\nu_{d_8} = 81.54$ |
| $r_{13} = -17.8218$ | $d_{13} = 0.1$ | | |
| $r_{14} = 36.3563$ | $d_{14} = 1.499$ | $n_{d_9} = 1.755$ | $\nu_{d_9} = 52.32$ |
| $r_{15} = 8.1097$ | $d_{15} = 3.9374$ | $n_{d_{10}} = 1.497$ | $\nu_{d_{10}} = 81.54$ |
| $r_{16} = -34.0757$ | $d_{16} = 0.1$ | | |
| $r_{17} = 38.4458$ | $d_{17} = 1.6471$ | $n_{d_{11}} = 1.48749$ | $\nu_{d_{11}} = 70.23$ |
| $r_{18} = 49.5166$ | $d_{18} = 1.5$ | | |
| $r_{19} = \infty$ (Stop) | $d_{19} = d1$ (Variable) | | |
| $r_{20} = -40.313$ | $d_{20} = 1.5$ | $n_{d_{12}} = 1.68893$ | $\nu_{d_{12}} = 31.07$ |
| $r_{21} = 5.5556$ | $d_{21} = 2.3961$ | $n_{d_{13}} = 1.741$ | $\nu_{d_{13}} = 52.64$ |
| $r_{22} = 9.6596$ | $d_{22} = 2.1489$ | | |
| $r_{23} = -8.8235$ | $d_{23} = 1.4$ | $n_{d_{14}} = 1.51633$ | $\nu_{d_{14}} = 64.14$ |
| $r_{24} = 18.9069$ | $d_{24} = 3.0602$ | $n_{d_{15}} = 1.80518$ | $\nu_{d_{15}} = 25.42$ |
| $r_{25} = -18.4418$ | $d_{25} = d2$ (Variable) | | |
| $r_{26} = -190.2618$ | $d_{26} = 3.121$ | $n_{d_{16}} = 1.6516$ | $\nu_{d_{16}} = 58.55$ |
| $r_{27} = -24.309$ | $d_{27} = 0.1$ | | |
| $r_{28} = 53.8545$ | $d_{28} = 4.253$ | $n_{d_{17}} = 1.48749$ | $\nu_{d_{17}} = 70.23$ |
| $r_{29} = -24.4619$ | $d_{29} = 2$ | $n_{d_{18}} = 1.7185$ | $\nu_{d_{18}} = 33.52$ |
| $r_{30} = 351.2811$ | $d_{30} = d3$ (Variable) | | |
| $r_{31} = 68.7541$ | $d_{31} = 7.7321$ | $n_{d_{19}} = 1.48749$ | $\nu_{d_{19}} = 70.21$ |
| $r_{32} = -37.5679$ | $d_{32} = 3.4742$ | $n_{d_{20}} = 1.8061$ | $\nu_{d_{20}} = 40.95$ |
| $r_{33} = -102.8477$ | $d_{33} = 0.6973$ | | |
| $r_{34} = 84.3099$ | $d_{34} = 6.0238$ | $n_{d_{21}} = 1.834$ | $\nu_{d_{21}} = 37.17$ |
| $r_{35} = -50.71$ | $d_{35} = 3.0298$ | $n_{d_{22}} = 1.6445$ | $\nu_{d_{22}} = 40.82$ |
| $r_{36} = 40.6619$ | $d_{36} = 157.0375$ | | |
| $r_{37} = \infty$ (Image plane) | | | |

Zooming Data

| M | 10 X | 20 X | 40 X |
|---|---|---|---|
| d1 | 1.04004 | 22.99388 | 33.97095 |
| d2 | 15.6774 | 10.6185 | 0.5006 |
| d3 | 82.90536 | 66.01042 | 65.15125 |
| φ | 4.0526 | 6.4906 | 9.746 |
| NA | 0.25 | 0.4 | 0.6 |
| IH | 11 | 11 | 11 |

EXAMPLE 4

| | | | |
|---|---|---|---|
| $r_1 = \infty$ (Object plane) | $d_1 = 0.1700$ | $n_{d_1} = 1.521$ | $\nu_{d_1} = 56.02$ |
| $r_2 = \infty$ | $d_2 = 0.9086$ | | |
| $r_3 = -8.3465$ | $d_3 = 3.0098$ | $n_{d_2} = 1.7859$ | $\nu_{d_2} = 44.2$ |
| $r_4 = 35.9059$ | $d_4 = 3.8833$ | $n_{d_3} = 1.48749$ | $\nu_{d_3} = 72.23$ |
| $r_5 = -6.4314$ | $d_5 = 0.1$ | | |
| $r_6 = 31.3516$ | $d_6 = 3.0596$ | $n_{d_4} = 1.56907$ | $\nu_{d_4} = 71.3$ |
| $r_7 = -10.848$ | $d_7 = 0.454$ | | |
| $r_8 = -25.0084$ | $d_8 = 1.5$ | $n_{d_5} = 1.755$ | $\nu_{d_5} = 52.32$ |
| $r_9 = 13.8246$ | $d_9 = 4.6417$ | $n_{d_6} = 1.43875$ | $\nu_{d_6} = 94.99$ |
| $r_{10} = -13.1386$ | $d_{10} = 0.1$ | | |
| $r_{11} = -420.0332$ | $d_{11} = 1.6676$ | $n_{d_7} = 1.497$ | $\nu_{d_7} = 81.54$ |
| $r_{12} = -28.9782$ | $d_{12} = 0.1$ | | |
| $r_{13} = 66.4302$ | $d_{13} = 1.6718$ | $n_{d_8} = 1.497$ | $\nu_{d_8} = 81.54$ |
| $r_{14} = -58.2051$ | $d_{14} = 0.1$ | | |
| $r_{15} = 13.5075$ | $d_{15} = 1.5$ | $n_{d_9} = 1.8061$ | $\nu_{d_9} = 40.92$ |
| $r_{16} = 10.0499$ | $d_{16} = 3.7492$ | $n_{d_{10}} = 1.43875$ | $\nu_{d_{10}} = 94.99$ |

-continued

| | | | |
|---|---|---|---|
| $r_{17} = -34.9543$ | $d_{17} = 0.1$ | | |
| $r_{18} = 20.4652$ | $d_{18} = 2.2473$ | $n_{d_{11}} = 1.51742$ | $v_{d_{11}} = 52.43$ |
| $r_{19} = 8.0383$ | $d_{19} = 1.6504$ | | |
| $r_{20} = \infty$ (Stop) | $d_{20} = d1$ (Variable) | | |
| $r_{21} = -37.9426$ | $d_{21} = 1$ | $n_{d_{12}} = 1.80518$ | $v_{d_{12}} = 25.42$ |
| $r_{22} = 10.7939$ | $d_{22} = 1.6234$ | $n_{d_{13}} = 1.755$ | $v_{d_{13}} = 52.32$ |
| $r_{23} = 30.3865$ | $d_{23} = 1.882$ | | |
| $r_{24} = -7.1914$ | $d_{24} = 1.3844$ | $n_{d_{14}} = 1.52249$ | $v_{d_{14}} = 59.84$ |
| $r_{25} = -33.8899$ | $d_{25} = 3.973$ | $n_{d_{15}} = 1.80518$ | $v_{d_{15}} = 25.42$ |
| $r_{26} = -11.1597$ | $d_{26} = d2$ (Variable) | | |
| $r_{27} = 74.2462$ | $d_{27} = 2$ | $n_{d_{16}} = 1.48749$ | $v_{d_{16}} = 70.23$ |
| $r_{28} = -2533.9503$ | $d_{28} = 0.1$ | | |
| $r_{29} = 306.9444$ | $d_{29} = 2.6671$ | $n_{d_{17}} = 1.8061$ | $v_{d_{17}} = 40.92$ |
| $r_{30} = 51.5972$ | $d_{30} = 3.2803$ | $n_{d_{18}} = 1.497$ | $v_{d_{18}} = 81.54$ |
| $r_{31} = -107.3929$ | $d_{31} = d3$ (Variable) | | |
| $r_{32} = 68.7541$ | $d_{32} = 7.7321$ | $n_{d_{19}} = 1.48749$ | $v_{d_{19}} = 70.23$ |
| $r_{33} = -37.5679$ | $d_{33} = 3.4742$ | $n_{d_{20}} = 1.8061$ | $v_{d_{20}} = 40.95$ |
| $r_{34} = -102.8477$ | $d_{34} = 0.6973$ | | |
| $r_{35} = 84.3099$ | $d_{35} = 6.0238$ | $n_{d_{21}} = 1.834$ | $v_{d_{21}} = 37.17$ |
| $r_{36} = -50.71$ | $d_{36} = 3.0298$ | $n_{d_{22}} = 1.6445$ | $v_{d_{22}} = 40.82$ |
| $r_{37} = 40.6619$ | $d_{37} = 157.0375$ | | |
| $r_{38} = \infty$ (Image plane) | | | |

Zooming Data

| M | 10 X | 20 X | 30 X |
|---|---|---|---|
| d1 | 0.596 | 22.1568 | 29.3437 |
| d2 | 48.8858 | 24.7095 | 0.5332 |
| d3 | 51.9947 | 54.6102 | 71.5996 |
| φ | 3.7168 | 5.9484 | 8.179 |
| NA | 0.25 | 0.4 | 0.55 |
| IH | 11 | 11 | 11 |

EXAMPLE 5

| | | | |
|---|---|---|---|
| $r_1 = \infty$ (Object plane) | $d_1 = 0.17$ | $n_{d_1} = 1.521$ | $v_{d_1} = 56.02$ |
| $r_2 = \infty$ | $d_2 = 0.8945$ | | |
| $r_3 = -9.5638$ | $d_3 = 3.3657$ | $n_{d_2} = 1.8061$ | $v_{d_2} = 40.92$ |
| $r_4 = 10.3506$ | $d_4 = 4.2101$ | $n_{d_3} = 1.48749$ | $v_{d_3} = 70.23$ |
| $r_5 = -9.6255$ | $d_5 = 0.2273$ | | |
| $r_6 = 75.6687$ | $d_6 = 3.6239$ | $n_{d_4} = 1.755$ | $v_{d_4} = 52.32$ |
| $r_7 = -13.6112$ | $d_7 = 0.5615$ | | |
| $r_8 = 150.294$ | $d_8 = 1.5205$ | $n_{d_5} = 1.8061$ | $v_{d_5} = 40.92$ |
| $r_9 = 16.2558$ | $d_9 = 5.7034$ | $n_{d_6} = 1.43875$ | $v_{d_6} = 94.99$ |
| $r_{10} = -15.8587$ | $d_{10} = 0.2931$ | | |
| $r_{11} = 492.756$ | $d_{11} = 6.5164$ | $n_{d_7} = 1.497$ | $v_{d_7} = 81.54$ |
| $r_{12} = -18.8068$ | $d_{12} = 0.1$ | | |
| $r_{13} = 29.8741$ | $d_{13} = 1.5$ | $n_{d_8} = 1.834$ | $v_{d_8} = 37.16$ |
| $r_{14} = 11.2851$ | $d_{14} = 6.9642$ | $n_{d_9} = 1.43875$ | $v_{d_9} = 94.99$ |
| $r_{15} = -48.793$ | $d_{15} = 1.9346$ | | |
| $r_{16} = 25.1987$ | $d_{16} = 2.7489$ | $n_{d_{10}} = 1.56907$ | $v_{d_{10}} = 71.3$ |
| $r_{17} = -331.8308$ | $d_{17} = 0.7$ | | |
| $r_{18} = \infty$ (Stop) | $d_{18} = d1$ (Variable) | | |
| $r_{19} = -50.6542$ | $d_{19} = 6.3045$ | $n_{d_{11}} = 1.80518$ | $v_{d_{11}} = 25.42$ |
| $r_{20} = -12.715$ | $d_{20} = 1.4188$ | $n_{d_{12}} = 1.6968$ | $v_{d_{12}} = 55.53$ |
| $r_{21} = 8.6825$ | $d_{21} = 3.1734$ | $n_{d_{13}} = 1.80518$ | $v_{d_{13}} = 25.42$ |
| $r_{22} = 10.4294$ | $d_{22} = 1.2264$ | | |
| $r_{23} = -13.2878$ | $d_{23} = 1.7953$ | $n_{d_{14}} = 1.5725$ | $v_{d_{14}} = 57.74$ |
| $r_{24} = 11.3351$ | $d_{24} = 2.0037$ | $n_{d_{15}} = 1.834$ | $v_{d_{15}} = 37.16$ |
| $r_{25} = 25.9848$ | $d_{25} = d2$ (Variable) | | |
| $r_{26} = -73.3038$ | $d_{26} = 2$ | $n_{d_{16}} = 1.59551$ | $v_{d_{16}} = 39.24$ |
| $r_{27} = 55.8408$ | $d_{27} = 6.968$ | $n_{d_{17}} = 1.51633$ | $v_{d_{17}} = 64.14$ |
| $r_{28} = -35.8407$ | $d_{28} = 0.96$ | | |
| $r_{29} = 83.1011$ | $d_{29} = 2.5213$ | $n_{d_{18}} = 1.7185$ | $v_{d_{18}} = 33.52$ |
| $r_{30} = 43.1902$ | $d_{30} = 5.9392$ | $n_{d_{19}} = 1.497$ | $v_{d_{19}} = 81.54$ |
| $r_{31} = -35.3886$ | $d_{31} = d3$ (Variable) | | |
| $r_{32} = 68.7541$ | $d_{32} = 7.7321$ | $n_{d_{20}} = 1.48749$ | $v_{d_{20}} = 70.21$ |
| $r_{33} = -37.5679$ | $d_{33} = 3.4742$ | $n_{d_{21}} = 1.8061$ | $v_{d_{21}} = 40.95$ |
| $r_{34} = -102.8477$ | $d_{34} = 0.6973$ | | |
| $r_{35} = 84.3099$ | $d_{35} = 6.0238$ | $n_{d_{22}} = 1.834$ | $v_{d_{22}} = 37.17$ |
| $r_{36} = -50.71$ | $d_{36} = 3.0298$ | $n_{d_{23}} = 1.6445$ | $v_{d_{23}} = 40.82$ |
| $r_{37} = 40.6619$ | $d_{37} = 157.0375$ | | |
| $r_{38} = \infty$ (Image plane) | | | |

Zooming Data

| M | 10 X | 20 X | 30 X |
|---|---|---|---|
| d1 | 3.0614 | 8.0932 | 6.83529 |
| d2 | 14.7575 | 1.0034 | 7.8804 |
| d3 | 56.8364 | 65.5587 | 59.93961 |
| φ | 4.7882 | 7.6802 | 10.596 |
| NA | 0.25 | 0.4 | 0.55 |
| IH | 11 | 11 | 11 |

EXAMPLE 6

| | | | |
|---|---|---|---|
| $r_1 = \infty$ (Object plane) | $d_1 = 0.17$ | $n_{d_1} = 1.521$ | $v_{d_1} = 56.02$ |
| $r_2 = \infty$ | $d_2 = 1.2393$ | | |
| $r_3 = -7.2882$ | $d_3 = 1$ | $n_{d_2} = 1.8061$ | $v_{d_2} = 40.92$ |
| $r_4 = 9.3364$ | $d_4 = 2.8008$ | $n_{d_3} = 1.48749$ | $v_{d_3} = 70.23$ |
| $r_5 = -9.2642$ | $d_5 = 0.1$ | | |
| $r_6 = -36.1528$ | $d_6 = 2.3508$ | $n_{d_4} = 1.755$ | $v_{d_4} = 52.32$ |
| $r_7 = -8.2813$ | $d_7 = 0.1$ | | |
| $r_8 = 19.1898$ | $d_8 = 3.6946$ | $n_{d_5} = 1.8061$ | $v_{d_5} = 40.92$ |
| $r_9 = 11.7194$ | $d_9 = 4.6385$ | $n_{d_6} = 1.497$ | $v_{d_6} = 81.54$ |
| $r_{10} = -12.4231$ | $d_{10} = 0.4885$ | | |
| $r_{11} = -148.9692$ | $d_{11} = 1.5$ | $n_{d_7} = 1.6445$ | $v_{d_7} = 40.82$ |
| $r_{12} = 26.49$ | $d_{12} = 3.0422$ | $n_{d_8} = 1.497$ | $v_{d_8} = 81.54$ |
| $r_{13} = -17.2294$ | $d_{13} = 0.1914$ | | |
| $r_{14} = 128.1662$ | $d_{14} = 1.5$ | $n_{d_9} = 1.755$ | $v_{d_9} = 52.32$ |
| $r_{15} = 9.2471$ | $d_{15} = 3.9865$ | $n_{d_{10}} = 1.497$ | $v_{d_{10}} = 81.54$ |
| $r_{16} = -27.9432$ | $d_{16} = 0.5113$ | | |
| $r_{17} = 50.4649$ | $d_{17} = 2.0653$ | $n_{d_{11}} = 1.48749$ | $v_{d_{11}} = 70.23$ |
| $r_{18} = -93.4836$ | $d_{18} = 1.5$ | | |
| $r_{19} = \infty$ (Stop) | $d_{19} = d1$ (Variable) | | |
| $r_{20} = -27.3478$ | $d_{20} = 1$ | $n_{d_{12}} = 1.68893$ | $v_{d_{12}} = 31.07$ |
| $r_{21} = 6.5094$ | $d_{21} = 3.2235$ | $n_{d_{13}} = 1.741$ | $v_{d_{13}} = 52.64$ |
| $r_{22} = 11.4964$ | $d_{22} = 2.2337$ | | |
| $r_{23} = -10.8896$ | $d_{23} = 1.0014$ | $n_{d_{14}} = 1.51633$ | $v_{d_{14}} = 64.14$ |
| $r_{24} = 18.5149$ | $d_{24} = 3.3224$ | $n_{d_{15}} = 1.80518$ | $v_{d_{15}} = 25.42$ |
| $r_{25} = -20.2064$ | $d_{25} = d2$ (Variable) | | |
| $r_{26} = 1064.6111$ | $d_{26} = 3.2007$ | $n_{d_{16}} = 1.755$ | $v_{d_{16}} = 52.32$ |
| $r_{27} = -29.0219$ | $d_{27} = 0.1$ | | |
| $r_{28} = 33.9989$ | $d_{28} = 4.7111$ | $n_{d_{17}} = 1.48749$ | $v_{d_{17}} = 70.23$ |
| $r_{29} = -27.5562$ | $d_{29} = 2$ | $n_{d_{18}} = 1.7185$ | $v_{d_{18}} = 33.52$ |
| $r_{30} = 54.4101$ | $d_{30} = d3$ (Variable) | | |
| $r_{31} = 68.7541$ | $d_{31} = 7.7321$ | $n_{d_{19}} = 1.48749$ | $v_{d_{19}} = 70.21$ |
| $r_{32} = -37.5679$ | $d_{32} = 3.4742$ | $n_{d_{20}} = 1.8061$ | $v_{d_{20}} = 40.95$ |
| $r_{33} = -102.8477$ | $d_{33} = 0.6973$ | | |
| $r_{34} = 84.3099$ | $d_{34} = 6.0238$ | $n_{d_{21}} = 1.834$ | $v_{d_{21}} = 37.17$ |
| $r_{35} = -50.71$ | $d_{35} = 3.0298$ | $n_{d_{22}} = 1.6445$ | $v_{d_{22}} = 40.82$ |
| $r_{36} = 40.6619$ | $d_{36} = 157.0375$ | | |
| $r_{37} = \infty$ (Image plane) | | | |

Zooming Data

| M | 10 X | 20 X | 40 X |
|---|---|---|---|
| d1 | 0.99814 | 42.9967 | 28.9972 |
| d2 | 15.19042 | 0.5 | 10.29361 |
| d3 | 82.13944 | 54.8313 | 59.03719 |
| φ | 4.429 | 7.0904 | 10.6488 |

|    | 0.25 | 0.4 | 0.6 |
|----|------|-----|-----|
| NA | 0.25 | 0.4 | 0.6 |
| IH | 11   | 11  | 11  |

EXAMPLE 7

| $r_1 = \infty$ (Object plane) | $d_1 = 0.17$ | $n_{d_1} = 1.521$ | $\nu_{d_1} = 56.02$ |
|---|---|---|---|
| $r_2 = \infty$ | $d_2 = d1$ (Variable) | | |
| $r_3 = -8.3019$ | $d_3 = 1$ | $n_{d_2} = 1.834$ | $\nu_{d_2} = 37.16$ |
| $r_4 = 6.4507$ | $d_4 = 4.2918$ | $n_{d_3} = 1.48749$ | $\nu_{d_3} = 70.23$ |
| $r_5 = -7.8311$ | $d_5 = 0.1$ | | |
| $r_6 = 68.897$ | $d_6 = 2.8784$ | $n_{d_4} = 1.56907$ | $\nu_{d_4} = 71.3$ |
| $r_7 = -11.319$ | $d_7 = 0.1$ | | |
| $r_8 = 45.2412$ | $d_8 = 2.5681$ | $n_{d_5} = 1.788$ | $\nu_{d_5} = 47.37$ |
| $r_9 = 13.5882$ | $d_9 = 5.8351$ | $n_{d_6} = 1.497$ | $\nu_{d_6} = 81.54$ |
| $r_{10} = -12.5255$ | $d_{10} = 0.2679$ | | |
| $r_{11} = -149.1941$ | $d_{11} = 2.4538$ | $n_{d_7} = 1.497$ | $\nu_{d_7} = 81.54$ |
| $r_{12} = -18.0412$ | $d_{12} = 0.1737$ | | |
| $r_{13} = 53.2667$ | $d_{13} = 1.5$ | $n_{d_8} = 1.804$ | $\nu_{d_8} = 46.57$ |
| $r_{14} = 10.1594$ | $d_{14} = 4.3817$ | $n_{d_9} = 1.43875$ | $\nu_{d_9} = 94.99$ |
| $r_{15} = -32.9683$ | $d_{15} = 0.1$ | | |
| $r_{16} = 46.3599$ | $d_{16} = 3.5337$ | $n_{d_{10}} = 1.497$ | $\nu_{d_{10}} = 81.54$ |
| $r_{17} = -120.4005$ | $d_{17} = 5.2827$ | | |
| $r_{18} = \infty$ (Stop) | $d_{18} = d2$ (Variable) | | |
| $r_{19} = -26.6871$ | $d_{19} = 1.6491$ | $n_{d_{11}} = 1.741$ | $\nu_{d_{11}} = 52.64$ |
| $r_{20} = 17.3743$ | $d_{20} = 1.5$ | $n_{d_{12}} = 1.7552$ | $\nu_{d_{12}} = 27.51$ |
| $r_{21} = 13.3797$ | $d_{21} = 1.2996$ | | |
| $r_{22} = -20.2202$ | $d_{22} = 1$ | $n_{d_{13}} = 1.51823$ | $\nu_{d_{13}} = 58.9$ |
| $r_{23} = 13.0468$ | $d_{23} = 2$ | $n_{d_{14}} = 1.80518$ | $\nu_{d_{14}} = 25.42$ |
| $r_{24} = -262.3134$ | $d_{24} = d3$ (Variable) | | |
| $r_{25} = 83.2607$ | $d_{25} = 2.5$ | $n_{d_{15}} = 1.497$ | $\nu_{d_{15}} = 81.54$ |
| $r_{26} = -43.6491$ | $d_{26} = 0.1$ | | |
| $r_{27} = 178.5261$ | $d_{27} = 2.5$ | $n_{d_{16}} = 1.7185$ | $\nu_{d_{16}} = 33.52$ |
| $r_{28} = 26.3141$ | $d_{28} = 3.6857$ | $n_{d_{17}} = 1.48749$ | $\nu_{d_{17}} = 70.23$ |
| $r_{29} = -31.12$ | $d_{29} = d4$ (Variable) | | |
| $r_{30} = 68.7541$ | $d_{30} = 7.7321$ | $n_{d_{18}} = 1.48749$ | $\nu_{d_{18}} = 70.21$ |
| $r_{31} = -37.5679$ | $d_{31} = 3.4742$ | $n_{d_{19}} = 1.8061$ | $\nu_{d_{19}} = 40.95$ |
| $r_{32} = -102.8477$ | $d_{32} = 0.6973$ | | |
| $r_{33} = 84.3099$ | $d_{33} = 6.0238$ | $n_{d_{20}} = 1.834$ | $\nu_{d_{20}} = 37.17$ |
| $r_{34} = -50.71$ | $d_{34} = 3.0298$ | $n_{d_{21}} = 1.6445$ | $\nu_{d_{21}} = 40.82$ |
| $r_{35} = 40.6619$ | $d_{35} = 157.0375$ | | |
| $r_{36} = \infty$ (Image plane) | | | |

Zooming Data

| M  | 10 X     | 20 X     | 40 X     |
|----|----------|----------|----------|
| d1 | 1.3286   | 1.12623  | 1.12623  |
| d2 | 2.21194  | 20.44934 | 28.60706 |
| d3 | 12.8003  | 9.0681   | 0.4949   |
| d4 | 82.78786 | 68.48503 | 68.90051 |
| φ  | 4.4154   | 7.0784   | 10.6458  |
| NA | 0.25     | 0.4      | 0.6      |
| IH | 11       | 11       | 11       |

EXAMPLE 8

| $r_1 = \infty$ (Object plane) | $d_1 = 0.17$ | $n_{d_1} = 1.521$ | $\nu_{d_1} = 56.02$ |
|---|---|---|---|
| $r_2 = \infty$ | $d_2 = 1.0793$ | | |
| $r_3 = -12.2497$ | $d_3 = 1$ | $n_{d_2} = 1.834$ | $\nu_{d_2} = 37.16$ |
| $r_4 = 6.0798$ | $d_4 = 4.2136$ | $n_{d_3} = 1.48749$ | $\nu_{d_3} = 70.23$ |
| $r_5 = -6.9892$ | $d_5 = 0.1$ | | |
| $r_6 = 38.8113$ | $d_6 = 2.9273$ | $n_{d_4} = 1.56907$ | $\nu_{d_4} = 71.3$ |
| $r_7 = -11.095$ | $d_7 = 0.1163$ | | |
| $r_8 = 148.971$ | $d_8 = 1.6507$ | $n_{d_5} = 1.788$ | $\nu_{d_5} = 47.37$ |
| $r_9 = 12.6434$ | $d_9 = 5.655$ | $n_{d_6} = 1.497$ | $\nu_{d_6} = 81.54$ |
| $r_{10} = -11.1689$ | $d_{10} = 0.1$ | | |
| $r_{11} = 746.8201$ | $d_{11} = 2.3452$ | $n_{d_7} = 1.497$ | $\nu_{d_7} = 81.54$ |
| $r_{12} = -18.2582$ | $d_{12} = 0.1$ | | |
| $r_{13} = 23.1461$ | $d_{13} = 1.5$ | $n_{d_8} = 1.83481$ | $\nu_{d_8} = 42.72$ |
| $r_{14} = 8.6252$ | $d_{14} = 3.6657$ | $n_{d_9} = 1.43875$ | $\nu_{d_9} = 94.99$ |
| $r_{15} = -80.5901$ | $d_{15} = 1.481$ | | |
| $r_{16} = 33.2709$ | $d_{16} = 2.019$ | $n_{d_{10}} = 1.497$ | $\nu_{d_{10}} = 81.54$ |
| $r_{17} = -925.4498$ | $d_{17} = 1.9017$ | | |
| $r_{18} = \infty$ (Stop) | $d_{18} = d1$ (Variable) | | |
| $r_{19} = -27.4001$ | $d_{19} = 1$ | $n_{d_{11}} = 1.741$ | $\nu_{d_{11}} = 52.64$ |
| $r_{20} = 11.6867$ | $d_{20} = 1.5$ | $n_{d_{12}} = 1.7552$ | $\nu_{d_{12}} = 27.51$ |
| $r_{21} = 9.636$ | $d_{21} = 1.3273$ | | |
| $r_{22} = -13.2227$ | $d_{22} = 1$ | $n_{d_{13}} = 1.51823$ | $\nu_{d_{13}} = 58.9$ |
| $r_{23} = 10.7098$ | $d_{23} = 2$ | $n_{d_{14}} = 1.80518$ | $\nu_{d_{14}} = 25.42$ |
| $r_{24} = -448.6151$ | $d_{24} = d2$ (Variable) | | |
| $r_{25} = 78.0384$ | $d_{25} = 2.5$ | $n_{d_{15}} = 1.497$ | $\nu_{d_{15}} = 81.54$ |
| $r_{26} = -28.0274$ | $d_{26} = 0.1$ | | |
| $r_{27} = 129.6035$ | $d_{27} = 2.5$ | $n_{d_{16}} = 1.7185$ | $\nu_{d_{16}} = 33.52$ |
| $r_{28} = 21.5549$ | $d_{28} = 3.7885$ | $n_{d_{17}} = 1.48749$ | $\nu_{d_{17}} = 70.23$ |
| $r_{29} = -26.524$ | $d_{29} = d3$ (Variable) | | |
| $r_{30} = 68.7541$ | $d_{30} = 7.7321$ | $n_{d_{18}} = 1.48749$ | $\nu_{d_{18}} = 70.21$ |
| $r_{31} = -37.5679$ | $d_{31} = 3.4742$ | $n_{d_{19}} = 1.8061$ | $\nu_{d_{19}} = 40.95$ |
| $r_{32} = -102.8477$ | $d_{32} = 0.6973$ | | |
| $r_{33} = 84.3099$ | $d_{33} = 6.0238$ | $n_{d_{20}} = 1.834$ | $\nu_{d_{20}} = 37.17$ |
| $r_{34} = -50.71$ | $d_{34} = 3.0298$ | $n_{d_{21}} = 1.6445$ | $\nu_{d_{21}} = 40.82$ |
| $r_{35} = 40.6619$ | $d_{35} = 157.0375$ | | |
| $r_{36} = \infty$ (Image plane) | | | |

Zooming Data

| M  | 10 X     | 20 X     | 40 X     |
|----|----------|----------|----------|
| d1 | 0.49981  | 18.48428 | 12.48916 |
| d2 | 9.71567  | 0.5      | 6.64372  |
| d3 | 94.04392 | 85.27516 | 85.12652 |
| φ  | 3.925    | 6.2938   | 9.4746   |
| NA | 0.25     | 0.4      | 0.6      |
| IH | 11       | 11       | 11       |

EXAMPLE 9

| $r_1 = \infty$ (Object plane) | $d_1 = 0.17$ | $n_{d_1} = 1.521$ | $\nu_{d_1} = 56.02$ |
|---|---|---|---|
| $r_2 = \infty$ | $d_2 = 1.0976$ | | |
| $r_3 = -9.4339$ | $d_3 = 3.077$ | $n_{d_2} = 1.834$ | $\nu_{d_2} = 37.16$ |
| $r_4 = 9.0446$ | $d_4 = 6.616$ | $n_{d_3} = 1.58913$ | $\nu_{d_3} = 61.14$ |
| $r_5 = -9.9879$ | $d_5 = 0.1$ | | |
| $r_6 = \infty$ | $d_6 = 3.833$ | $n_{d_4} = 1.56907$ | $\nu_{d_4} = 71.3$ |
| $r_7 = -15.3749$ (Aspheric) | $d_7 = 0.1$ | | |
| $r_8 = 583.6711$ | $d_8 = 3.414$ | $n_{d_5} = 1.43875$ | $\nu_{d_5} = 94.99$ |
| $r_9 = -22.1172$ | $d_9 = 0.1$ | | |
| $r_{10} = 35.9588$ (Aspheric) | $d_{10} = 3.828$ | $n_{d_6} = 1.43875$ | $\nu_{d_6} = 94.99$ |
| $r_{11} = -95.4689$ | $d_{11} = 1.5$ | $n_{d_7} = 1.834$ | $\nu_{d_7} = 37.16$ |
| $r_{12} = 37.0658$ | $d_{12} = 6.716$ | $n_{d_8} = 1.43875$ | $\nu_{d_8} = 94.99$ |
| $r_{13} = -13.1119$ (Aspheric) | $d_{13} = 0.1$ | | |
| $r_{14} = 16.7009$ | $d_{14} = 1.8$ | $n_{d_9} = 1.804$ | $\nu_{d_9} = 46.57$ |
| $r_{15} = 8.6521$ | $d_{15} = 7.834$ | $n_{d_{10}} = 1.43875$ | $\nu_{d_{10}} = 94.99$ |
| $r_{16} = -27.3134$ | $d_{16} = 1.5$ | | |
| $r_{17} = \infty$ (Stop) | $d_{17} = d1$ (Variable) | | |
| $r_{18} = -343.869$ | $d_{18} = 5$ | $n_{d_{11}} = 1.80518$ | $\nu_{d_{11}} = 25.42$ |
| $r_{19} = -9.8807$ | $d_{19} = 1$ | $n_{d_{12}} = 1.67003$ | $\nu_{d_{12}} = 47.23$ |
| $r_{20} = 10.0314$ | $d_{20} = 1.2366$ | | |
| $r_{21} = -11.1509$ | $d_{21} = 1$ | $n_{d_{13}} = 1.755$ | $\nu_{d_{13}} = 52.32$ |

-continued

| | | | |
|---|---|---|---|
| $r_{22} = 10.8034$ | $d_{22} = 1.9$ | $n_{d_{14}} = 1.74$ | $\nu_{d_{14}} = 28.3$ |
| $r_{23} = 90.7682$ | $d_{23} = d2$ (Variable) | | |
| $r_{24} = -531.983$ | $d_{24} = 3.644$ | $n_{d_{15}} = 1.56907$ | $\nu_{d_{15}} = 71.3$ |
| $r_{25} = -42.3948$ | $d_{15} = 0.1$ | | |
| $r_{26} = 132.2199$ | $d_{16} = 2$ | $n_{d_{16}} = 1.76182$ | $\nu_{d_{16}} = 26.52$ |
| $r_{27} = 54.4167$ | $d_{17} = 4.585$ | $n_{d_{17}} = 1.497$ | $\nu_{d_{17}} = 81.54$ |
| $r_{28} = -79.3145$ | $d_{18} = d3$ (Variable) | | |
| $r_{29} = 68.7541$ | $d_{19} = 7.7321$ | $n_{d_{18}} = 1.48749$ | $\nu_{d_{18}} = 70.21$ |
| $r_{30} = -37.5679$ | $d_{20} = 3.4742$ | $n_{d_{19}} = 1.8061$ | $\nu_{d_{19}} = 40.95$ |
| $r_{31} = -102.848$ | $d_{21} = 0.6973$ | | |
| $r_{32} = 84.3099$ | $d_{22} = 6.0238$ | $n_{d_{20}} = 1.834$ | $\nu_{d_{20}} = 37.17$ |
| $r_{33} = -50.71$ | $d_{23} = 3.0298$ | $n_{d_{21}} = 1.6445$ | $\nu_{d_{21}} = 40.82$ |
| $r_{34} = 40.6619$ | $d_{24} = 157.0436$ | | |
| $r_{35} = \infty$ (Image plane) | | | |

Aspherical Coefficients

7th surface $K = 0$
$A_4 = 6.7137 \times 10^{-6}$
$A_6 = -1.2296 \times 10^{-7}$
$A_8 = 0$
$A_{10} = 0$ 10th surface $K = 0$
$A_4 = 7.5356 \times 10^{-7}$
$A_6 = 1.9643 \times 10^{-8}$
$A_8 = 0$
$A_{10} = 0$ 13th surface $K = -0.8448$
$A_4 = 3.0742 \times 10^{-5}$
$A_6 = 1.4891 \times 10^{-9}$
$A_8 = 0$
$A_{10} = 0$ Zooming Data

| M | 10 X | 20 X | 40 X |
|---|---|---|---|
| d1 | 0.99158 | 3.64313 | 4.96891 |
| d2 | 29.48771 | 19.82495 | 0.49977 |
| d3 | 7.26951 | 14.28073 | 32.28012 |
| φ | 4.125 | 6.823 | 19.295 |
| NA | 0.25 | 0.4 | 0.7 |
| IH | 11 | 11 | 11 |

EXAMPLE 10

| | | | |
|---|---|---|---|
| $r_1 = \infty$ (Object plane) | $d_1 = 0.17$ | $n_{d_1} = 1.521$ | $\nu_{d_1} = 56.02$ |
| $r_2 = \infty$ | $d_2 = 1.2112$ | | |
| $r_3 = -4.9361$ | $d_3 = 1.02$ | $n_{d_2} = 1.7847$ | $\nu_{d_2} = 26.29$ |
| $r_4 = 253.4277$ | $d_4 = 2.3777$ | $n_{d_3} = 1.48749$ | $\nu_{d_3} = 70.23$ |
| $r_5 = -4.9396$ | $d_5 = 0.4471$ | | |
| $r_6 = 12.8957$ | $d_6 = 5.093$ | $n_{d_4} = 1.497$ | $\nu_{d_4} = 81.54$ |
| $r_7 = -7.0306$ | $d_7 = 1.642$ | $n_{d_5} = 1.741$ | $\nu_{d_5} = 52.64$ |
| $r_8 = 19.9591$ | $d_8 = 4.62$ | $n_{d_6} = 1.43875$ | $\nu_{d_6} = 94.99$ |
| $r_9 = -13.8083$ | $d_9 = 0.1$ | | |
| $r_{10} = 31.338$ | $d_{10} = 4.94$ | $n_{d_7} = 1.497$ | $\nu_{d_7} = 81.54$ |
| $r_{11} = -16.0632$ (Aspheric) | $d_{11} = 0.1$ | | |
| $r_{12} = 26.2537$ | $d_{12} = 5.3$ | $n_{d_8} = 1.43875$ | $\nu_{d_8} = 94.99$ |
| $r_{13} = -22.8474$ | $d_{13} = 0.1$ | | |
| $r_{14} = 17.5164$ | $d_{14} = 1.66$ | $n_{d_9} = 1.804$ | $\nu_{d_9} = 46.57$ |
| $r_{15} = 8.0689$ | $d_{15} = 5.985$ | $n_{d_{10}} = 1.43875$ | $\nu_{d_{10}} = 94.99$ |
| $r_{16} = -56.7416$ | $d_{16} = 2.7635$ | | |
| $r_{17} = \infty$ | $d_{17} = d1$ | | |
| (Stop) | (Variable) | | |
| $r_{18} = -39.6951$ | $d_{18} = 1.56$ | $n_{d_{11}} = 1.80518$ | $\nu_{d_{11}} = 25.42$ |
| $r_{19} = -7.829$ | $d_{19} = 0.937$ | $n_{d_{12}} = 1.67003$ | $\nu_{d_{12}} = 47.23$ |
| $r_{20} = 8.7512$ | $d_{20} = 1.0237$ | | |
| $r_{21} = -9.3583$ | $d_{21} = 0.99$ | $n_{d_{13}} = 1.72916$ | $\nu_{d_{13}} = 54.68$ |
| $r_{22} = 14.0731$ | $d_{22} = 1.9816$ | $n_{d_{14}} = 1.74$ | $\nu_{d_{14}} = 28.3$ |
| $r_{23} = \infty$ | $d_{23} = d2$ (Variable) | | |
| $r_{24} = -578.072$ | $d_{24} = 2.965$ | $n_{d_{15}} = 1.497$ | $\nu_{d_{15}} = 81.54$ |
| $r_{25} = -22.7327$ | $d_{15} = 0.1$ | | |
| $r_{26} = 109.3114$ | $d_{16} = 1.95$ | $n_{d_{16}} = 1.76182$ | $\nu_{d_{16}} = 26.52$ |
| $r_{27} = 37.3998$ | $d_{17} = 3.765$ | $n_{d_{17}} = 1.497$ | $\nu_{d_{17}} = 81.54$ |
| $r_{28} = -36.9985$ | $d_{18} = d3$ (Variable) | | |
| $r_{29} = 68.7541$ | $d_{19} = 7.7321$ | $n_{d_{18}} = 1.48749$ | $\nu_{d_{18}} = 70.21$ |
| $r_{30} = -37.5679$ | $d_{20} = 3.4742$ | $n_{d_{19}} = 1.8061$ | $\nu_{d_{19}} = 40.95$ |
| $r_{31} = -102.848$ | $d_{21} = 0.6973$ | | |
| $r_{32} = 84.3099$ | $d_{22} = 6.0238$ | $n_{d_{20}} = 1.834$ | $\nu_{d_{20}} = 37.17$ |
| $r_{33} = -50.71$ | $d_{23} = 3.0298$ | $n_{d_{21}} = 1.6445$ | $\nu_{d_{21}} = 40.82$ |
| $r_{34} = 40.6619$ | $d_{24} = 157.0436$ | | |
| $r_{35} = \infty$ (Image plane) | | | |

Aspherical Coefficients

11th surface $K = -0.0639$
$A_4 = 6.3528 \times 10^{-5}$
$A_6 = 2.5357 \times 10^{-7}$
$A_8 = 1.0715 \times 10^{-9}$
$A_{10} = 0$ Zooming Data

| M | 10 X | 20 X | 40 X |
|---|---|---|---|
| d1 | 2.90471 | 7.02218 | 9.08107 |
| d2 | 13.81621 | 9.39132 | 0.54182 |
| d3 | 30.47728 | 30.7847 | 37.57531 |
| φ | 4.18 | 6.73 | 11.03 |
| NA | 0.25 | 0.4 | 0.65 |
| IH | 11 | 11 | 11 |

EXAMPLE 11

| | | | |
|---|---|---|---|
| $r_0 = \infty$ (Object plane) | $d_0 = 0.1700$ | $n_{d_0} = 1.521$ | $\nu_{d_0} = 56.02$ |
| $r_1 = \infty$ | $d_1 = 1.2356$ | | |
| $r_2 = -6.1723$ | $d_2 = 1.0726$ | $n_{d_1} = 1.834$ | $\nu_{d_1} = 37.16$ |
| $r_3 = 10.8292$ | $d_3 = 4.0318$ | $n_{d_2} = 1.48749$ | $\nu_{d_2} = 70.23$ |
| $r_4 = -5.0915$ | $d_4 = 0.13$ | | |
| $r_5 = -25.5833$ | $d_5 = 1.6331$ | $n_{d_3} = 1.58144$ | $\nu_{d_3} = 40.75$ |
| $r_6 = -46.648$ | $d_6 = 3.7009$ | $n_{d_4} = 1.755$ | $\nu_{d_4} = 52.32$ |
| $r_7 = -11.7579$ | $d_7 = 0.1$ | | |
| $r_8 = 205.695$ | $d_8 = 1.7$ | $n_{d_5} = 1.8061$ | $\nu_{d_5} = 40.92$ |
| $r_9 = 26.4027$ | $d_9 = 7.0346$ | $n_{d_6} = 1.43875$ | $\nu_{d_6} = 94.99$ |
| $r_{10} = -11.9025$ | $d_{10} = 0.1$ | | |
| $r_{11} = 43.7949$ | $d_{11} = 3.0837$ | $n_{d_7} = 1.43875$ | $\nu_{d_7} = 94.99$ |
| $r_{12} = -34.6252$ | $d_{12} = 0.13$ | | |
| $r_{13} = 20.6705$ | $d_{13} = 1.8$ | $n_{d_8} = 1.834$ | $\nu_{d_8} = 37.16$ |
| $r_{14} = 9.3595$ | $d_{14} = 4.8933$ | $n_{d_9} = 1.43875$ | $\nu_{d_9} = 94.99$ |
| $r_{15} = -47.5505$ | $d_{15} =$ (Variable) | | |
| $r_{16} = -22.9975$ | $d_{16} = 1$ | $n_{d_{10}} = 1.74077$ | $\nu_{d_{10}} = 27.79$ |
| $r_{17} = 244.4197$ | $d_{17} = 1$ | $n_{d_{11}} = 1.755$ | $\nu_{d_{11}} = 52.32$ |
| $r_{18} = 13.5521$ | $d_{18} = 1.1141$ | | |
| $r_{19} = -15.2756$ | $d_{19} = 1.0451$ | $n_{d_{12}} = 1.755$ | $\nu_{d_{12}} = 52.32$ |
| $r_{20} = 11.9507$ | $d_{20} = 2.4994$ | $n_{d_{13}} = 1.80518$ | $\nu_{d_{13}} = 25.42$ |
| $r_{21} = -33.2919$ | $d_{21} =$ (Variable) | | |
| $r_{22} = -88.3292$ | $d_{22} = 1.7$ | $n_{d_{14}} = 1.76182$ | $\nu_{d_{14}} = 26.52$ |
| $r_{23} = 32.7918$ | $d_{23} = 3.4191$ | $n_{d_{15}} = 1.497$ | $\nu_{d_{15}} = 81.54$ |
| $r_{24} = -18.596$ | $d_{24} = 0.1$ | | |

-continued

| | | | |
|---|---|---|---|
| $r_{25} = 52.2958$ | $d_{25} = 3.1779$ | $n_{d_{16}} = 1.56907$ | $\nu_{d_{16}} = 71.3$ |
| $r_{26} = -20.5559$ | $d_{26} =$ (Variable) | | |
| $r_{27} = 23.96$ | $d_{27} = 2.4303$ | $n_{d_{17}} = 1.755$ | $\nu_{d_{17}} = 52.32$ |
| $r_{28} = 144.8645$ | $d_{28} = 1.5653$ | $n_{d_{18}} = 1.64769$ | $\nu_{d_{18}} = 33.79$ |
| $r_{29} = 24.0201$ | $d_{29} = 1.8706$ | | |
| $r_{30} = -20.4538$ | $d_{30} = 2.0686$ | $n_{d_{19}} = 1.48749$ | $\nu_{d_{19}} = 70.23$ |
| $r_{31} = 13.5988$ | $d_{31} = 2.3819$ | $n_{d_{20}} = 1.76182$ | $\nu_{d_{20}} = 26.52$ |
| $r_{32} = 22.3222$ | $d_{32} =$ (Variable) | | |
| $r_{33} = 68.7541$ | $d_{33} = 7.7321$ | $n_{d_{21}} = 1.48749$ | $\nu_{d_{21}} = 70.21$ |
| $r_{34} = -37.5679$ | $d_{34} = 3.4742$ | $n_{d_{22}} = 1.8061$ | $\nu_{d_{22}} = 40.95$ |
| $r_{35} = -102.848$ | $d_{35} = 0.6973$ | | |
| $r_{36} = 84.3099$ | $d_{36} = 6.0238$ | $n_{d_{23}} = 1.834$ | $\nu_{d_{23}} = 37.17$ |
| $r_{37} = -50.71$ | $d_{37} = 3.0298$ | $n_{d_{24}} = 1.6445$ | $\nu_{d_{24}} = 40.82$ |
| $r_{38} = 40.6619$ | $d_{38} = 157.044$ | | |
| $r_{39} = \infty$ (Image plane) | | | |

Zooming Data

| M | 10 X | 20 X | 40 X |
|---|---|---|---|
| $d_{15}$ | 0.38352 | 6.83303 | 16.30202 |
| $d_{21}$ | 12.96660 | 6.74751 | 0.6 |
| $d_{26}$ | 0.41479 | 10.40162 | 0.72419 |
| $d_{32}$ | 30.04721 | 19.83 | 26.18594 |
| $\phi$ | 3.8504 | 6.1938 | 10.2078 |
| NA | 0.25 | 0.4 | 0.65 |
| IH | 11 | 11 | 11 |

EXAMPLE 12

| | | | |
|---|---|---|---|
| $r_0 = \infty$ (Object plane) | $d_0 = 0.17$ | $n_{d_0} = 1.521$ | $\nu_{d_0} = 56.02$ |
| $r_1 = \infty$ | $d_1 = 1.1908$ | | |
| $r_2 = -5.2082$ | $d_2 = 1.075$ | $n_{d_1} = 1.834$ | $\nu_{d_1} = 37.16$ |
| $r_3 = 13.6112$ | $d_3 = 4.1376$ | $n_{d_2} = 1.48749$ | $\nu_{d_2} = 70.23$ |
| $r_4 = -6.0079$ | $d_4 = 0.1201$ | | |
| $r_5 = -21.8606$ | $d_5 = 3.5287$ | $n_{d_3} = 1.56907$ | $\nu_{d_3} = 71.3$ |
| $r_6 = -7.6931$ | $d_6 = 0.0982$ | | |
| $r_7 = 57.6991$ | $d_7 = 4.0315$ | $n_{d_4} = 1.43875$ | $\nu_{d_4} = 94.99$ |
| $r_8 = -26.9214$ | $d_8 = 1.8339$ | $n_{d_5} = 1.804$ | $\nu_{d_5} = 46.57$ |
| $r_9 = 75.9201$ | $d_9 = 3.7667$ | $n_{d_6} = 1.497$ | $\nu_{d_6} = 81.54$ |
| $r_{10} = -14.2079$ | $d_{10} = 0.1145$ | | |
| $r_{11} = 70.5171$ | $d_{11} = 3.2432$ | $n_{d_7} = 1.43875$ | $\nu_{d_7} = 94.99$ |
| $r_{12} = -22.3737$ | $d_{12} = 0.12$ | | |
| $r_{13} = 17.6178$ | $d_{13} = 1.8$ | $n_{d_8} = 1.834$ | $\nu_{d_8} = 37.16$ |
| $r_{14} = 9.011$ | $d_{14} = 4.7951$ | $n_{d_9} = 1.43875$ | $\nu_{d_9} = 94.99$ |
| $r_{15} = -66.6761$ | $d_{15} =$ (Variable) | | |
| $r_{16} = -21.8288$ | $d_{16} = 1$ | $n_{d_{10}} = 1.80518$ | $\nu_{d_{10}} = 25.42$ |
| $r_{17} = -74.8722$ | $d_{17} = 1$ | $n_{d_{11}} = 1.755$ | $\nu_{d_{11}} = 52.32$ |
| $r_{18} = 14.2521$ | $d_{18} = 1.1384$ | | |
| $r_{19} = -16.2484$ | $d_{19} = 1.0965$ | $n_{d_{12}} = 1.755$ | $\nu_{d_{12}} = 52.32$ |
| $r_{20} = 12.2275$ | $d_{20} = 2.5339$ | $n_{d_{13}} = 1.80518$ | $\nu_{d_{13}} = 25.42$ |
| $r_{21} = -32.7966$ | $d_{21} =$ (Variable) | | |
| $r_{22} = -114.5855$ | $d_{22} = 1.8024$ | $n_{d_{14}} = 1.76182$ | $\nu_{d_{14}} = 26.52$ |
| $r_{23} = 32.6428$ | $d_{23} = 3.3707$ | $n_{d_{15}} = 1.497$ | $\nu_{d_{15}} = 81.54$ |
| $r_{24} = -19.6972$ | $d_{24} = 0.1$ | | |
| $r_{25} = 67.3471$ | $d_{25} = 3.1855$ | $n_{d_{16}} = 1.56907$ | $\nu_{d_{16}} = 71.3$ |
| $r_{26} = -19.7906$ | $d_{26} =$ (Variable) | | |
| $r_{27} = 19.8944$ | $d_{27} = 2.3054$ | $n_{d_{17}} = 1.48749$ | $\nu_{d_{17}} = 70.23$ |
| $r_{28} = 93.7002$ | $d_{28} = 1.5318$ | $n_{d_{18}} = 1.72151$ | $\nu_{d_{18}} = 29.23$ |
| $r_{29} = 37.2242$ | $d_{29} = 1.5207$ | | |
| $r_{30} = -23.6932$ | $d_{30} = 2.2122$ | $n_{d_{19}} = 1.48749$ | $\nu_{d_{19}} = 70.23$ |
| $r_{31} = 12.6106$ | $d_{31} = 2.3881$ | $n_{d_{20}} = 1.76182$ | $\nu_{d_{20}} = 26.52$ |
| $r_{32} = 18.8143$ | $d_{32} =$ (Variable) | | |
| $r_{33} = 68.7541$ | $d_{33} = 7.7321$ | $n_{d_{21}} = 1.48749$ | $\nu_{d_{21}} = 70.21$ |
| $r_{34} = -37.5679$ | $d_{34} = 3.4742$ | $n_{d_{22}} = 1.8061$ | $\nu_{d_{22}} = 40.95$ |
| $r_{35} = -102.848$ | $d_{35} = 0.6973$ | | |
| $r_{36} = 84.3099$ | $d_{36} = 6.0238$ | $n_{d_{23}} = 1.834$ | $\nu_{d_{23}} = 37.17$ |
| $r_{37} = -50.71$ | $d_{37} = 3.0298$ | $n_{d_{24}} = 1.6445$ | $\nu_{d_{24}} = 40.82$ |
| $r_{38} = 40.6619$ | $d_{38} = 157.0424$ | | |
| $r_{39} = \infty$ (Image plane) | | | |

Zooming Data

| M | 10 X | 20 X | 40 X |
|---|---|---|---|
| $d_{15}$ | 0.5 | 7.49119 | 16.44147 |
| $d_{21}$ | 12.98785 | 6.8839 | 0.7617 |
| $d_{26}$ | 0.23856 | 10.28993 | 4.10423 |
| $d_{32}$ | 31.06254 | 20.12393 | 23.48155 |
| $\phi$ | 3.7602 | 6.0472 | 9.9794 |
| NA | 0.25 | 0.4 | 0.65 |
| IH | 11 | 11 | 11 |

EXAMPLE 13

| | | | |
|---|---|---|---|
| $r_0 = \infty$ (Object plane) | $d_0 = 0.17$ | $n_{d_0} = 1.521$ | $\nu_{d_0} = 56.02$ |
| $r_1 = \infty$ | $d_1 = 0.8165$ | | |
| $r_2 = -5.3778$ | $d_2 = 1.4437$ | $n_{d_1} = 1.834$ | $\nu_{d_1} = 37.16$ |
| $r_3 = 11.1876$ | $d_3 = 3.7347$ | $n_{d_2} = 1.618$ | $\nu_{d_2} = 63.33$ |
| $r_4 = -6.6576$ | $d_4 = 0.1$ | | |
| $r_5 = -72.121$ | $d_5 = 3.9419$ | $n_{d_3} = 1.56907$ | $\nu_{d_3} = 71.3$ |
| $r_6 = -8.6944$ | $d_6 = 0.1$ | | |
| $r_7 = 17.302$ (Aspheric) | $d_7 = 3.8931$ | $n_{d_4} = 1.497$ | $\nu_{d_4} = 81.54$ |
| $r_8 = -55.3616$ | $d_8 = 1.8$ | $n_{d_5} = 1.755$ | $\nu_{d_5} = 52.32$ |
| $r_9 = 28.3148$ | $d_9 = 4.6226$ | $n_{d_6} = 1.497$ | $\nu_{d_6} = 81.54$ |
| $r_{10} = -10.9826$ (Aspheric) | $d_{10} = 0.1$ | | |
| $r_{11} = 26.2489$ | $d_{11} = 1.8$ | $n_{d_7} = 1.834$ | $\nu_{d_7} = 37.16$ |
| $r_{12} = 9.1408$ | $d_{12} = 7.0227$ | $n_{d_8} = 1.43875$ | $\nu_{d_8} = 94.99$ |
| $r_{13} = -12.2202$ | $d_{13} =$ (Variable) | | |
| $r_{14} = 300.7783$ | $d_{14} = 1$ | $n_{d_9} = 1.7725$ | $\nu_{d_9} = 49.6$ |
| $r_{15} = 11.1272$ | $d_{15} = 1.3752$ | | |
| $r_{16} = -12.1308$ | $d_{16} = 1$ | $n_{d_{10}} = 1.755$ | $\nu_{d_{10}} = 52.32$ |
| $r_{17} = 10.3434$ | $d_{17} = 2.0633$ | $n_{d_{11}} = 1.80518$ | $\nu_{d_{11}} = 25.42$ |
| $r_{18} = -204.8764$ | $d_{18} =$ (Variable) | | |
| $r_{19} = -141.788$ | $d_{19} = 2.8978$ | $n_{d_{12}} = 1.56907$ | $\nu_{d_{12}} = 71.3$ |
| $r_{20} = -18.9119$ | $d_{20} = 0.1$ | | |
| $r_{21} = 37.1991$ | $d_{21} = 4.8003$ | $n_{d_{13}} = 1.43875$ | $\nu_{d_{13}} = 94.99$ |
| $r_{22} = -15.948$ | $d_{22} = 2$ | $n_{d_{14}} = 1.7847$ | $\nu_{d_{14}} = 26.29$ |
| $r_{23} = -28.1402$ | $d_{23} =$ (Variable) | | |
| $r_{24} = 11.0963$ (Aspheric) | $d_{24} = 6.6402$ | $n_{d_{15}} = 1.804$ | $\nu_{d_{15}} = 46.57$ |
| $r_{25} = 257.9154$ | $d_{25} = 2.7756$ | $n_{d_{16}} = 1.7552$ | $\nu_{d_{16}} = 27.51$ |
| $r_{26} = 5.4561$ | $d_{26} = 3.7145$ | | |
| $r_{27} = -14.6275$ | $d_{27} = 1.5$ | $n_{d_{17}} = 1.51633$ | $\nu_{d_{17}} = 64.14$ |
| $r_{28} = 8.9353$ | $d_{28} = 2.5581$ | $n_{d_{18}} = 1.80518$ | $\nu_{d_{18}} = 25.42$ |
| $r_{29} = 71.2871$ | $d_{29} =$ (Variable) | | |
| $r_{30} = 68.7541$ | $d_{30} = 7.7321$ | $n_{d_{19}} = 1.48749$ | $\nu_{d_{19}} = 70.21$ |
| $r_{31} = -37.5679$ | $d_{31} = 3.4742$ | $n_{d_{20}} = 1.8061$ | $\nu_{d_{20}} = 40.95$ |
| $r_{32} = -102.848$ | $d_{32} = 0.6973$ | | |
| $r_{33} = 84.3099$ | $d_{33} = 6.0238$ | $n_{d_{21}} = 1.834$ | $\nu_{d_{21}} = 37.17$ |
| $r_{34} = -50.71$ | $d_{34} = 3.0298$ | $n_{d_{22}} = 1.6445$ | $\nu_{d_{22}} = 40.82$ |
| $r_{35} = 40.6619$ | $d_{35} = 157.037$ | | |
| $r_{36} = \infty$ (Image plane) | | | |

Aspherical Coefficients

7th surface $K = -0.0009$
$A_4 = -3.8520 \times 10^{-5}$
$A_6 = 2.2226 \times 10^{-6}$ -continued $A_8 = -1.9103 \times 10^{-8}$
$A_{10} = 8.8322 \times 10^{-11}$ 10th surface $K = 0.1287$
$A_4 = 2.0670 \times 10^{-4}$
$A_6 = 1.2544 \times 10^{-6}$
$A_8 = 9.4915 \times 10^{-9}$
$A_{10} = 1.8356 \times 10^{-11}$ 24th surface $K = -0.0047$
$A_4 = -9.7014 \times 10^{-7}$
$A_6 = -2.9352 \times 10^{-9}$
$A_8 = -1.0273 \times 10^{-13}$
$A_{10} = -6.5452 \times 10^{-13}$ Zooming Data

| M | 20 X | 40 X | 80 X |
|---|---|---|---|
| $d_{13}$ | 0.3 | 8.99223 | 12.8866 |
| $d_{18}$ | 13.14247 | 9.1427 | 0.5094 |
| $d_{23}$ | 5.38548 | 1.06496 | 0.1 |
| $d_{29}$ | 19.20194 | 18.83 | 24.53389 |
| φ | 5.8654 | 9.5918 | 11.4132 |
| NA | 0.4 | 0.65 | 0.77 |
| IH | 11 | 11 | 11 |

EXAMPLE 14

| | | | |
|---|---|---|---|
| $r_0 = \infty$ (Object plane) | $d_0 = 0.1700$ | $n_{d_0} = 1.521$ | $v_{d_0} = 56.02$ |
| $r_1 = \infty$ | $d_1 = 1.0467$ | | |
| $r_2 = -4.6838$ | $d_2 = 0.95$ | $n_{d_1} = 1.834$ | $v_{d_1} = 37.16$ |
| $r_3 = 15.3023$ | $d_3 = 4.0296$ | $n_{d_2} = 1.48749$ | $v_{d_2} = 70.23$ |
| $r_4 = -5.936$ | $d_4 = 0.12$ | | |
| $r_5 = -96.3863$ | $d_5 = 3.3714$ | $n_{d_3} = 1.497$ | $v_{d_3} = 81.54$ |
| $r_6 = -9.8668$ | $d_6 = 0.1$ | | |
| $r_7 = 27.6788$ | $d_7 = 4.03$ | $n_{d_4} = 1.43875$ | $v_{d_4} = 94.99$ |
| $r_8 = -13.0279$ | $d_8 = 1.6487$ | $n_{d_5} = 1.804$ | $v_{d_5} = 46.57$ |
| $r_9 = -39.2791$ | $d_9 = 3.5349$ | $n_{d_6} = 1.43875$ | $v_{d_6} = 94.99$ |
| $r_{10} = -13.5942$ | $d_{10} = 0.1$ | | |
| $r_{11} = -37.2729$ | $d_{11} = 3.6487$ | $n_{d_7} = 1.43875$ | $v_{d_7} = 94.99$ |
| $r_{12} = -11.6431$ (Aspheric) | $d_{12} = 0.12$ | | |
| $r_{13} = 15.2985$ | $d_{13} = 1.8$ | $n_{d_8} = 1.834$ | $v_{d_8} = 37.16$ |
| $r_{14} = 8.9276$ | $d_{14} = 5.7099$ | $n_{d_9} = 1.43875$ | $v_{d_9} = 94.99$ |
| $r_{15} = -90.2351$ | $d_{15} =$ (Variable) | | |
| $r_{16} = -46.7467$ | $d_{16} = 1.0769$ | $n_{d_{10}} = 1.6516$ | $v_{d_{10}} = 58.55$ |
| $r_{17} = -10.3482$ | $d_{17} = 0.8814$ | $n_{d_{11}} = 1.755$ | $v_{d_{11}} = 52.32$ |
| $r_{18} = 14.1417$ | $d_{18} = 1.063$ | | |
| $r_{19} = -21.4981$ | $d_{19} = 0.9987$ | $n_{d_{12}} = 1.755$ | $v_{d_{12}} = 52.32$ |
| $r_{20} = 9.5433$ | $d_{20} = 2.1265$ | $n_{d_{13}} = 1.80518$ | $v_{d_{13}} = 25.42$ |
| $r_{21} = 425.3494$ | $d_{21} =$ (Variable) | | |
| $r_{22} = 636.6315$ | $d_{22} = 1.7$ | $n_{d_{14}} = 1.76182$ | $v_{d_{14}} = 26.52$ |
| $r_{23} = 23.9718$ | $d_{23} = 3.6636$ | $n_{d_{15}} = 1.497$ | $v_{d_{15}} = 81.54$ |
| $r_{24} = -20.9516$ | $d_{24} = 0.1$ | | |
| $r_{25} = 43.2308$ | $d_{25} = 3.3464$ | $n_{d_{16}} = 1.56907$ | $v_{d_{16}} = 71.3$ |
| $r_{26} = -21.9993$ | $d_{26} =$ (Variable) | | |
| $r_{27} = 17.5744$ | $d_{27} = 2.2306$ | $n_{d_{17}} = 1.48749$ | $v_{d_{17}} = 70.23$ |
| $r_{28} = 48.9683$ | $d_{28} = 1.5245$ | $n_{d_{18}} = 1.72151$ | $v_{d_{18}} = 29.23$ |
| $r_{29} = 26.8697$ | $d_{29} = 1.5488$ | | |
| $r_{30} = -27.9057$ | $d_{30} = 1.5616$ | $n_{d_{19}} = 1.48749$ | $v_{d_{19}} = 70.23$ |
| $r_{31} = 11.0269$ | $d_{31} = 2.4369$ | $n_{d_{20}} = 1.76182$ | $v_{d_{20}} = 26.52$ |
| $r_{32} = 15.4453$ | $d_{32} =$ (Variable) | | |
| $r_{33} = 68.7541$ | $d_{33} = 7.7321$ | $n_{d_{21}} = 1.48749$ | $v_{d_{21}} = 70.21$ |
| $r_{34} = -37.5679$ | $d_{34} = 3.4742$ | $n_{d_{22}} = 1.8061$ | $v_{d_{22}} = 40.95$ |
| $r_{35} = -102.848$ | $d_{35} = 0.6973$ | | |
| $r_{36} = 84.3099$ | $d_{36} = 6.0238$ | $n_{d_{23}} = 1.834$ | $v_{d_{23}} = 37.17$ |
| $r_{37} = -50.71$ | $d_{37} = 3.0298$ | $n_{d_{24}} = 1.6445$ | $v_{d_{24}} = 40.82$ |
| $r_{38} = 40.6619$ | $d_{38} = 157.0442$ | | |
| $r_{39} = \infty$ (Image plane) | | | |

Aspherical Coefficients

12th surface $K = -0.0787$
$A_4 = 6.9409 \times 10^{-5}$
$A_6 = 4.4095 \times 10^{-7}$
$A_8 = -3.1306 \times 10^{-10}$
$A_{10} = 2.5936 \times 10^{-11}$ Zooming Data

| M | 10 X | 20 X | 50 X |
|---|---|---|---|
| $d_{15}$ | 0.09132 | 6.20702 | 17.25153 |
| $d_{21}$ | 13.379 | 7.64936 | 0.35 |
| $d_{26}$ | 0.1 | 11.87463 | 6.19564 |
| $d_{32}$ | 31.79069 | 19.63 | 21.56384 |
| φ | 3.7736 | 6.0648 | 10.7856 |
| NA | 0.25 | 0.4 | 0.7 |
| IH | 11 | 11 | 11 |

EXAMPLE 15

| | | | |
|---|---|---|---|
| $r_0 = \infty$ (Object plane) | $d_0 = 0.17$ | $n_{d_0} = 1.521$ | $v_{d_0} = 56.02$ |
| $r_1 = \infty$ | $d_1 = 0.8747$ | | |
| $r_2 = -5.2346$ | $d_2 = 1$ | $n_{d_1} = 1.8061$ | $v_{d_1} = 40.92$ |
| $r_3 = 24.4918$ | $d_3 = 5.659$ | $n_{d_2} = 1.58913$ | $v_{d_2} = 61.14$ |
| $r_4 = -6.0829$ | $d_4 = 0.12$ | | |
| $r_5 = -21.7561$ | $d_5 = 4.169$ | $n_{d_3} = 1.56907$ | $v_{d_3} = 71.3$ |
| $r_6 = -8.8997$ | $d_6 = 0.08$ | | |
| $r_7 = 873.3181$ | $d_7 = 2.902$ | $n_{d_4} = 1.43875$ | $v_{d_4} = 94.99$ |
| $r_8 = -21.0051$ | $d_8 = 1.7$ | $n_{d_5} = 1.79952$ | $v_{d_5} = 42.22$ |
| $r_9 = 120.262$ | $d_9 = 5.133$ | $n_{d_6} = 1.43875$ | $v_{d_6} = 94.99$ |
| $r_{10} = -14.7095$ | $d_{10} = 0.1$ | | |
| $r_{11} = 35.5168$ (Aspheric) | $d_{11} = 3.702$ | $n_{d_7} = 1.43875$ | $v_{d_7} = 94.99$ |
| $r_{12} = -32.3425$ | $d_{12} = 0.12$ | | |
| $r_{13} = -215.137$ | $d_{13} = 1.8$ | $n_{d_8} = 1.834$ | $v_{d_8} = 37.16$ |
| $r_{14} = 32.5105$ | $d_{14} = 6$ | $n_{d_9} = 1.43875$ | $v_{d_9} = 94.99$ |
| $r_{15} = -17.613$ | $d_{15} =$ (Variable) | | |
| $r_{16} = -19.7607$ | $d_{16} = 1.123$ | $n_{d_{10}} = 1.7847$ | $v_{d_{10}} = 26.29$ |
| $r_{17} = -74.928$ | $d_{17} = 0.9$ | $n_{d_{11}} = 1.741$ | $v_{d_{11}} = 52.64$ |
| $r_{18} = 18.4364$ | $d_{18} = 1.0552$ | | |
| $r_{19} = -37.0731$ | $d_{19} = 1$ | $n_{d_{12}} = 1.755$ | $v_{d_{12}} = 52.32$ |
| $r_{20} = 11.0737$ | $d_{20} = 2.616$ | $n_{d_{13}} = 1.80518$ | $v_{d_{13}} = 25.42$ |
| $r_{21} = -73.7195$ | $d_{21} =$ (Variable) | | |
| $r_{22} = -93.7329$ | $d_{22} = 1.662$ | $n_{d_{14}} = 1.76182$ | $v_{d_{14}} = 26.52$ |
| $r_{23} = 23.2485$ | $d_{23} = 3.853$ | $n_{d_{15}} = 1.497$ | $v_{d_{15}} = 81.54$ |
| $r_{24} = -18.9264$ | $d_{24} = 0.1$ | | |
| $r_{25} = 41.5479$ | $d_{25} = 3.554$ | $n_{d_{16}} = 1.56907$ | $v_{d_{16}} = 71.3$ |
| $r_{26} = -19.4396$ | $d_{26} =$ (Variable) | | |
| $r_{27} = 14.341$ | $d_{27} = 1.734$ | $n_{d_{17}} = 1.6516$ | $v_{d_{17}} = 58.55$ |
| $r_{28} = 18.4908$ | $d_{28} = 1.16$ | $n_{d_{18}} = 1.7495$ | $v_{d_{18}} = 35.28$ |
| $r_{29} = 15.6445$ | $d_{29} = 2.1785$ | | |
| $r_{30} = -19.7504$ | $d_{30} = 1.555$ | $n_{d_{19}} = 1.48749$ | $v_{d_{19}} = 70.23$ |
| $r_{31} = 10.0325$ | $d_{31} = 2$ | $n_{d_{20}} = 1.76182$ | $v_{d_{20}} = 26.52$ |
| $r_{32} = 14.7362$ | $d_{32} =$ (Variable) | | |
| $r_{33} = 68.7541$ | $d_{33} = 7.7321$ | $n_{d_{21}} = 1.48749$ | $v_{d_{21}} = 70.21$ |
| $r_{34} = -37.5379$ | $d_{34} = 3.4742$ | $n_{d_{22}} = 1.8061$ | $v_{d_{22}} = 40.95$ |
| $r_{35} = -102.848$ | $d_{35} = 0.6973$ | | |
| $r_{36} = 84.3099$ | $d_{36} = 6.0238$ | $n_{d_{23}} = 1.834$ | $v_{d_{23}} = 37.17$ |
| $r_{37} = -50.71$ | $d_{37} = 3.0298$ | $n_{d_{24}} = 1.6445$ | $v_{d_{24}} = 40.82$ |
| $r_{38} = 40.6619$ | $d_{38} = 157.0429$ | | |

-continued $r_{39} = \infty$
(Image plane)

Aspherical Coefficients

11th surface $K = -0.3472$
$A_4 = -5.7751 \times 10^{-5}$
$A_6 = -6.8382 \times 10^{-8}$
$A_8 = 7.4419 \times 10^{-11}$
$A_{10} = 0$

Zooming Data

| M | 10 X | 20 X | 40 X |
|---|---|---|---|
| $d_{15}$ | 0.11998 | 6.42908 | 22.58975 |
| $d_{21}$ | 14.4233 | 5.29924 | 0.29994 |
| $d_{26}$ | 0.30176 | 10.23431 | 0.29994 |
| $d_{32}$ | 27.13454 | 20.01694 | 18.79004 |
| φ | 4.39788 | 7.08146 | 14.62196 |
| NA | 0.25 | 0.4 | 0.8 |
| IH | 11 | 11 | 11 |

(Image Forming Lens)

| | | | |
|---|---|---|---|
| $r_1 = 68.7541$ | $d_1 = 7.7321$ | $n_{d_1} = 1.48749$ | $\nu_{d_1} = 70.21$ |
| $r_2 = -37.5679$ | $d_2 = 3.4742$ | $n_{d_2} = 1.8061$ | $\nu_{d_2} = 40.95$ |
| $r_3 = -102.8477$ | $d_3 = 0.6973$ | | |
| $r_4 = 84.3099$ | $d_4 = 6.0238$ | $n_{d_3} = 1.834$ | $\nu_{d_3} = 37.17$ |
| $r_5 = -50.71$ | $d_5 = 3.0298$ | $n_{d_4} = 1.6445$ | $\nu_{d_4} = 40.82$ |
| $r_6 = 40.6619$ | | | |

Set out below are the value of parameters regarding conditions (1) to (22) of the invention.

| | ν | D0 | D1 | D2 | D1/D0 | D2/D0 |
|---|---|---|---|---|---|---|
| Ex. 1 | 81.54 | 80.3315 | 29.515 | 28.225 | 0.3674 | 0.351357 |
| Ex. 2 | 94.99 | 71.576 | 34.591 | 5.947 | 0.4833 | 0.083087 |
| Ex. 3 | 81.54 | 83.466 | 27.5157 | 32.93 | 0.3297 | 0.394532 |
| Ex. 4 | 94.99 | 77.321 | 27.884 | 28.7476 | 0.3606 | 0.317796 |
| Ex. 5 | 94.99 | 83.376 | 39.27 | 5.032 | 0.471 | 0.060353 |
| Ex. 6 | 81.54 | 93.759 | 27.97 | 41.999 | 0.2983 | 0.447946 |
| Ex. 7 | 81.54 | 79.803 | 29.1842 | 26.39512 | 0.3657 | 0.330753 |
| Ex. 8 | 81.54 | 63.4755 | 26.8738 | 17.9844 | 0.4234 | 0.283328 |
| Ex. 9 | 94.99 | 66.452 | 39.018 | 3.977 | 0.5872 | 0.059852 |
| Ex. 10 | 94.99 81.54 | 61.04348 | 33.3848 | 6.17636 | 0.5469 | 0.101179 |
| Ex. 11 | 94.99 | 73.764 | 29.409 | 15.919 | 0.3987 | 0.2158 |
| Ex. 12 | 94.99 81.54 | 75.158 | 28.665 | 15.941 | 0.3814 | 0.2121 |
| Ex. 13 | 94.99 81.54 | 75.2961 | 28.5586 | 12.5866 | 0.3793 | 0.1672 |
| Ex. 14 | 94.99 | 77.2194 | 29.1632 | 17.1602 | 0.3777 | 0.2222 |
| Ex. 15 | 94.99 | 80.16533 | 32.48499 | 22.46977 | 0.4052 | 0.280292 |

| | Gn1 | Gn2 | Gn1 − Gn2 | RG1 | RG2 | RG2/RG1 |
|---|---|---|---|---|---|---|

-continued

|  |  |  |  |  |  |  |
|---|---|---|---|---|---|---|
| Ex. 1 | 1.834 | 1.651 | 0.18 | −6.7337 | −8.7211 | 1.30 |
| Ex. 2 | 1.834 | 1.48749 | 0.34651 | −29.0283 | −10.6379 | 0.366466517 |
| Ex. 3 | 1.8061 | 1.48749 | 0.31861 | −9.0363 | −15.8132 | 1.749964034 |
| Ex. 4 | 1.7859 | 1.48749 | 0.29841 | −8.3465 | −6.4314 | 0.77055053 |
| Ex. 5 | 1.8061 | 1.48749 | 0.31861 | −9.5638 | −9.6255 | 1.006451411 |
| Ex. 6 | 1.8061 | 1.48749 | 0.31861 | −7.2882 | −9.2642 | 1.271123185 |
| Ex. 7 | 1.834 | 1.48749 | 0.34651 | −8.3019 | −7.8311 | 0.94329009 |
| Ex. 8 | 1.834 | 1.48749 | 0.34651 | −12.2497 | −6.9892 | 0.570560912 |
| Ex. 9 | 1.834 | 1.58913 | 0.24487 | −9.4339 | −9.9879 | 1.058724388 |
| Ex. 10 | 1.7847 | 1.48749 | 0.29721 | −4.9361 | −4.9396 | 1.000709062 |
| Ex. 11 | 1.834 | 1.48749 | 0.34651 | −6.1723 | −5.0915 | 0.824895096 |
| Ex. 12 | 1.834 | 1.48749 | 0.34651 | −5.2082 | −6.0079 | 1.153546331 |
| Ex. 13 | 1.834 | 1.618 | 0.216 | −5.3778 | −6.6576 | 1.237978355 |
| Ex. 14 | 1.834 | 1.48749 | 0.34651 | −4.6838 | −5.936 | 1.267347026 |
| Ex. 15 | 1.8061 | 1.58913 | 0.21697 | −5.2346 | −6.0829 | 1.162056318 |

|  | F1 | F2 | F3 | F4 |
|---|---|---|---|---|
| Ex. 1 | 8.4106 | −12.34432 | 36.92251 | — |
| Ex. 2 | 10.27707 | −5.70948 | 25.89777 | — |
| Ex. 3 | 8.09895 | −14.90398 | 44.97245 | — |
| Ex. 4 | 7.42656 | −32.28803 | 125.13694 | — |
| Ex. 5 | 9.56192 | −7.20438 | 42.86603 | — |
| Ex. 6 | 8.85362 | −16.55933 | 43.88213 | — |
| Ex. 7 | 8.82291 | −11.82088 | 36.6101 | — |
| Ex. 8 | 7.83829 | −8.58263 | 27.99788 | — |
| Ex. 9 | 8.4167 | −7.1584 | 51.8905 | — |
| Ex. 10 | 8.3359 | −6.0365 | 29.9000 | — |
| Ex. 11 | 7.674 | −9.377 | 19.897 | −34.485 |
| Ex. 12 | 7.483 | −9.583 | 20.448 | −36.545 |
| Ex. 13 | 7.3117 | −8.0783 | 23.2622 | −44.7475 |
| Ex. 14 | 7.5280 | −8.7998 | 18.9541 | −32.9122 |
| Ex. 15 | 8.7524 | −11.8772 | 19.1899 | −26.4805 |

|  | F1/F2 | F3/F2 | F4/F2 |
|---|---|---|---|
| Ex. 1 | −0.68 | −2.99 | — |
| Ex. 2 | −1.800001051 | −4.535924462 | — |
| Ex. 3 | −0.543408539 | −3.017479224 | — |
| Ex. 4 | −0.230009697 | −3.875644937 | — |
| Ex. 5 | −1.327237042 | −5.949995697 | — |
| Ex. 6 | −0.534660521 | −2.649994293 | — |
| Ex. 7 | −0.746383518 | −3.097070607 | — |
| Ex. 8 | −0.91327367 | −3.262156239 | — |
| Ex. 9 | −1.175779504 | −7.24889651 | — |
| Ex. 10 | −1.380916094 | −4.953201358 | — |
| Ex. 11 | −0.818385411 | −2.1220 | 3.6777 |
| Ex. 12 | −0.780861943 | −2.1338 | 3.8136 |
| Ex. 13 | −0.905103797 | −2.8796 | 5.5392 |
| Ex. 14 | −0.855473988 | −2.1539 | 3.7401 |
| Ex. 15 | −0.736907689 | −1.6157 | 2.2295 |

|  | FB1 | FB1/D1 | $\nu P$ | $\nu N$ | $\nu P - \nu N$ |
|---|---|---|---|---|---|
| Ex. 1 | 3.3779 | 0.1144 | 94.99 | 46.57 | 48.42 |
| Ex. 2 | 0.6984 | 0.0202 | 94.99 | 52.32 | 42.67 |
| Ex. 3 | 1.499 | 0.0545 | 81.54 | 40.82 | 40.72 |
| Ex. 4 | 1.6504 | 0.0592 | 94.99 | 52.32 | 42.67 |
| Ex. 5 | 0.6986 | 0.0178 | 94.99 | 40.92 | 54.07 |
| Ex. 6 | 1.5012 | 0.0537 | 81.54 | 40.54 | 41.00 |
| Ex. 7 | 5.2815 | 0.1810 | 94.99 | 46.57 | 48.42 |
| Ex. 8 | 1.9017 | 0.0708 | 94.99 | 42.72 | 52.27 |
| Ex. 9 | 1.123 | 0.0288 | 94.99 | 46.57 | 48.42 |
| Ex. 10 | 2.792 | 0.0836 | 94.99 | 46.57 | 48.42 |
| Ex. 11 | 5.297 | 0.1801 | 94.99 | 37.16 | 57.83 |
| Ex. 12 | 5.886 | 0.2053 | 94.99 | 37.16 | 57.83 |
| Ex. 13 | 1.1925 | 0.0418 | 94.99 | 37.16 | 57.83 |
| Ex. 14 | 6.293 | 0.2158 | 94.99 | 37.16 | 57.83 |
| Ex. 15 | 5.9917 | 0.1844 | 94.99 | 37.16 | 57.83 |

|  | F4 | F4b | |F4b/F4| |
|---|---|---|---|
| Ex. 1 | — | — | — |
| Ex. 2 | — | — | — |
| Ex. 3 | — | — | — |
| Ex. 4 | — | — | — |
| Ex. 5 | — | — | — |
| Ex. 6 | — | — | — |

-continued

|        |          |           |         |       |
|--------|----------|-----------|---------|-------|
| Ex. 7  | —        | —         | —       |       |
| Ex. 8  | —        | —         | —       |       |
| Ex. 9  | —        | —         | —       |       |
| Ex. 10 | —        | —         | —       |       |
| Ex. 11 | −34.485  | −26.0487  | 0.7554  |       |
| Ex. 12 | −36.545  | −25.135   | 0.6878  |       |
| Ex. 13 | −44.7475 | −73.7363  | 1.6478  |       |
| Ex. 14 | −32.9122 | −23.9084  | 0.7264  |       |
| Ex. 15 | −26.4805 | −20.2158  | 0.7634  |       |

|        | ν4n   | ν4p   | ν4n − ν4p | N4p     |
|--------|-------|-------|-----------|---------|
| Ex. 1  | —     | —     | —         | —       |
| Ex. 2  | —     | —     | —         | —       |
| Ex. 3  | —     | —     | —         | —       |
| Ex. 4  | —     | —     | —         | —       |
| Ex. 5  | —     | —     | —         | —       |
| Ex. 6  | —     | —     | —         | —       |
| Ex. 7  | —     | —     | —         | —       |
| Ex. 8  | —     | —     | —         | —       |
| Ex. 9  | —     | —     | —         | —       |
| Ex. 10 | —     | —     | —         | —       |
| Ex. 11 | 70.23 | 26.52 | 43.71     | 1.7618  |
| Ex. 12 | 70.23 | 26.52 | 43.71     | 1.7618  |
| Ex. 13 | 64.14 | 25.42 | 38.72     | 1.8052  |
| Ex. 14 | 70.23 | 26.52 | 43.71     | 1.7618  |
| Ex. 15 | 70.23 | 26.52 | 43.71     | 1.76182 |

|        | WD     | WD/F1       | N2P     | ν2P   | ν2N   | ν2N − ν2P |
|--------|--------|-------------|---------|-------|-------|-----------|
| Ex. 1  | 1.2514 | 0.15        | 1.81    | 25.42 | 58.9  | 33.48     |
| Ex. 2  | 1.2558 | 0.122194361 | 1.80518 | —     | —     | —         |
| Ex. 3  | 1.2122 | 0.149673723 | 1.80518 | 25.42 | 64.14 | 38.72     |
| Ex. 4  | 0.9086 | 0.122344666 | 1.80518 | 25.42 | 59.84 | 34.42     |
| Ex. 5  | 0.8945 | 0.093548158 | 1.834   | —     | —     | —         |
| Ex. 6  | 1.2393 | 0.139976642 | 1.80518 | 25.42 | 64.14 | 38.72     |
| Ex. 7  | 1.3286 | 0.150585238 | 1.80518 | 25.42 | 58.9  | 33.48     |
| Ex. 8  | 1.0793 | 0.137695849 | 1.80518 | 25.42 | 58.9  | 33.48     |
| Ex. 9  | 1.0976 | 0.130407404 | —       | —     | —     | —         |
| Ex. 10 | 1.2112 | 0.145299248 | —       | —     | —     | —         |
| Ex. 11 | 1.236  | 0.161063331 | 1.8052  | 25.42 | 52.32 | 26.9      |
| Ex. 12 | 1.191  | 0.159160764 | 1.8052  | 25.42 | 52.32 | 26.9      |
| Ex. 13 | 0.8165 | 0.111670337 | 1.8052  | 25.42 | 52.32 | 26.9      |
| Ex. 14 | 1.0467 | 0.139040914 | 1.8052  | 25.42 | 52.32 | 26.9      |
| Ex. 15 | 0.8747 | 0.099938303 | 1.80518 | 25.42 | 52.32 | 26.9      |

|        | ν3p   | ν3n   | ν3p − ν3n | NA (Min.) | NA (Intermediate) | NA (Max.) |
|--------|-------|-------|-----------|-----------|-------------------|-----------|
| Ex. 1  | 70.23 | 33.52 | 36.71     | 0.25      | 0.4               | 0.6       |
| Ex. 2  | 81.54 | 33.52 | 48.02     | 0.25      | 0.4               | 0.55      |
| Ex. 3  | 70.23 | 33.52 | 36.71     | 0.25      | 0.4               | 0.6       |
| Ex. 4  | 81.54 | 40.92 | 40.62     | 0.25      | 0.4               | 0.55      |
| Ex. 5  | 81.54 | 33.52 | 48.02     | 0.25      | 0.4               | 0.55      |
| Ex. 6  | 70.23 | 33.52 | 36.71     | 0.25      | 0.4               | 0.6       |
| Ex. 7  | 81.54 | 33.52 | 48.02     | 0.25      | 0.4               | 0.6       |
| Ex. 8  | 81.54 | 33.52 | 48.02     | 0.25      | 0.4               | 0.6       |
| Ex. 9  | 81.54 | 26.52 | 55.02     | 0.25      | 0.4               | 0.7       |
| Ex. 10 | 81.54 | 26.52 | 55.02     | 0.25      | 0.4               | 0.65      |
| Ex. 11 | 81.54 | 26.52 | 55.02     | 0.25      | 0.4               | 0.65      |
| Ex. 12 | 81.54 | 26.52 | 55.02     | 0.25      | 0.4               | 0.65      |
| Ex. 13 | 94.99 | 26.29 | 68.7      | 0.4       | 0.65              | 0.77      |
| Ex. 14 | 81.54 | 26.52 | 55.02     | 0.25      | 0.4               | 0.7       |
| Ex. 15 | 81.54 | 26.52 | 55.02     | 0.25      | 0.4               | 0.8       |

|        | L (Low zoom) | L (Intermediate) | L (High zoom) |
|--------|--------------|------------------|---------------|
| Ex. 1  | 65.67566     | 80.4431          | 81.752938     |
| Ex. 2  | 74.39488     | 75.172           | 73.00223      |
| Ex. 3  | 67.09464     | 83.98958         | 84.8487       |
| Ex. 4  | 98.0052      | 95.3898          | 78.4004       |
| Ex. 5  | 93.1636      | 84.4413          | 90.06039      |
| Ex. 6  | 67.86056     | 95.1687          | 90.96281      |
| Ex. 7  | 67.21214     | 81.515           | 81.09949      |
| Ex. 8  | 55.95608     | 64.72488         | 64.87348      |
| Ex. 9  | 92.7305      | 85.71928         | 67.71988      |
| Ex. 10 | 69.5227      | 69.2153          | 62.42469      |
| Ex. 11 | 69.95        | 80.17            | 73.81         |
| Ex. 12 | 68.94        | 79.88            | 76.52         |

-continued

|  | | | |
|---|---|---|---|
| Ex. 13 | 80.80 | 81.17 | 75.47 |
| Ex. 14 | 68.21 | 80.37 | 78.44 |
| Ex. 15 | 72.86544 | 81.24903 | 81.21003 |

|  | E1 | E (Intermediate) | E2 | \|E1 − E2\| |
|---|---|---|---|---|
| Ex. 1 | −543.049 | — | −206.882 | — |
| Ex. 2 | −1081.3 | — | −227.92 | — |
| Ex. 3 | −588.491 | — | −224.093 | — |
| Ex. 4 | −1584.8 | — | −300.8 | — |
| Ex. 5 | 6536.87 | — | −206.198 | — |
| Ex. 6 | −436.29 | — | −187.604 | — |
| Ex. 7 | −511.019 | — | −196.398 | — |
| Ex. 8 | −525.469 | — | −251.932 | — |
| Ex. 9 | −717.54 | −143.78 | −68.03 | — |
| Ex. 10 | −257.33 | −138.604 | −79.8085 | — |
| Ex. 11 | −69.7609 | −65.3209 | −66.6227 | 3.1382 |
| Ex. 12 | −66.7221 | −66.7159 | −63.6663 | 3.0558 |
| Ex. 13 | −58.5603 | −57.8142 | −54.8354 | 3.7249 |
| Ex. 14 | −62.8275 | −63.3531 | −52.9404 | 9.8871 |
| Ex. 15 | −60.4175 | −54.4781 | −54.7254 | 5.6921 |

As can be understood from the foregoing, the present invention can provide a microscope zoom objective lens system which has a length of about 55 mm to about 110 mm, is of the three-group construction having a zoom ratio of 10 to 40 and a numerical aperture of 0.6, wherein aberration performance is much more improved throughout the low-to-high zoom range.

According to the present invention, there is also provided a microscope zoom objective lens system of the four-group or +−+− construction which, albeit having a length of as short as about 80 mm, has an unheard-of zoom ratio of 4 to 5 and a large numerical aperture, and in which aberration performance is much more improved throughout the low-to-high zoom range. There is further a microscope zoom objective lens system which is free from system defects such as ambient light attenuations due to pupil fluctuations and so is much more improved in terms of system performance, because the exit pupil is set at a substantially constant position.

What we claim is:

1. A microscope zoom objective lens system comprising at least three lens groups; in order from an object, a first lens group having positive refractive power, a second lens group having negative refractive power and a third lens group having positive refractive power, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and said first lens group includes at least one doublet consisting of a positive lens and a negative lens and having positive refractive power, said positive lens satisfying the following condition (1):

$$\nu > 80 \tag{1}$$

where λ is the Abbe number of said positive lens.

2. A microscope zoom objective lens system comprising at least three lens groups; in order from an object, a first lens group having positive refractive power, a second lens group having negative refractive power and a third lens group having positive refractive power, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and said second lens group comprises at least two lens components which face each other at concave surfaces.

3. A microscope zoom objective lens system comprising at least three lens groups; in order from an object, a first lens group having positive refractive power, a second lens group having negative refractive power and a third lens group having positive refractive power, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and said third lens group comprises at least two lens components and includes at least one doublet made up of a positive lens and a negative lens.

4. A microscope zoom objective lens system comprising at least three lens groups; in order from an object, a first lens group having positive refractive power, a second lens group having negative refractive power and a third lens group having positive refractive power, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and said first lens group comprises lens components wherein a lens component located nearest to an object side of said microscope zoom objective lens system comprises a doublet meniscus lens concave on said object side, said doublet meniscus lens consisting of, in order from said object side, a concave lens and a convex lens.

5. A microscope zoom objective lens system comprising at least three lens groups; in order from an object, a first lens group having positive refractive power, a second lens group having negative refractive power and a third lens group having positive refractive power while the first lens group comprises a plurality of lens units, wherein:

for zooming from a low magnification side to a high magnification side, said second lens group and said third lens group move along an optical axis of said microscope zoom objective lens system while a separation between said first lens group and said second lens group becomes wide and a separation between said second lens group and said third lens group becomes narrow, and the following conditions (2) and (3) are satisfied:

$$0.25 \leq D1/D0 \leq 0.7 \quad (2)$$

$$0.05 \leq D2/D0 \leq 0.5 \quad (3)$$

where D1 is the length of said first lens group, D2 is the amount of movement of said second lens group from said low magnification side to said high magnification side, and D0 is the length of said microscope zoom objective lens system on the high magnification side.

6. The microscope zoom objective lens system according to claim 5, which further comprises a fourth lens group, wherein the first lens group comprises a doublet lens, the fourth lens group moves along the optical axis upon zooming from the low side zoom to the high magnification side, and the following conditions (2') and (3') are satisfied:

$$0.25 \leq D1/D0 \leq 0.5 \quad (2')$$

$$0.15 \leq D2/D0 \leq 0.35 \quad (3').$$

7. The microscope zoom objective lens system according to claim 5, wherein the first lens group includes at least one aspheric surface on a convex surface side, and the following conditions (2) and (3") are satisfied:

$$0.25 \leq D1/D0 \leq 0.7 \quad (2)$$

$$0.05 \leq D2/D0 \leq 0.35 \quad (3").$$

8. The microscope zoom objective lens system according to claim 4, wherein the following conditions (4) and (5) are satisfied:

$$Gn1 - Gn2 \geq 0.15 \quad (4)$$

$$0.3 \leq RG2/RG1 \leq 2.0 \quad (5)$$

where RG1 is the radius of curvature of a surface—located nearest to the object side—of the doublet meniscus lens in the first lens group and concave on the object side, RG2 is the radius of curvature of a surface—located nearest to the second lens group side—of the doublet meniscus lens, Gn1 is the refractive index of the concave lens and Gn2 is the refractive index of the convex lens.

9. The microscope zoom objective lens system according to claim 1, which is of three-group construction wherein said first lens group is divided into two subgroups; a front first lens subgroup defined by lens elements existing between the object and a position where axial rays become highest and a rear first lens subgroups defined by lens elements existing between the front first lens subgroup and the second lens group, said front first lens subgroup comprising at least four lens components; in order from an object side thereof, a doublet meniscus lens concave on an object side thereof, a single lens having positive refractive power, a doublet consisting of a concave lens and a convex lens and a convex lens having positive refractive power, and said rear first lens subgroup including at least one doublet obtained by cementing together a concave lens and a convex lens as viewed from an object side thereof and having positive refractive power and at least one meniscus lens concave on the second lens group side.

10. The microscope zoom objective lens system according to claim 1, which satisfies the following condition (6):

$$-2.5 \leq F1/F2 \leq -0.2 \quad (6)$$

where F1 is the focal length of the first lens group and F2 is the focal length of the second lens group.

11. The microscope zoom objective lens system according to claim 10, which satisfies the following condition (7):

$$-7.5 \leq F3/F2 \leq -1.5 \quad (7)$$

where F2 is the focal length of the second lens group and F3 is the focal length of the third lens group.

12. The microscope zoom objective lens system according to claim 11, which is of three-group construction and satisfies the following condition (7'):

$$-6.5 \leq F3/F2 \leq -2.0 \quad (7').$$

13. The microscope zoom objective lens system according to claim 1, which is of three-group construction, wherein upon zooming from the low magnification side to the high magnification side, the first lens group moves along the optical axis in a direction opposite to that of the second lens group in such a way as to reduce a working distance.

14. The microscope zoom objective lens system according to claim 5, which satisfies the following condition (8):

$$0 < FB1/D1 \leq 0.4 \quad (8)$$

where FB1 is a distance from the lens surface in the first lens group, which surface is located nearest to the second lens group side, to the back focus position of the first lens group.

15. The microscope zoom objective lens system according to claim 5, which is of four-group construction and satisfies the following conditions (9) and (10):

$$-3 \leq F3/F2 \leq -1.5 \quad (9)$$

$$3 \leq F4/F2 \leq 6 \quad (10)$$

where F2 is the focal length of the second lens group, F3 is the focal length of the third lens group, and F4 is the focal length of the fourth lens group.

16. The microscope zoom objective lens system according to claim 15, wherein a lens unit located nearest to the object side in the first lens group is a doublet meniscus lens consisting of a negative lens having a concave surface on an object side and a positive lens.

17. The microscope zoom objective lens system according to claim 16, wherein the first lens group comprises a plurality of cemented lenses, and any one of said doublet components in the first lens group satisfies the following condition (11):

$$\nu P - \nu N \geq 35 \quad (11)$$

where $\nu P$ is the Abbe number of a positive lens in the doublet component and $\nu N$ is the Abbe number of a negative lens in the doublet component.

18. The microscope zoom objective lens system according to claim 15, wherein the second lens group comprises at least two lens components facing each other at concave surfaces.

19. The microscope zoom objective lens system according to 15, wherein the fourth lens group comprises a doublet meniscus lens component consisting of a positive lens convex on the third lens group side and a negative lens and a lens component concave on the third lens group side and having negative refractive power.

20. The microscope zoom objective lens system according to claim 19, wherein the fourth lens group comprises, in order from the third lens group side, a doublet meniscus lens consisting of a positive lens and a negative lens and a doublet negative lens consisting of a double-concave lens and a positive meniscus lens, and satisfies the following conditions (12), (13) and (14):

$$0.5 \leq |F4b/F4| \leq 2 \tag{12}$$

$$\nu 4n - \nu 4p \geq 25 \tag{13}$$

$$N4p \geq 1.68 \tag{14}$$

where
F4 is the focal length of the fourth lens group,
F4b is the focal length of the doublet negative lens,
ν4n is the Abbe number of the double-concave lens in the doublet negative lens,
ν4p is the Abbe number of the positive meniscus lens in the doublet negative lens, and
N4p is the refractive index of the positive meniscus lens in the doublet negative lens.

21. The microscope zoom objective lens system according to claim 1, wherein an aperture stop is located in the vicinity of the back focus position of the first lens group.

22. The microscope zoom objective lens system according to claim 1, which satisfies the following condition (15):

$$WD \leq 0.25F1 \tag{15}$$

where WD is a separation between the first lens group and an object, and F1 is the focal length of the first lens group.

23. The microscope zoom objective lens system according to claim 1, which satisfies the following condition (15'):

$$WD \leq 0.2F1 \tag{15'}$$

24. The microscope zoom objective lens system according to claim 1, wherein the second lens group comprises at least one doublet meniscus lens consisting of a positive lens and a negative lens, and satisfies the following conditions (16) and (17):

$$N2P \geq 1.65 \tag{16}$$

$$\nu 2N - \nu 2P \geq 20 \tag{17}$$

where N2P is the refractive index of the positive lens, ν2P is the Abbe number of the positive lens, and ν2N is the Abbe number of the negative lens.

25. The microscope zoom objective lens system according to claim 1, which satisfies the following conditions (16) and (17'):

$$N2P \geq 1.65 \tag{16}$$

$$\nu 2N - \nu 2P \geq 25 \tag{17'}$$

26. The microscope zoom objective lens system according to claim 1, which satisfies the following conditions (16') and (17):

$$N2P \geq 1.68 \tag{16'}$$

$$\nu 2N - \nu 2P \geq 20 \tag{17}$$

27. The microscope zoom objective lens system according to claim 1, which satisfies the following condition (18):

$$\nu 3p - \nu 3n \geq 35 \tag{18}$$

where νp3 is the Abbe number of a positive lens that has the highest Abbe number in the third lens group, and ν3n is the Abbe number of a negative lens that has the lowest Abbe number in the third lens group.

28. The microscope zoom objective lens system according to claim 1, which has a zoom ratio of 3 or greater.

29. A microscope zoom objective lens system comprising, in order from an object, a first lens group having positive refractive power, a second lens group having negative refractive power and a third lens group having positive refractive power, wherein at least one aspheric surface is used and the following condition (19) is satisfied:

$$NA \geq 0.5 \tag{19}$$

where NA is the numerical aperture of the microscope zoom objective lens system on a high magnification side.

30. The microscope zoom objective lens system according to claim 5, wherein at least one aspheric surface is used in the first lens group or the third lens group.

31. The microscope zoom objective lens system according to claim 1, which satisfies the following condition (20):

$$0.5 \leq WD \leq 1.5 \text{ (mm)} \tag{20}$$

where WD is the working distance of the microscope zoom objective lens system.

32. The microscope zoom objective lens system according to claim 1, which satisfies the following condition (21):

$$55 \leq L \leq 110 \text{ (mm)} \tag{21}$$

where L is the distance from the surface, located in the image side, in a lens group located in, and nearest to, the image side of the microscope zoom objective lens system to the object.

33. The microscope zoom objective lens system according to claim 29, which is of four-group construction and satisfies the following condition (22):

$$|E1 - E2| \leq 15 \text{ (mm)} \tag{22}$$

where E1 is an exit pupil position on the lowest magnification side, and E2 is an exit pupil position on the highest magnification side.

34. The microscope zoom objective lens system according to claim 5, wherein the lens surface with an aspheric surface provided thereon is configured in such a way that the radius of curvature thereof increases farther off the optical axis.

35. The microscope zoom objective lens system according to claim 34, wherein the second lens group comprises at least two lens components facing each other at concave surfaces.

36. The microscope zoom objective lens system according to claim 34, which satisfies conditions (16) and (17).

37. The microscope zoom objective lens system according to claim 34, which further comprises the fourth lens group, wherein the fourth lens group are at least composed of a doublet meniscus lens consisting of a positive lens convex on the third lens group side and a negative lens and a lens component concave on the third lens group side, which satisfies the following conditions: $0.5 \leq |F4b/F4| \leq 2$, $v4n - v4p \geq 25$ where F4 is the focal length of the fourth lens group, F4b is the focal length of the doublet negative lens, $v4n$ is the Abbe number of the double-concave lens in the doublet negative lens, $v4p$ is the Abbe number of the positive meniscus lens in the doublet negative lens.

* * * * *

UNITED STATES PATENT AND TRADEMARK OFFICE
CERTIFICATE OF CORRECTION

PATENT NO. : 6,674,582 B2
DATED : January 6, 2004
INVENTOR(S) : Kenji Kawasaki

It is certified that error appears in the above-identified patent and that said Letters Patent is hereby corrected as shown below:

Column 59,
Line 62, change "where $\lambda$ is" to -- where v is --.

Signed and Sealed this

Twenty-first Day of June, 2005

JON W. DUDAS
*Director of the United States Patent and Trademark Office*